United States Patent
Sugimoto et al.

(10) Patent No.: US 6,661,835 B1
(45) Date of Patent: Dec. 9, 2003

(54) RECEIVING DEVICE AND CHANNEL ESTIMATOR FOR USE IN A CDMA COMMUNICATION SYSTEM

(75) Inventors: Hiroki Sugimoto, Cavendish Park (SG); Teng Joon Lim, Singapore (SG); Lars Rasmussen, Singapore (SG); Kok Leong Cheah, Singapore (SG); Sumei Sun, Singapore (SG); Yoshihiro Matsumoto, Tokyo (JP); Takashi Oyama, Yokohamo (JP)

(73) Assignees: Oki Techno Centre Pte. Ltd., Singapore (SG); National University of Singapore, Singapore (SG)

( * ) Notice: Subject to any disclaimer, the term of this patent is extended or adjusted under 35 U.S.C. 154(b) by 0 days.

(21) Appl. No.: 09/385,359

(22) Filed: Aug. 30, 1999

(30) Foreign Application Priority Data

Aug. 31, 1998 (SG) .............................................. 9803366

(51) Int. Cl.[7] ........................ H04B 15/00; H04K 1/00; H04L 27/30
(52) U.S. Cl. ..................... 375/148; 375/144; 375/346; 375/348
(58) Field of Search ................................ 375/148, 149, 375/150, 144, 145, 346, 347, 348; 370/335, 342, 441

(56) References Cited

U.S. PATENT DOCUMENTS

| | | | |
|---|---|---|---|
| 5,228,056 A | 7/1993 | Schilling | 375/144 |
| 5,719,852 A | 2/1998 | Schilling et al. | |
| 5,724,378 A | 3/1998 | Miki et al. | |
| 5,887,034 A * | 3/1999 | Suzuki | 375/285 |
| 6,081,516 A * | 6/2000 | Yoshida et al. | 370/342 |
| 6,137,788 A * | 10/2000 | Sawahashi et al. | 370/342 |
| 6,172,969 B1 * | 1/2001 | Kawakami et al. | 370/342 |
| 6,222,498 B1 * | 4/2001 | Ishii et al. | 343/853 |
| 6,240,099 B1 * | 5/2001 | Lim et al. | 370/441 |

FOREIGN PATENT DOCUMENTS

JP          07303092 A     2/1995

OTHER PUBLICATIONS

"A Spread–Spectrum Multi–Access System with a Cascade of Co–Channel Interference Cancellers for Multipath Fading Channels", Young C. Yoon et al.; Division of Electrical and Computer Engineering, Faculty of Engineering, Yokohama National university, Yokohama, JP; IEEE Second International Symposium, Nov. 29, 1992; pp. 87–90.

* cited by examiner

Primary Examiner—Mohammad H. Ghayour
(74) Attorney, Agent, or Firm—Rabin & Berdo, P.C.

(57) ABSTRACT

At a base station 2, a CDMA received signal coming in through an antenna 4 is fed to a radio frequency unit (RFU) or high frequency unit 6. The RFU 6 demodulates a baseband signal BB from a signal RF and delivers the signal BB to an analog-to-digital converter (A/D) 8. The resulting digital signal output from the A/D 8 is input to a hybrid interference canceller (HIC) 12 as a received signal Rx Data 10. The HIC 12 divides users into two groups and assigns one combination of a parallel interference canceller and a serial interference canceller to each group. The HIC 12 cancels interference contained in the received signal Rx Data 10 for thereby estimating symbols particular to a plurality of users.

18 Claims, 32 Drawing Sheets

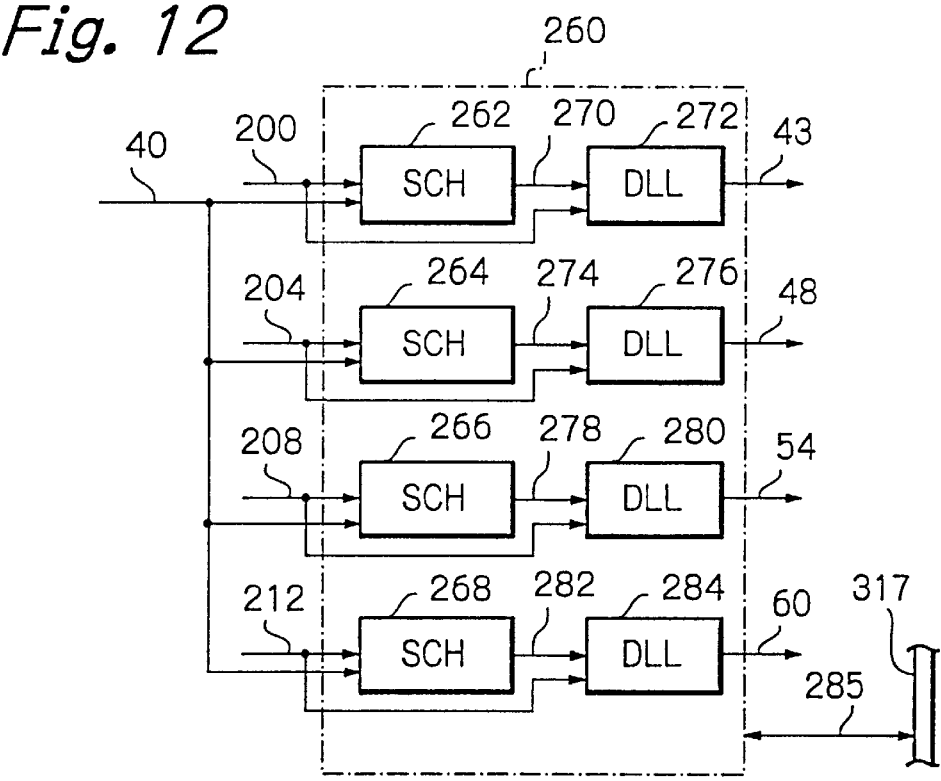
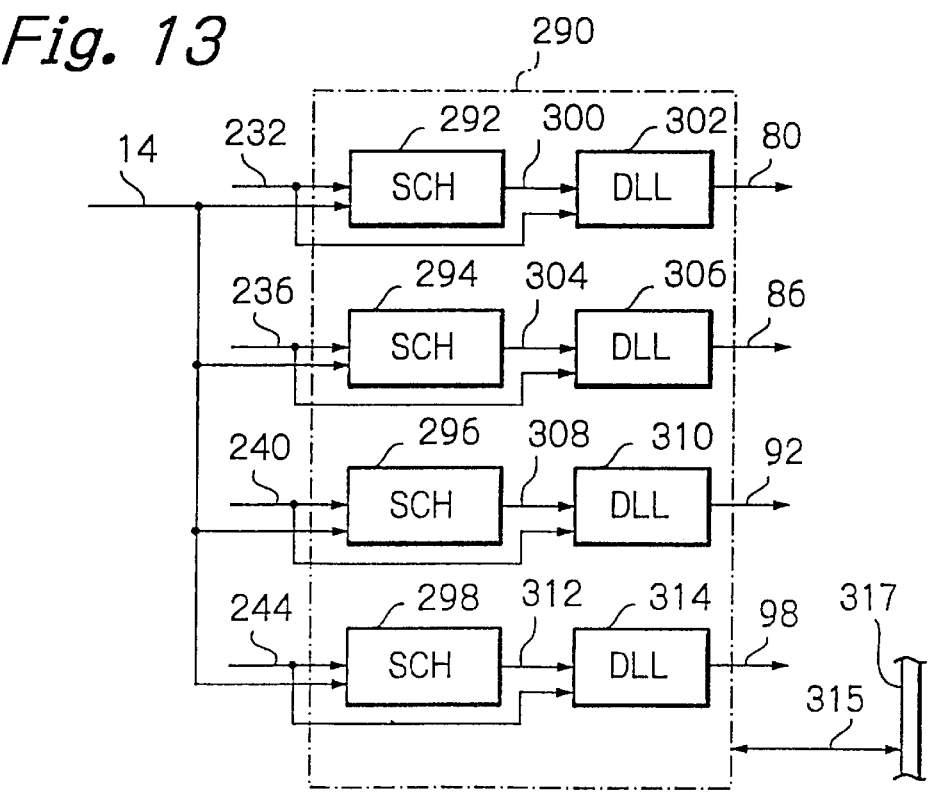

RECEIVING DEVICE AND CHANNEL ESTIMATOR FOR USE IN A CDMA COMMUNICATION SYSTEM

BACKGROUND OF THE INVENTION

1. Field of the Invention

The present invention relates to a receiving device for receiving a CDMA (Code Division Multiple Access) signal in a CDMA communication system and a channel estimator included in the receiving device for correcting the deterioration of the CDMA signal ascribable to multipath propagation.

2. Description of the Background Art

Today, extended researches are under way on a CDMA communication system capable of enhancing the efficient use of limited frequencies available with mobile communication. In the CDMA communication system, multiplexed interference signals other than a desired wave and received from the other transmitting stations and interference signals ascribable to multipaths are dealt with in the same manner as thermal noise in a spreading/despreading process. With this scheme, the CDMA system allows a plurality of transmitting stations proportional in number to a process gain to share the same frequency band. A spread spectrum communication system essential with the CDMA system is disclosed in, e.g., U.S. Pat. No. 5,228,056 to Donald Schilling, assigned to InterDigital Technology Corporation and entitled "SYNCHRONOUS SPREAD SPECTRUM COMMUNICATION SYSTEM AND METHOD". This document teaches that messages of different kinds are spread by use of spreading codes of different kinds and then despread to turn out the original messages.

In the next generation mobile communications art, there is an increasing demand for adaptability to multimedia radio transmission and greater subscriber capacity. DS (Direct Sequence)-CDMA is a radio access system meeting the above demand and is a promising candidate for IMT (International Mobile Telecommunications)-2000/FPLMTS (Future Public Land Mobile Telecommunication Systems) and other third generation systems because of its high frequency utilization efficiency. IMT-2000 is discussed in, e.g., "IMT-2000 Radio System Standardization Process", the Proceedings of the Institute of Electronics, and Information Communication Engineers of Japan, May 1998, pp.473–478.

In a DS-CDMA system, while a plurality of stations share the same frequency, each of them spreads a signal to be transmitted by use of a particular code. A receiving station is capable of separating a desired signal by despreading a received signal by use of the same code as the associated transmitting station. In practice, however, interference noise occurs due to cross-correlation between codes assigned to the individual stations, intersymbol interference, and the autocorrelation of multipath of a desired station, limiting the subscriber capacity. An interference canceller technology is available for reducing the influence of the interference noise. An interference canceller installed in a base station allows the cell capacity to be increased and allows the transmission power required of a mobile terminal to be reduced. In addition, the interference canceller enhances accuracy with which the path of an acquired desired signal is tracked.

Some receiving devices for CDMA communication, for example, each includes a correlator or a matched filter. The problem with this type of conventional receiving device is that interference ascribable to transmitting stations other than desired one increases with an increase in the number of subscribers, aggravating the demodulating ability of the receiving device to a critical degree.

In light of the above, some different interference canceller systems have heretofore been proposed, but each of them has some problems left unsolved, as follows. A parallel interference canceller, for example, estimates and cancels interference in parallel and thereby reduces a delay. This type of interference canceller, however, cannot improve the interference cancelling ability of a receiving device because it estimates a great number of transmitting stations at the same time. To improve the interference cancelling ability, parallel interference cancellers with a weighting scheme have been proposed and generally classified into two kinds. However, one kind of cancellers with a weighting scheme cannot improve the ability to a noticeable degree. The other kind of cancellers with a weighting scheme is not satisfactory in practice because a weighting coefficient for implementing the optimal performance depends on the number of transmitting stations and received power.

By contrast, a serial interference canceller, or SIC (Successive Interference Canceller), capable of cancelling interference serially has an advantage that its ability increases with an increase in the number of stages, i.e., the number of times of demodulation. The serial interference canceller is disclosed in, e.g., Young C Yoon et al. "A Spread-Spectrum Multi-Access System with a Cascade of Co-Channel Interference Cancellers for Multipath Fading Channels", IEEE Second International Symposium on Spread Spectrum Techniques and Applications (ISSSTA '92), Nov. 29–Dec. 2, 1992. This document discusses the characteristic of the serial interference canceller in a multipath fading environment.

However, the problem with the serial interference canceller is that it cannot perform the estimation and cancellation of interference with two or more transmitting stations at the same time. As a result, delay noticeably increases with an increase in the number of transmitting stations or the number of stages. Assuming thirty transmitting stations and five stages, then the delay exceeds 450 symbols, i.e., 150×3 (delay of about three symbols for a delay cancelling unit)= 450 even in the ideal case. Such an amount of delay is not practical. The delay time would further increase if a delay time particular to a channel estimator were taken into account.

For example, the delay time of a conventional channel estimator is more than half a slot (0.625 ms/2) for a station. To reduce the delay time, there has been proposed a hybrid interference canceller (HIC) which is the combination of a parallel interference canceller featuring short delay and a successive interference canceller featuring high performance. For the HIC, receivers situated at users' stations are divided into groups which are connected in series. The receivers are arranged in parallel in each group. This kind of scheme, however, cannot achieve a satisfactory ability unless the number of groups and therefore the delay is increased.

Assume that an ICS (Interference Canceller System) is used to increase the subscriber capacity. Then, although demodulation itself is guaranteed by the ICS, searchers arranged around the ICS for acquiring synchronization and DLLs (Delay Lock Loops) for executing synchronous tracking have their performance degraded due to an increase in the number of users constantly holding communication, i.e., an increase in interference. This is also true with the receipt of an access channel; to insure accurate receipt, the transmission power of an access channel must be greater than conventional and aggravates interference.

SUMMARY OF THE INVENTION

It is therefore an object of the present invention to provide a receiving device for CDMA communication featuring an improved interference cancelling ability and capable of reducing, even when the subscriber capacity is increased, the deterioration of the abilities of DLLs, searchers and access channel receiver without aggravating receipt delay.

In accordance with the present invention, a receiving device for CDMA communication includes a receiving circuit for receiving signals for CDMA sent from a plurality of transmitting stations to thereby output received signals. A first group of interference cancellation stage estimates signals sent from the transmitting stations from the received signals by using despreading codes corresponding to spreading codes respectively assigned to the transmitting stations. The first group of interference cancellation stage includes N (integer greater than 2 inclusive) interference cancelling units (ICUs) each for estimating an interstation interference ascribable to interference between the despreading codes, and estimates interstation interferences in parallel, and cancels the interstation interferences to thereby estimate the signals sent from the N transmitting stations in parallel. A second group of interference cancellation stage estimates, from signals from which the interstation interferences have been cancelled by the first group of interference cancellation stage, interstation interferences in parallel with M (integer greater than 2 inclusive) ICUs, cancels the interstation interferences to thereby estimate signals sent from the M transmitting stations in parallel, and outputs signals free from the interstation interferences. A plurality of interference cancellation stages each having the first group of interference cancellation stage and second group of interference cancellation stage are serially connected to construct a hybrid interference cancelling unit. The interference cancellation stages each estimates interstation interferences while the ICUs of the interference cancellation stage output the signals sent from the individual transmitting stations.

Also, in accordance with the present invention, a channel estimator includes an interference cancelling circuit for estimating signals sent from the transmitting stations from the received signals by use of despreading codes respectively corresponding to spreading codes respectively assigned to the transmitting stations. The interference cancelling circuit estimates interstation interferences ascribable to interference between the spreading codes and/or interference between the despreading codes, and cancels the interstation interferences contained in the received signals to thereby output an interference-free signal. A demodulating circuit demodulates the received signals to thereby output demodulated signals. A tracking circuit executes synchronous tracking on the basis of the demodulated signals to thereby execute tracking control over chip clocks to be used by the interference cancelling circuit.

BRIEF DESCRIPTION OF THE DRAWINGS

The objects and features of the present invention will become more apparent from the consideration of the following detailed description taken in conjunction with the accompanying drawings in which:

FIGS. 12 and 13 are schematic block diagrams respectively showing searcher blocks included in the HIC of FIG. 2 and assigned to the first ICU group and second ICU group;

DESCRIPTION OF THE PREFERRED EMBODIMENTS

Figure 1:
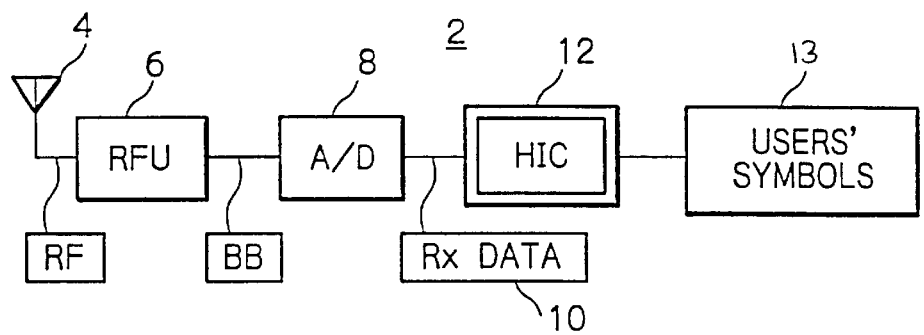
FIG. 1 is a block diagram schematically showing a base station embodying the present invention.

Referring to FIG. 1 of the drawings, a receiving device for CDMA communication embodying the present invention is shown and implemented as a base station. The base station, generally 2, includes an antenna 4. A CDMA signal RF coming in through the antenna 4 is fed to an RFU (Radio Frequency Unit) or high frequency unit 6. The RFU 6 demodulates the received signal RF and thereby outputs a baseband signal BB. The baseband signal BB is fed from the RFU 6 to an analog-to-digital converter (A/D) 8. The A/D 8 digitizes the baseband signal BB and feeds the resulting digital signal to an HIC 12 as a received signal Rx Data 10. The HIC 12 cancels interference contained in the received signal Rx Data 10, and estimates and outputs a plurality of users' symbols 13.

Figure 2:
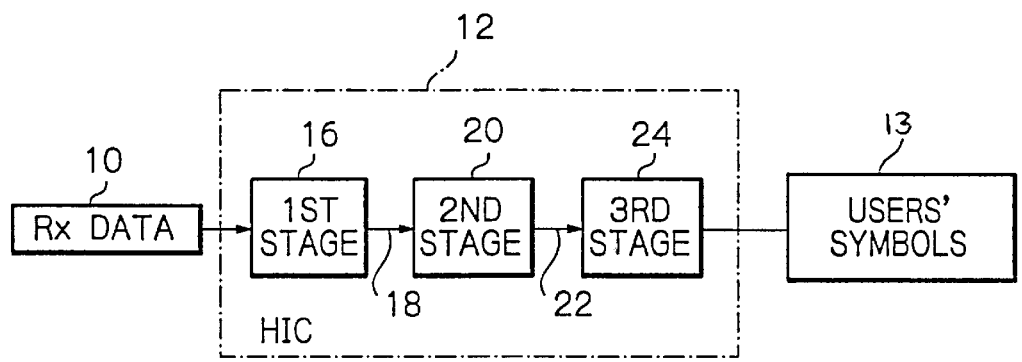
FIG. 2 is a schematic block diagram showing a specific configuration of an HIC included in the illustrative embodiment.

FIG. 2 shows a specific configuration of the HIC 12. As shown, the HIC 12 has three serially connected stages 16, 20 and 24 by way of example and estimates the users' symbols 13 with multiuser type ICS. Specifically, the first stage 16 performs correlation detection and maximum ratio combination with the received signal Rx Data 10 by use of Rake receipt circuits built in its ICUs, executes signal correction and decision with the resulting signals in order to estimate the individual users' symbols and residual signal 18, and feeds the symbols 18 to the second stage 20. With the same configuration as the first stage 16, the second stage 20 estimates the individual users' symbols and residual signal 18 and feeds them to the third stage 24. The third stage 24 estimates the individual users' symbols 13 and residual signal 14 and outputs them with the same configuration as the first and second stages 16 and 20.

While three consecutive stages 16, 20 and 24 are shown in FIG. 2, the crux is that two or more stages be included in the HIC 12. However, the number of stages should not be excessively great from the delay standpoint.

Figure 3:
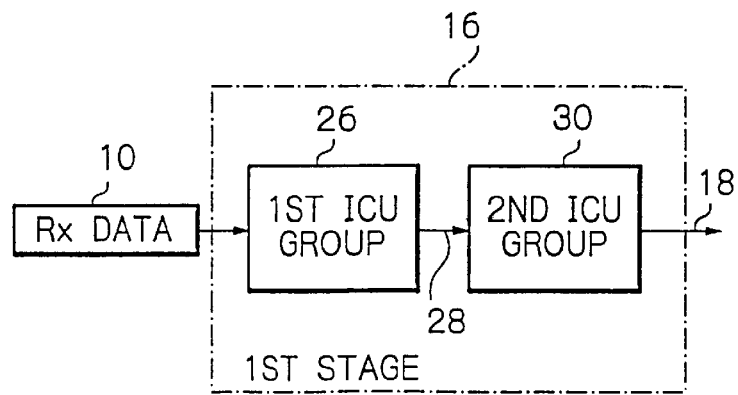
FIGS. 3, 4 and 5 are schematic block diagrams respectively showing a first, a second and a third stage included in the HIC of FIG. 2.

FIG. 3 shows a specific configuration of the first stage 16 included in the HIC 12. In the illustrative embodiment, the HIC 12 is assumed to receive signals from eight users' transmitting stations and to cancel interference by dividing them into two groups. As shown, the first stage 16 is made up of a first ICU group or interference cancelling unit 26 and a second ICU group or interference cancelling unit 30. The first ICU group 26 generates a symbol replica for each of four users #1–#4 from the received signal Rx Data 10 and removes the symbol replicas from the signal Rx data 10. This operation will be referred to as interstation interference cancellation hereinafter. The resulting residual signal 28 output from the first ICU group 26 is applied to the second ICU group 30. The second ICU group 30 generates symbol replicas for the other four users #5–#8 and remove them from the received signal Rx data 10, thereby outputting the users' symbols and residual signal 18.

Figure 4:
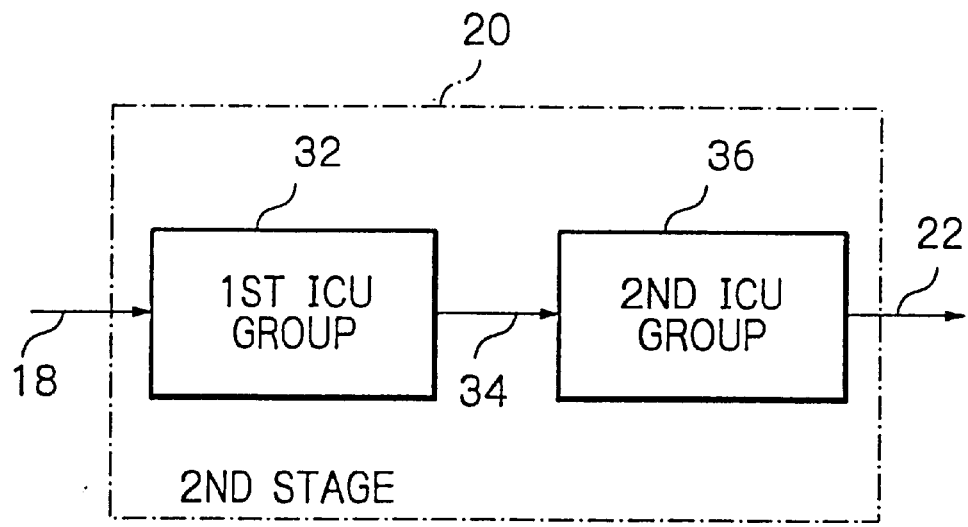
Figure 5:
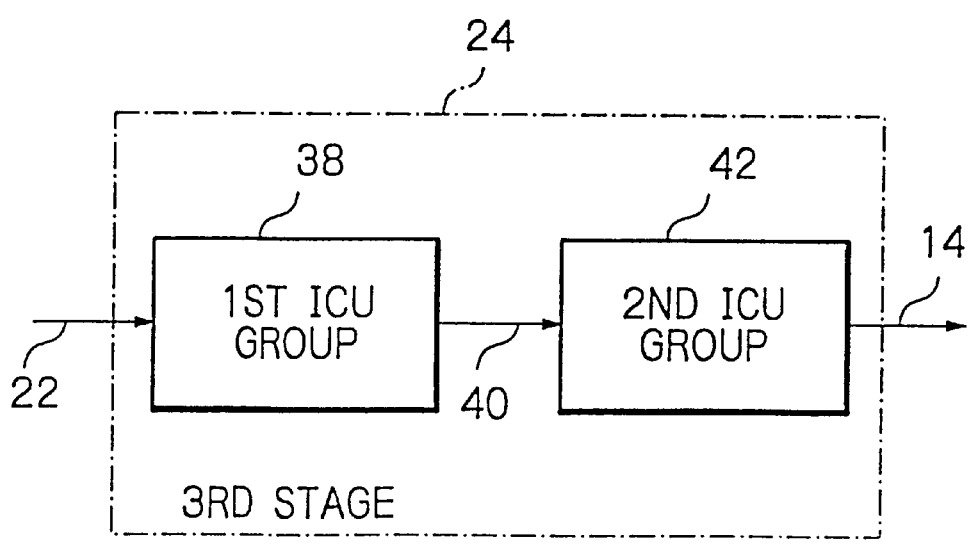

FIGS. 4 and 5 show the configurations of the second stage 20 and third stage 24, respectively. As shown in FIG. 4, the second stage 20 has a first ICU group 32 and a second ICU group 36. The first ICU group 32 generates symbol replicas for the users #1–#4 out of the residual signal 18 fed thereto from the second ICU group 30 of the first stage 16, removes them from the received signal, and delivers the resulting residual signal 34 to the second ICU group 36. The second ICU group 36 operates in the same manner as the first ICU group 32 except that it deals with the users #5–#8 and outputs a residual signal 22. A shown in FIG. 5, the third stage 24 has a first ICU group 38 and a second ICU group 42. The first and second ICU groups 38 and 42 are respectively assigned to the users #1–#4 and users #5–#8 and output residual signals 40 and 14 in the same manner as the above ICUs 32 and 36.

With the configurations shown in FIGS. 2–5, it is possible to construct a HIC of multiuser type capable of generating user-by-user symbol replicas and removing them from a received signal and of multistage type capable of repeating demodulation a number of times. In practice, ICUs included in the consecutive stages each needs a searcher and DLL combination for synchronous tracking although not shown in FIGS. 2–5. Such an arrangement will be described in detail later along with the specific construction and operation of the illustrative embodiment.

In the following description, the HIC 12 is assumed to be an eight-user, two-group and three-stage HIC and assumed to be of multiuser and multistage type, as stated above. Specifically, three ICUs, one at each stage, are assigned to each user for demodulation and interference estimation, so that twenty-four ICUs in total are present for eight users. The ICUs assigned to each four users are connected in parallel as a single group. That is, the eight users are divided into two groups by fours, and the groups are serially connected to each other. Two groups at each stage and therefore six groups at three consecutive stages are serially connected. The HIC 12 is constructed such that searchers acquire synchronization while DLLs execute synchronous tracking, thereby controlling fingers included in the ICUs.

Figure 6:
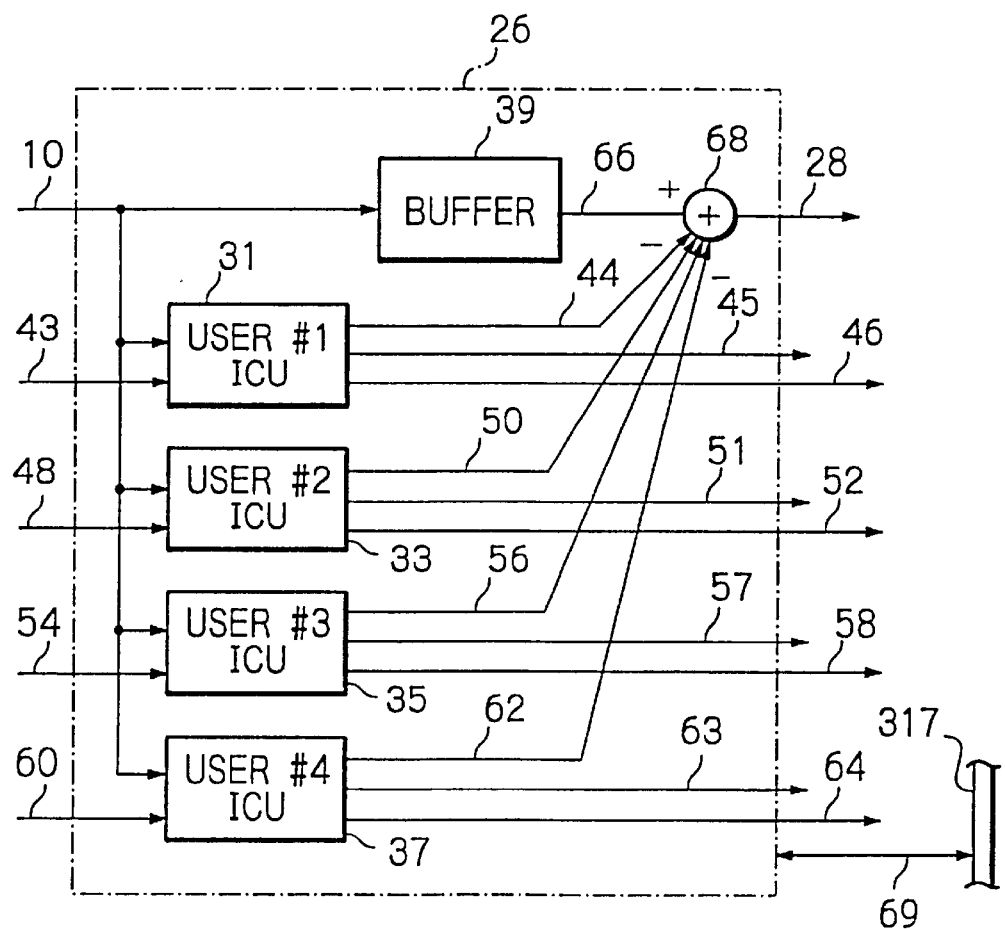
FIGS. 6 and 7 are schematic block diagrams respectively showing a first ICU (Interference Cancellation Units) group and a second ICU group belonging to the first stage of FIG. 3.

Reference will be made to FIGS. 6–14 for describing the HIC 12 in detail. In the HIC 12 to be described, a single multipath is assumed for the sake of simplicity of description. FIG. 6 shows the first ICU group 26 of the first stage 26. The ICU group 26 is of residual transfer type transferring a residual signal left after cancellation and estimated received symbols (Present Data) to the next stage, so that an estimated signal output from the previous stage and an estimated signal to be fed to the next stage exist together in each ICU assigned to a particular user. The received signal is first fed to the first ICU group of the first stage 16. ICUs belonging to the first ICU group 16 each performs correlation detection and maximum ratio combination based on Rake receipt and estimates the respective user's received symbol by the correction and decision on the resulting signal.

In FIG. 6, when the received signal Rx Data 10 is fed to the ICUs of the first ICU group 26, the ICUs each executes correlation detection and maximum ratio combination based on Rake receipt and then estimates the received symbol of the associated user by signal correction and decision. The ICU again modulates the estimated symbol by respreading it and then outputs it as an interference estimate. Such user-by-user estimated symbols are fed to the user ICUs of the next stage together with channel estimates respectively associated with the estimated symbols. The interference estimates of four users belonging to the same group are added together, and the resulting sum is subtracted from the original received signal as the interference estimate of the first group to thereby cancel interference. The timing is, of course, adjusted such that data appearing at the same time are dealt with together. The signal from which the interference has been removed is input to the second ICU group 30 of the first stage.

The received signal Rx Data 10 may be expressed as:

$$r(n)=\Sigma\Sigma\Sigma C_{k,l}(i)u(n-iN-\tau_{k,l})Sk(n-\tau_{k,l})dk(i)+z(n) \; i=0 \text{ to } P, k=1 \text{ to } K, l=1 \text{ to } L \quad \text{Eq. (1)}$$

$$u(n) = 1 \quad 0 \leq n \leq N \quad \text{Eq. (2)}$$
$$= 0 \quad \text{otherwise}$$

where P denotes the number of symbols fully transmitted, K denotes the number of users, L denotes number of paths, and $C_{k,l}(i)$ denotes the channel of the kth user and lth path for the ith symbol. Also, u(n) denotes a function for opening each symbol only once within the entire transmission time, Sk denotes a spreading code assigned to the kth user, dk(i) denotes the ith data symbol of the kth user, a(n) denotes noise, and n denotes a minimum one-chip time. Further, $\tau_{k,l}$ is representative of a delay particular to the kth user and lth path.

The ith data symbol of the kth user belonging to the first ICU group 26 of the first stage 16 has a correlation value produced by:

$$y_{l,1,k}(i)=S_k^H(i)r(i) \quad \text{Eq. (3)}$$

As for the kth user belonging to the first ICU group 26 of the first stage 16, the (corrected) interference estimate of the nth chip is expressed as:

$$\Delta I_{l,1,k}(n)=\Sigma fx(y_{l,1,k}(i_{k,l}))Sk(n-\tau_{k,l})C_{k,l}(i_{k,l}) \; l=1 \text{ to } L \quad \text{Eq. (4)}$$

where fx(.) denotes a function of correction and decision.

As for the first ICU group 26 of the first stage 16, the (corrected) interference estimates of the nth chip within the group are given by:

$$\Delta I_{l,1}(n)=\Sigma\Delta I_{l,1,k}(n) \; k-1 \text{ to } p1 \quad \text{Eq. (5)}$$

where p1 may be represented by the user number in the first ICU group 26.

An error signal, i.e., residual signal at the nth chip input to the second ICU group 30 of the first stage 16 is expressed as:

$$e_{l,2}(n)=r(n)-\Delta I_{l,1}(n) \quad \text{Eq. (6)}$$

In this manner, the ith data of the kth user belonging to the gth group of the mth stage has a correlation value produced by:

$$y_{m,g,k}(i)=S_k^H(i)e_{m,g,k}(i)+fx(y_{m-1,g,k}(i)) \quad \text{Eq. (7)}$$

As for the kth user belonging to the gth group of the mth stage, the (corrected) interference estimates at the nth chip are expressed as:

$$\Delta I_{m,g,k}(n)=\Sigma\{fx(y_{m,g,k}(i_{k,l})-fx(y_{m-l,g,k}(i_{k,l})))\}Sk(n-\tau_{k,l})C_{k,l}(i_{k,l}) \; l=1 \text{ to } L \quad \text{Eq. (8)}$$

The total (corrected) interference estimate at the nth chip of the gth group of the mth stage is produced by $$\Delta I_{m,g}(n)=\Sigma\Delta I_{m,g,k}(n) \; k=1 \text{ to } pg \quad \text{Eq. (9)}$$

An error signal or residual signal input to the nth chip of the g+lth group of the mth stage is expressed as:

$$e_{m,g+l}(n)=e_{m,g}(n)-\Delta I_{m,g}(n) \quad \text{Eq. (10)}$$

Specifically, as shown in FIG. 6, a user #1 ICU 31 receives the received signal Rx Data 10 and a chip clock 43 output from its associated DLL for effecting synchronous tracking. The ICU 31 performs Rake receipt, signal correction and decision, respreading and channel reproduction with a signal sent from the user #1 and thereby generates replica data (I/Q) 44. The replica data (I/Q) 44 is fed from the ICU 31 to an adder 68 as a negative value. Further, the ICU 31 generates a signal Present dat (I/Q) 45 subjected to correction and decision and an estimated received symbol Present dat1 (I/Q) 46 particular to the user #1 and to be fed to the next stage.

A user #2 ICU 33 is identical in operation with the user #1 ICU 31 except that it receives a chip clock 48 together with the received signal Rx Data 10, generates replica data (I/Q) 50 particular to the user #2, feeds the data (I/Q) 50 to the adder 68 in the form of a negative value, and outputs a signal Present dat (I/Q) 51 subjected to correction and decision as well as an estimated received symbol Present dat1 (I/Q) 52 particular to the user #2 and to be sent to the next stage. A user #3 ICU 35 is also identical in operation with the user #1 ICU 31 except that it receives a chip clock 54 together with the received signal Rx Data 10, generates replica data (I/Q) 56 particular to the user #3, feeds the data (I/Q) 56 to the adder 68 in the form of a negative value, and outputs a signal Present dat (I/Q) 57 subjected to correction and decision as well as an estimated received symbol Present dat1 (I/Q) 58 particular to the user #3 and to be sent to the next stage. Further, a user #4 ICU 37 operates in the same manner as the user #1 ICU 31 except that it receives a chip clock 60 together with the received signal Rx Data 10, generates replica data (I/Q) 62 particular to the user #4, feeds the data (I/Q) 62 to the adder 68 in the form of a negative value, and outputs a signal Present dat (I/Q) 63 subjected to correction and decision as well as an estimated received symbol Present dat1 (I/Q) 64 particular to the user #4 and to be sent to the next stage.

A buffer 39 stores the received signal Rx Data 10 for a moment. When all the replica data (I/Q) 44, 50, 56 and 62 are fed from the ICUs 31, 33, 35 and 37, respectively, to the adder 68, the buffer 39 reads out the received signal Rx Data 10 and feeds it to the adder 68 as a received signal 66. The adder 68 subtracts the replica data (I/Q) 44, 50, 56 and 62 from the received signal 66 and delivers the resulting residual signal 28 to the second ICU group 30 of the first stage 16. The circuitry constituting the first ICU group 26 is controlled by a control signal 69 input thereto via a bus 317.

Figure 7:
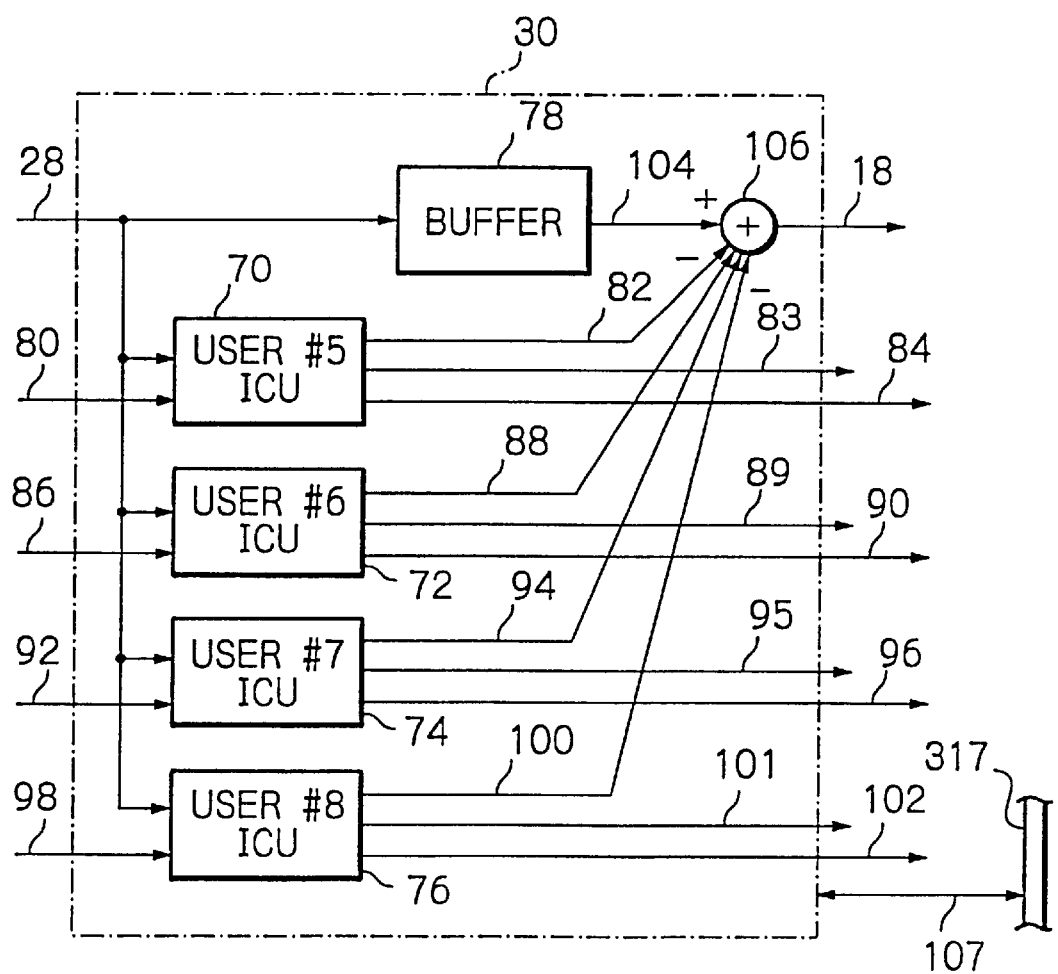

FIG. 7 shows the configuration of the second ICU group 30 of the first stage 16 in detail. As shown, four ICUs are respectively assigned to the users #5–#8, and each executes Rake receipt, signal correction and decision for estimating a received symbol particular to the associated user, and again modulates the estimated symbol by respreading in order to produce an interference estimate. The interference estimates produced by the ICU group 30 are added Up and then subtracted from the signal input to the ICU group 30, i.e., the residual signal 28 output from the first ICU group 26. The user-by-user estimated received symbols and their channel estimates are also fed to two ICU groups of the second stage.

Specifically, in the second ICU group 30, a user #5 ICU 70 receives the residual signal 28 and a chip clock 80 for synchronous tracking. The ICU 70 executes Rake receipt, signal correction and decision, respreading and channel reproduction with the signal sent from a user #5 and thereby generates replica data (I/Q) 82. The replica data 82 is fed from the ICU 70 to an adder 106 as a negative value. Further, the ICU 70 generates a signal Present dat (I/Q) 83 subjected to correction and decision and an estimated received symbol Present dat1 (I/Q) 84 particular to the user #5 and to be fed to the next stage.

A user #6 ICU 72 is identical in operation with the user #5 ICU 70 except that it receives a chip clock 86 together with the residual signal 28, generates replica data (I/Q) 88 particular to the user #6, feeds the data (I/Q) 88 to the adder 106 in the form of a negative value, and outputs a signal Present dat (I/Q) 89 subjected to correction and decision as well as an estimated received symbol Present dat1 (I/Q) 90 particular to the user #6 and to be sent to the next stage. A user #7 ICU 74 is identical in operation with the user #5 ICU 70 except that it receives a chip clock 92 together with the residual signal 28, generates replica data (I/Q) 94 particular to the user #7 feeds the data (I/Q) 94 to the adder 106 in the form of a negative value, and outputs a signal Present dat (I/Q) 95 subjected to correction and decision as well as an estimated received symbol Present dat1 (I/Q) 96 particular to the user #7 and to be sent to the next stage. A user #8 ICU 76 also operates in the same manner as the user #5 ICU 70 except that it receives a chip clock 98 together with the residual signal 28, generates replica data (I/Q) 100 particular to the user #8, feeds the data (I/Q) 100 to the adder 106 in the form of a negative value, and outputs a signal Present dat (I/Q) 101 subjected to correction and decision as well as an estimated received symbol Present dat1 (I/Q) 102 particular to the user #8 and to be sent to the next stage.

A buffer 78 stores the residual signal 28 for a moment. When all the replica data (I/Q) 82, 88, 94 and 100 are fed from the ICUs 70, 72, 74 and 76, respectively, to the adder 106, the buffer 78 reads out the residual signal 28 and feeds it to the adder 106 as a residual signal 104. The adder 106 subtracts the replica data (I/Q) 82, 88, 94 and 100 from the received signal 104 and delivers the resulting residual signal 18 to the first group ICUs 32 of the second stage. The circuitry constituting the second ICU group is controlled by a control signal 107 input thereto via the bus 317.

Figure 8:
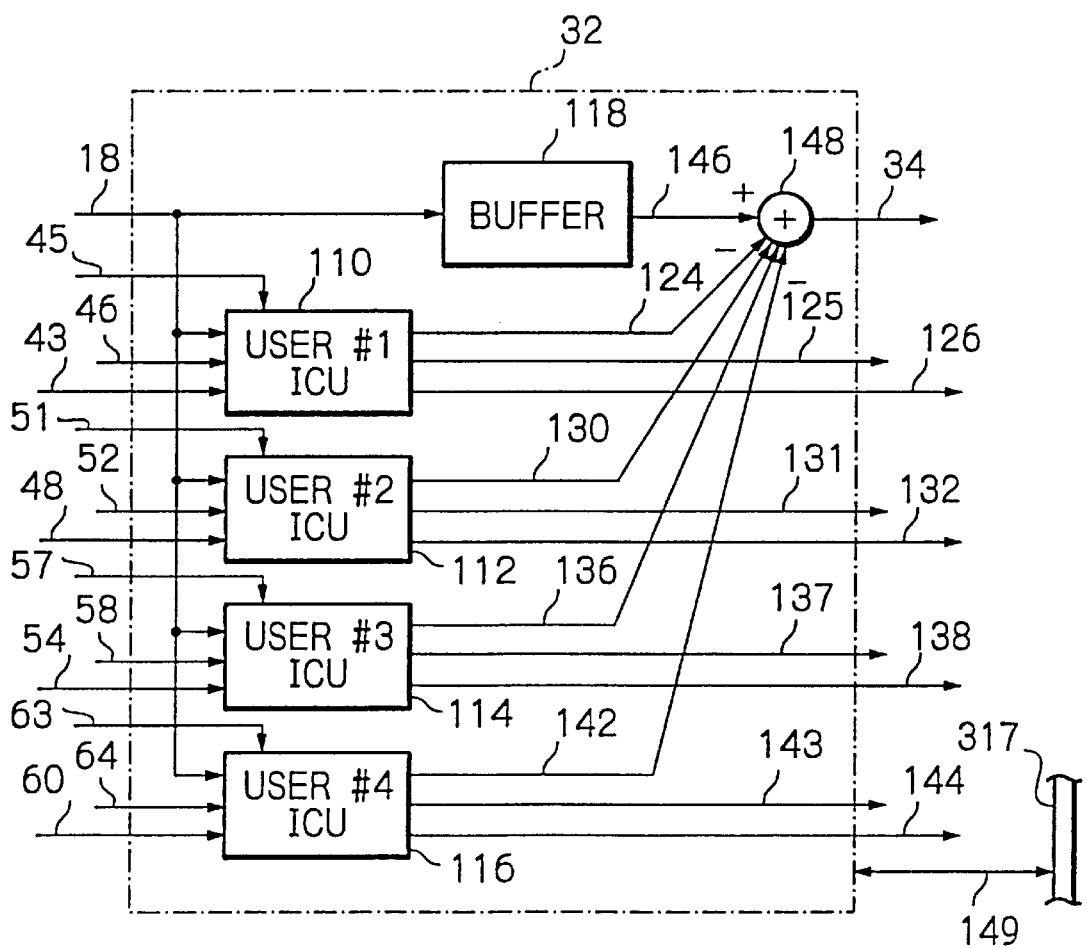
FIGS. 8 and 9 are schematic block diagrams respectively showing a first ICU group and a second ICU group belonging to the second stage of FIG. 4.

FIG. 8 shows the first ICU group 32 of the second stage 20 in detail. As shown, the second ICU stage 32 has substantially the same configuration and operates in substantially the same manner as the first ICU group 26 of the first stage 16. The residual signal or error signal resulting from interference cancellation effected by the two consecutive ICU groups of the first stage is input to the first ICU group 32 of the second stage 20. In the first ICU group of the second stage, each ICU adds the correlation detection value of the error signal and the estimated signal input from the first stage finger by finger so as to effect maximum ratio combination, executes signal correction and decision on the resulting signal, and thereby estimates the received symbol of the associated user at the second stage.

Specifically, each ICU again modulates a difference between the estimated signal output from the previous stage and the current signal by respreading and outputs the modulated signal as an interference estimate. Corrected user-by-user interference estimates output from the first ICU group 32 are added up within the group. The sum of the interference estimates is subtracted from the signal input to the first group, i.e., the error signal resulting from the interference cancellation effected at the first stage. The estimated received symbol and channel estimate associated therewith are sent to the ICU of the next stage assigned to the same user. The signal having undergone interference cancellation is input to the second ICU group 36 of the second stage.

More specifically, as shown in FIG. 8, a user #1 ICU 110 receives the residual signal 18 and the chip clock 43 for synchronous tracking. Further, the ICU 110 receives the signal Present dat (I/Q) 45 subjected to correction and decision at the previous stage as Previous data (I/Q) 45, and receives the user #1 estimated received symbol Present dat1 (I/Q) 46 output from the previous stage as Previous data1 (I/Q) 46. The ICU 110 generates replica data (I/Q) 124 particular to the user #1 and feeds it to an adder 148 in the form of a negative value. Further, the ICU 110 generates a signal Present dat (I/Q) 125 subjected to correction and decision and an estimated received symbol Present dat1 (I/Q) 126 particular to the user #1 and to be fed to the next stage.

A user #2 ICU 112 receives the residual signal 18 and the chip clock 43 for synchronous tracking. Further, the ICU 112 receives the signal Present dat (I/Q) 51 subjected to correction and decision at the previous stage as Previous data (I/Q) 51, and receives the user #2 estimated received symbol Present dat1 (I/Q) 52 output from the previous stage as Previous data1 (I/Q) 52. The ICU 112 generates replica data (I/Q) 130 particular to the user #2 and feeds it to the adder 148 in the form of a negative value. Further, the ICU 112 generates a signal Present dat (I/Q) 131 subjected to correction and decision and an estimated received symbol Present dat1 (I/Q) 132 particular to the user #2 and to be fed to the next stage.

A user #3 ICU 114 is identical in operation with the user #1 ICU 110 except that it receives the chip clock 54 together with the residual signal 18, receives the signal Present dat (I/Q) 57 as Previous data (I/Q) 57, and receives the estimated received symbol dat1 (I/Q) 58 of the user #3 output from the previous stage as Previous data (I/Q) 58. Then, the ICU 114 generates replica data (I/Q) 136 particular to the user #3, feeds the data (I/Q) 136 to the adder 148 in the form of a negative value, and outputs a signal Present dat (I/Q) 137 subjected to correction and decision as well as an estimated received symbol Present dat1 (I/Q) 138 particular to the user #3 and to be sent to the next stage. Further, a user #4 ICU 116 operates in the same manner as the user #1 ICU 110 except that it receives the chip clock 60 together with the residual signal 18, receives the signal Present dat (I/Q) 63 as Previous data (I/Q) 63, and receives the estimated received symbol dat1 (I/Q) 64 of the user #4 output from the previous stage as Previous data (I/Q) 64. Then, the ICU 116 generates replica data (I/Q) 142 particular to the user #4, feeds the data (I/Q) 142 to the adder 148 in the form of a negative value, and outputs a signal Present dat (I/Q) 143 subjected to correction and decision as well as an estimated received symbol Present dat1 (I/Q) 144 particular to the user #4 and to be sent to the next stage.

A buffer 118 stores the residual signal 18 for a moment. When all the replica data (I/Q) 124, 130, 136 and 142 are fed from the ICUs 110, 112, 114 and 116, respectively, to the adder 148, the buffer 118 reads out the residual signal 18 and feeds it to the adder 148 as a residual signal 146. The adder 148 subtracts the replica data (I/Q) 124, 130, 136 and 142 from the residual signal 146 and delivers the resulting residual signal 34 to the second group of ICUs 36 of the second stage. The circuitry constituting the first group of ICUs 32 is controlled by a control signal 149 input thereto via the bus 317.

Figure 9:
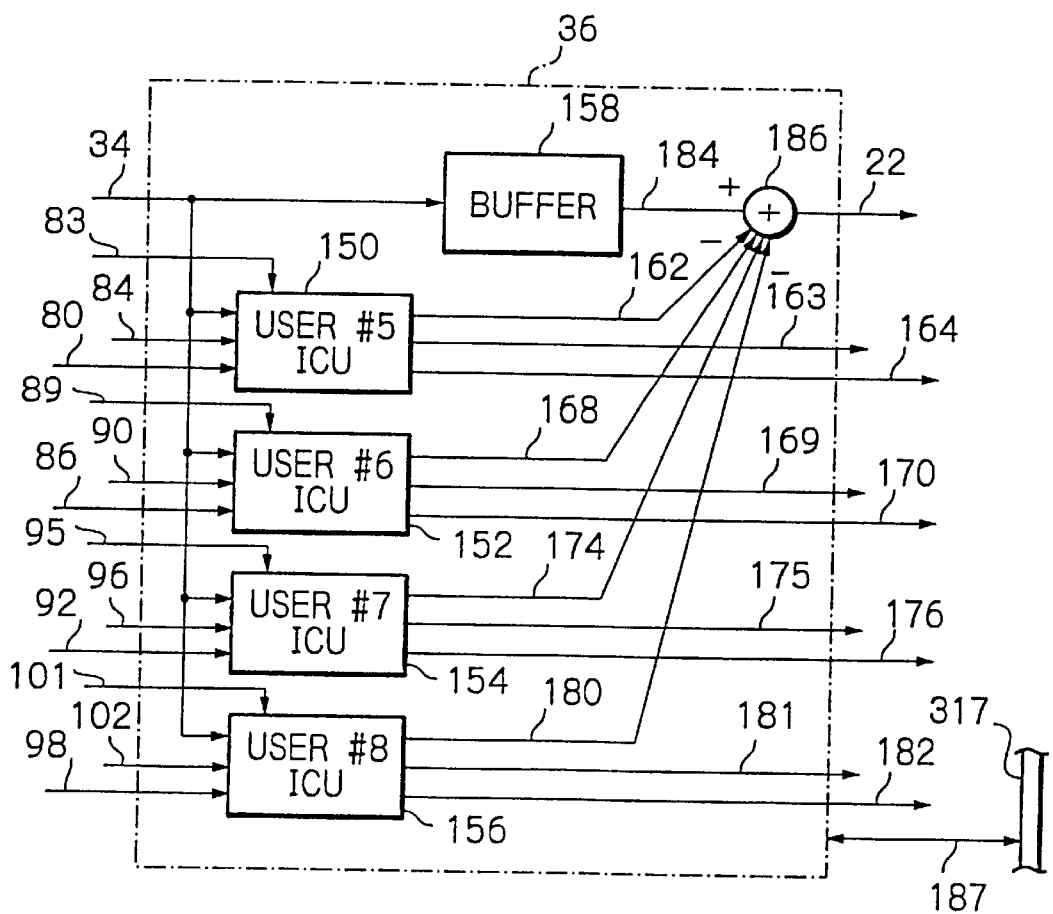

FIG. 9 shows the second ICU group 36 of the second stage 20 in detail. Briefly, the second ICU group 36, like the first ICU group 32, estimate user-by-user received symbols, again modulate differences between the estimated symbols and the symbols estimated at the previous stage by respreading, and thereby outputs corrected interference estimates. The corrected interferences are added up in the group 36 and then subtracted from the signal input to the second group. The estimated received symbol of each user and the channel estimate of the symbol are also sent to the ICU of the next stage assigned to the same user. Such a procedure is repeated up to the last group of the last HIC stage. Symbols estimated by the last ICUs are the user-by-user symbols demodulated by the HIC.

Specifically, as shown in FIG. 9, a user #5 ICU 150 receives the residual signal 34 and the chip clock 80 for synchronous tracking. Further, the ICU 150 receives the signal Present dat (I/Q) 83 subjected to correction and decision at the previous stage as Previous data (I/Q) 83, and receives the user #5 estimated received symbol Present dat1 (I/Q) 84 output from the previous stage as Previous data1 (I/Q) 84. The ICU 150 generates replica data (I/Q) 162 particular to the user #5 and feeds it to an adder 186 in the form of a negative value. Further, the ICU 150 generates a signal Present dat (I/Q) 163 subjected to correction and decision and an estimated received symbol Present dat1 (I/Q) particular to the user #5 and to be fed to the next stage.

A user #6 ICU 152 receives the residual signal 34 and the chip clock 86 for synchronous tracking. Further, the ICU 152 receives the signal Present dat (I/Q) 89 subjected to correction and decision at the previous stage as Previous data (I/Q) 89, and receives the user #6 estimated received symbol Present dat1 (I/Q) 90 output from the previous stage as Previous data1 (I/Q) 90. The ICU 152 generates replica data (I/Q) 168 particular to the user #6 and feeds it to the adder 186 in the form of a negative value. Further, the ICU 152 generates a signal Present dat (I/Q) 169 subjected to correction and decision and an estimated received symbol Present dat1 (I/Q) 170 particular to the user #6 and to be fed to the next stage.

A user #7 ICU 154 is identical in operation with the user #5 ICU 150 except that it receives the chip clock 92 together with the residual signal 34, receives the signal Present dat (I/Q) 95 as Previous data (I/Q) 95, and receives the estimated received symbol dat1 (I/Q) 96 of the user #7 output from the previous stage as Previous dat1 (I/Q) 96. Then, the ICU 154 generates replica data (I/Q) 174 particular to the user #7, feeds the data (I/Q) 174 to the adder 186 in the form of a negative value, and outputs a signal Present dat (I/Q) 175 subjected to correction and decision as well as an estimated received symbol Present dat1 (I/Q) 176 particular to the user #7 and to be sent to the next stage. Further, a user #8 ICU 156 operates in the same manner as the user #5 ICU 150 except that it receives the chip clock 98 together with the residual signal 34, receives the signal Present dat (I/Q) 101 as Previous data (I/Q) 101, and receives the estimated received symbol dat1 (I/Q) 102 of the user #8 output from the previous stage as Previous dat1 (I/Q) 102. Then, the ICU 156 generates replica data (I/Q) 180 particular to the user #8, feeds the data (I/Q) 180 to the adder 186 in the form of a negative value, and outputs a signal Present dat (I/Q) 181 subjected to correction and decision as well as an estimated received symbol Present dat1 (I/Q) 182 particular to the user #8 and to be sent to the next stage.

A buffer 158 stores the residual signal 34 for a moment. When all the replica data (I/Q) 162, 168, 174 and 180 are fed from the ICUs 150, 252, 154 and 156, respectively, to the adder 186, the buffer 158 reads out the residual signal 34 and feeds it to the adder 186 as a residual signal 184. The adder 186 subtracts the replica data (I/Q) 162, 168, 174 and 180 from the residual signal 184 and delivers the resulting residual signal 22 to the first ICU group 38 of the third stage. The circuitry constituting the second ICU group 36 is controlled by a control signal 187 input thereto via the bus 317.

Figure 10:
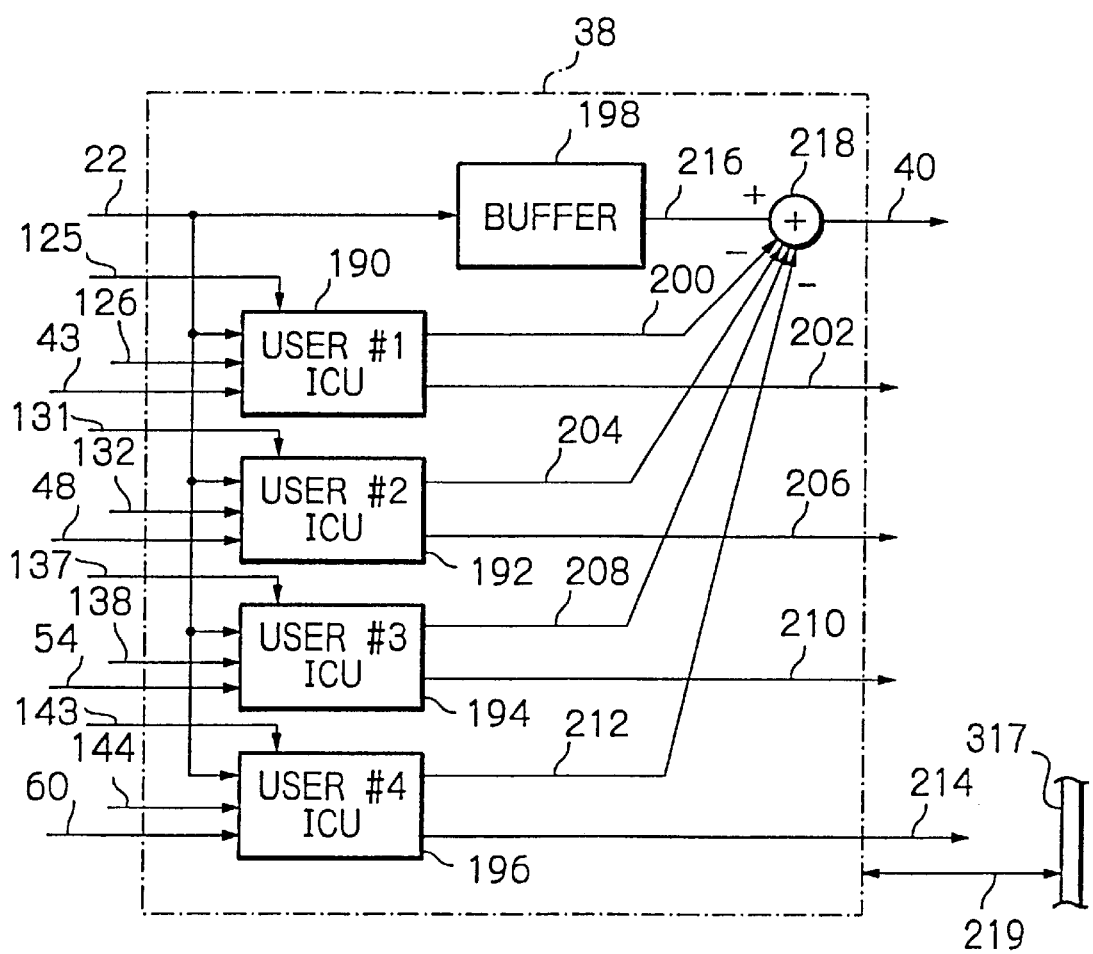
FIGS. 10 and 11 are schematic block diagrams respectively showing a first ICU group and a second ICU group belonging to the third stage of FIG. 5.

FIG. 10 shows the first ICU group 38 of the third stage 24 specifically. As shown, a user #1 ICU 190 receives the residual signal 22 and the chip clock 43 for synchronous tracking. Further, the ICU 190 receives the signal Present dat (I/Q) 125 subjected to correction and decision at the previous stage as Previous data (I/Q) 125, and receives the user #1 estimated received symbol Present dat1 (I/Q) 126 output from the previous stage as Previous data1 (I/Q) 126. The ICU 190 generates replica data (I/Q) 200 particular to the user #1 and feeds it to an adder 218 as a negative value. Further, the ICU 190 outputs a signal subjected to correction and decision as demodulated user #1 data 202. If desired, the ICU 190 may output data not subjected to correction and decision as the user #1 data.

A user #2 ICU 192 receives the residual signal 22 and the chip clock 48 for synchronous tracking. Further, the ICU 192 receives the signal Present dat (I/Q) 131 subjected to correction and decision at the previous stage as Previous data (I/Q) 131, and receives the user #2 estimated received symbol Present dat1 (I/Q) 132 output from the previous stage as Previous data1 (I/Q 132. The ICU 192 generates replica data (I/Q) 204 particular to the user #2 and feeds it to an adder 218 as a negative value. Further, the ICU 192 outputs a signal subjected to correction and decision as demodulated user #2 data 206. If desired, the ICU 192 may output data not subjected to correction and decision as the user #2 data.

A user #3 ICU 194 is identical in operation with the user #1 ICU 190 except that it receives the chip clock 54 together with the residual signal 22, receives the signal Present dat (I/Q) 137 as Previous data (I/Q) 137, and receives the estimated received symbol dat1 (I/Q) 138 of the user #3 output from the previous stage as Previous dat1 (I/Q) 138. Then, the ICU 194 generates replica data (I/Q) 208 particular to the user #3 and feeds the data (I/Q) 174 to the adder 218 as a negative value. The ICU 194 outputs a signal subjected to correction and decision as demodulated user #3 data 210. If desired, the ICU 194 may output data not subjected to correction and decision as the user #3 data. A user #4 ICU 196 operates in the same manner as the user #1 ICU 190 except that it receives the chip clock 60 together with the residual signal 22, receives the signal Present dat (I/Q) 143 as Previous data (I/Q) 143, and receives the estimated received symbol dat1 (I/Q) 144 of the user #4 output from the previous stage as Previous dat1 (I/Q) 144. Then, the ICU 196 generates replica data (I/Q) 212 particular to the user #4 and feeds the data (I/Q) 212 to the adder 218 as a negative value. The ICU 196 outputs a signal subjected to correction and decision as demodulated user #4 data 214. If desired, the ICU 196 may output data not subjected to correction and decision as the user #4 data.

A buffer 198 stores the residual signal 22 for a moment. When all the replica data (I/Q) 200, 204, 208 and 212 are fed from the ICUs 190, 192, 194 and 196, respectively, to the adder 218, the buffer 198 reads out the residual signal 22 and feeds it to the adder 218 as a residual signal 216. The adder 218 subtracts the replica data (I/Q) 200, 204, 208 and 212 from the residual signal 216 and delivers the resulting residual signal 40 to the second group of ICUs 42 of the third stage. The circuitry constituting the second ICU group 38 is controlled by a control signal 219 input thereto via the bus 317.

Figure 11:
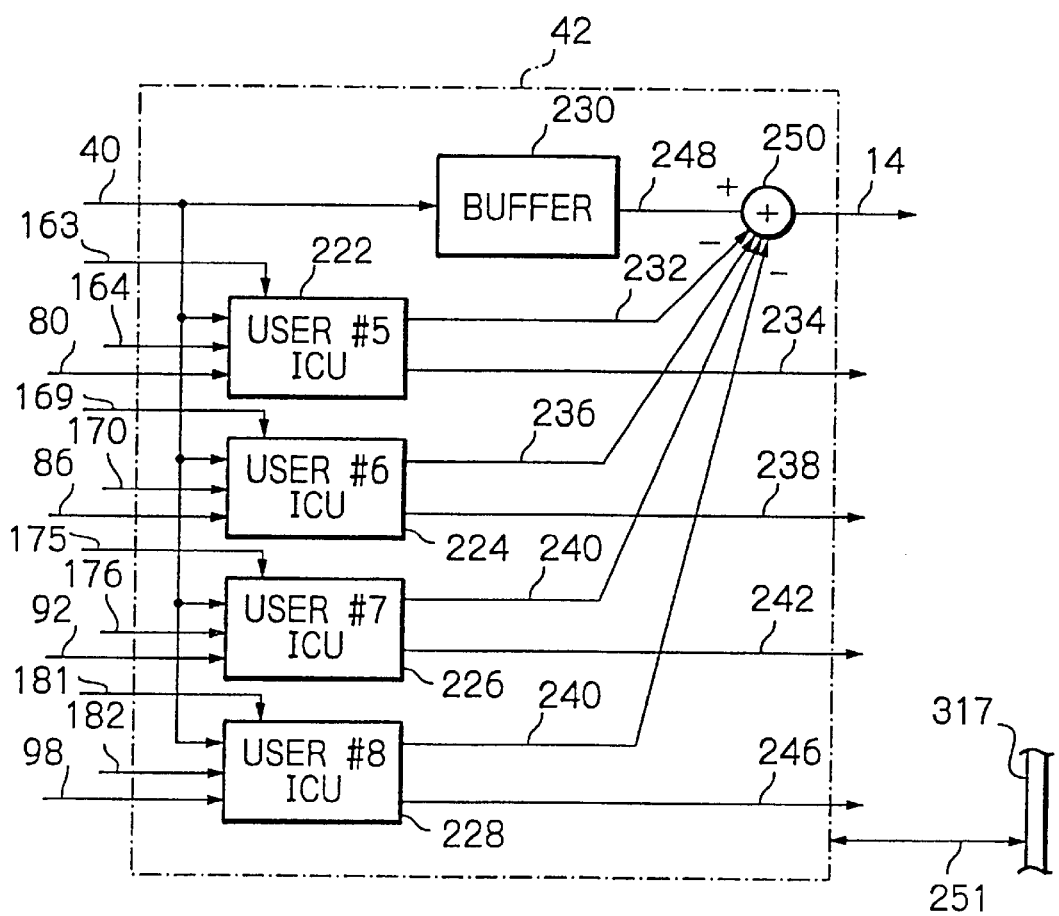

FIG. 11 shows the second ICU group 42 of the third stage 24 in detail. As shown, a user #5 ICU 222 receives the residual signal 40 and the chip clock 80 for synchronous tracking. Further, the ICU 222 receives the signal Present dat (I/Q) 163 subjected to correction and decision at the previous stage as Previous data (I/Q) 163, and receives the user #5 estimated received symbol Present dat1 (I/Q) 164 output from the previous stage as Previous data1 (I/Q) 164. The ICU 222 generates replica data (I/Q) 232 particular to the user #5 and feeds it to an adder 250 as a negative value. Further, the ICU 222 outputs a signal subjected to correction and decision as demodulated user #5 data 234. If desired, the ICU 222 may output data not subjected to correction and decision as the user #1 data.

A user #6 ICU 224 receives the residual signal 40 and the chip clock 86 for synchronous tracking. Further, the ICU 224 receives the signal Present dat (I/Q) 169 subjected to correction and decision at the previous stage as Previous data (I/Q) 169, and receives the user #6 estimated received symbol Present dat1 (I/Q) 170 output from the previous stage as Previous data1 (I/Q) 170. The ICU 224 generates replica data (I/Q) 236 particular to the user #6 and feeds it to the adder 250 as a negative value. Further, the ICU 224 outputs a signal subjected to correction and decision as demodulated user #6 data 238. The ICU 224 may also output data not subjected to correction and decision as the user #6 data.

A user #7 ICU 226 is identical in operation with the user #5 ICU 222 except that it receives the chip clock 92 together with the residual signal 40, receives the signal Present dat (I/Q) 175 as Previous data (I/Q) 175, and receives the estimated received symbol dat1 (I/Q) 176 of the user #7 output from the previous stage as Previous dat1 (I/Q) 176. Then, the ICU 226 generates replica data (I/Q) 240 particular to the user #7 and feeds the data (I/Q) 240 to the adder 250 as a negative value. The ICU 226 outputs a signal subjected to correction and decision as demodulated user #7 data 242. If desired, the ICU 226 may output data not subjected to correction and decision as the user #7 data. A user #8 ICU 228 operates in the same manner as the user #5 ICU 222 except that it receives the chip clock 98 together with the residual signal 40, receives the signal Present dat (I/Q) 181 as Previous data (I/Q) 181, and receives the estimated received symbol dat1 (I/Q) 182 of the user #8 output from the previous stage as Previous dat1 (I/Q) 182. Then, the ICU 228 generates replica data (I/Q) 244 particular to the user #8 and feeds the data (I/Q) 244 to the adder 250 as a negative value. The ICU 228 outputs a signal subjected to correction and decision as demodulated user #8 data 246. If desired, the ICU 228 may output data not subjected to correction and decision as the user #8 data.

A buffer 230 stores the residual signal 40 for a moment. When all the replica data (I/Q) 232, 236, 240 and 244 are fed from the ICUs 222, 224, 226 and 228, respectively, to the adder 250, the buffer 230 reads out the residual signal 40 and feeds it to the adder 250 as a residual signal 248. The adder 250 subtracts the replica data (I/Q) 232, 236, 240 and 244 of the users #5–#8 from the residual signal 246 and outputs the resulting residual signal 14. The circuitry constituting the second ICU group 42 is controlled by a control signal 251 input thereto via the bus 317.

As stated above, the residual signal that has undergone interference cancellations and estimated received symbols Present Data and Previous Data are sent from each stage to the next stage. It follows that an estimated signal input from the previous stage and an estimated signal to be output to the next stage exist in each user ICU together.

FIG. 12 shows a searcher block 260 for feeding the chip clocks to the first ICU groups 26, 32 and 38 of the first, second and third stages 16, 20 and 24, respectively. As shown, the searcher block 260 includes a searcher (SCH) 262 which receives the replica data (I/Q) 200 and residual signal 40 from the user #1 ICU 190 included in the first ICU group of the third stage, acquires synchronization, and delivers a rough code position to a DLL 272 connected thereto as PN (Pseudo random Number) position data 270. The DLL 272 controls the fine fluctuation of the chip clock to be applied to the user #1 ICUs 31, 110 and 190 of the first ICU groups of the first to third stages by tracking control and feeds the controlled chip clock 43 to the ICUs 31, 110 and 190. In FIG. 12, only a single chip clock line 43 is shown because a single multipath is assumed in relation to Rake receipt. In practice, a plurality of chip clock lines 43 will be arranged because a plurality of multipaths exist in many cases.

An SCH 264 receives the replica data (I/Q) 204 and residual signal 40 from the user #2 ICU 192 of the first ICU group 38 of the third stage, acquires synchronization, and delivers a rough code position to a DLL 276 connected thereto as PN position data 274. The DLL 276 controls the fine fluctuation of the chip clock to be applied to the user #2 ICUs 33, 112 and 192 of the first ICU groups of the first to third stages by tracking control and feeds the controlled chip clock 48 to the ICUs 33, 112 and 192. In FIG. 12, only a single chip clock line 48 is shown for the same reason as stated in relation to the SCH 262.

An SCH 266 receives the replica data (I/Q) 208 and residual signal 40 from the user #3 ICU 194 of the first ICU group 38 of the third stage, acquires synchronization, and delivers a rough code position to a DLL 280 connected thereto as PN position data 278. The DLL 280 controls the fine fluctuation of the chip clock to be applied to the user #3 ICUs 35, 114 and 194 of the first ICU groups of the first to third stages by tracking control and feeds the controlled chip clock 54 to the ICUs 35, 114 and 194. In FIG. 12, only a single chip clock line 54 is shown for the same reason as stated in relation to the SCH 262.

An SCH 268 receives the replica data (I/Q) 212 and residual signal 40 from the user #4 ICU 196 of the first ICU group 38 of the third stage, acquires synchronization, and delivers a rough code position to a DLL 284 connected thereto as PN position data 282. The DLL 284 controls the fine fluctuation of the chip clock to be applied to the user #4 ICUs 37, 116 and 196 of the first ICU groups of the first to third stages by tracking control and feeds the controlled chip clock 60 to the ICUs 37, 116 and 196. In FIG. 12, only a single chip clock line 60 is shown for the same reason as stated in relation to the SCH 262.

The above circuitry constituting the searcher block 260 is controlled by a control signal 285 input thereto via the bus 317.

FIG. 13 shows a searcher block 290 for feeding the chip clocks to the second ICU groups 30, 36 and 42 of the first to third stages. As shown, the searcher block 290 includes an SCH 292 which receives the replica data (I/Q) 232 and residual signal 14 from the user #5 ICU 222 of the second ICU group 42 of the third stage, acquires synchronization, and delivers a rough code position to a DLL 302 connected thereto as PN position data 300. The DLL 302 controls the fine fluctuation of the chip clock to be applied to the user #5 ICUs 70, 150 and 222 of the second ICU groups of the first to third stages by tracking control and feeds the controlled chip clock 80 to the ICUs 70, 150 and 222. In FIG. 13, only a single chip clock line 80 is shown because a single multipath is assumed in relation to Rake receipt. In practice, a plurality of chip clock lines 80 will be arranged because a plurality of multipaths exist in many cases.

An SCH 294 receives the replica data (I/Q) 236 and residual signal 14 from the user #6 ICU 224 of the second ICU group 42 of the third stage, acquires synchronization, and delivers a rough code position to a DLL 306 connected thereto as PN position data 304. The DLL 306 controls the fine fluctuation of the chip clock to be applied to the user #6 ICUs 72, 152 and 222 of the second ICU groups of the first to third stages by tracking control and feeds the controlled chip clock 86 to the ICUs 72, 152 and 222. In FIG. 13, only a single chip clock line 86 is shown for the same reason as stated in relation to the SCH 292.

An SCH 296 receives the replica data (I/Q) 240 and residual signal 14 from the user #7 ICU 226 of the second ICU group 42 of the third stage, acquires synchronization, and delivers a rough code position to a DLL 310 connected thereto as PN position data 308. The DLL 310 controls the fine fluctuation of the chip clock to be applied to the user #7 ICUs 74, 154 and 226 of the second ICU groups of the first to third stages by tracking control and feeds the controlled chip clock 92 to the ICUs 74, 154 and 226. In FIG. 13, only a single chip clock line 92 is shown for the same reason as stated in relation to the SCH 292.

An SCH 298 receives the replica data (I/Q) 244 and residual signal 14 from the user #8 ICU 228 of the second ICU group 42 of the third stage, acquires synchronization, and delivers a rough code position to a DLL 314 connected thereto as PN position data 312. The DLL 314 controls the fine fluctuation of the chip clock to be applied to the user #8 ICUs 76, 156 and 228 of the second ICU groups of the first to third stages by tracking control and feeds the controlled chip clock 98 to the ICUs 76, 156 and 228. In FIG. 13, only a single chip clock line 98 is shown for the same reason as stated in relation to the SCH 292.

Figure 14:
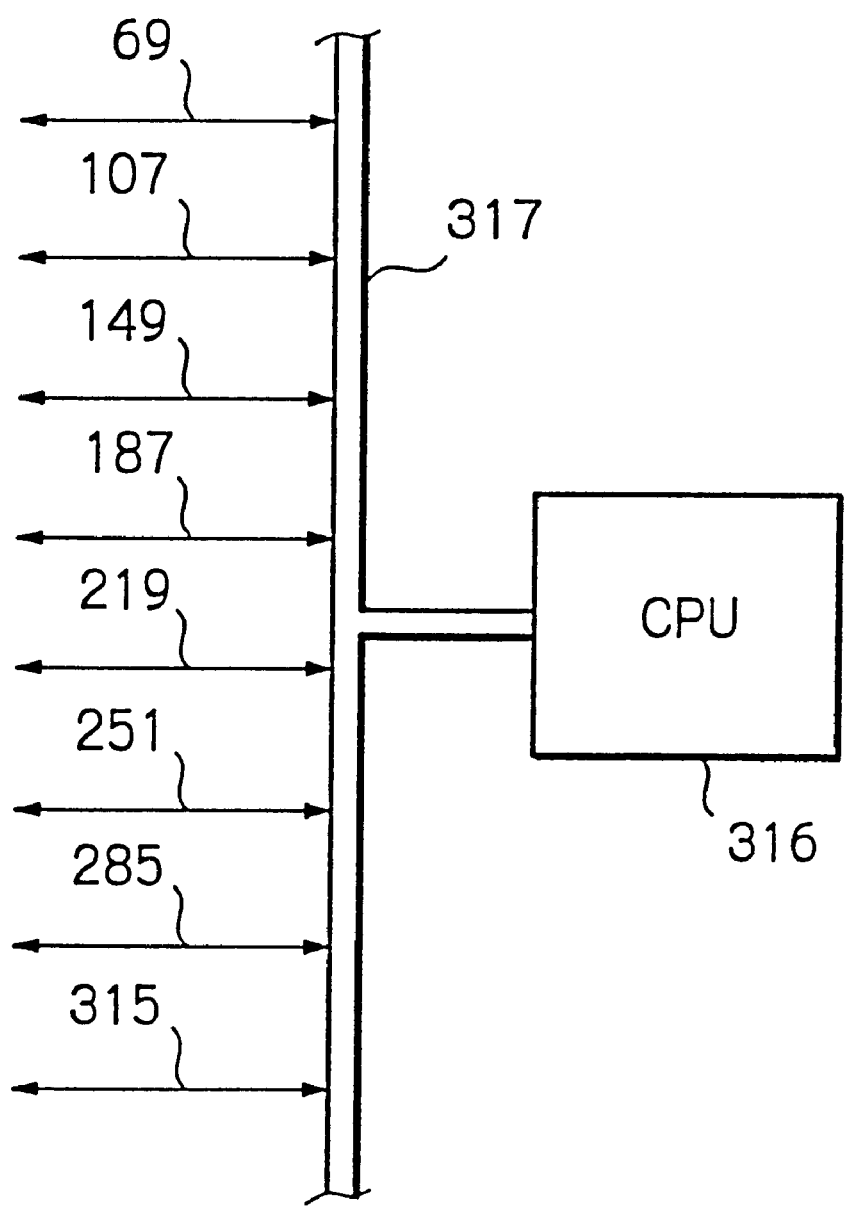
FIG. 14 is a schematic block diagram showing a CPU (Central Processing Unit) also included in the HIC of FIG. 2 for controlling the first to third stages and searcher blocks.

FIG. 14 schematically shows a control system for controlling the first and second ICU groups of the first to third stages and searcher blocks. As shown, the control system includes a CPU (Central Processing Unit) 316. The CPU 316 sends, via the bus 317, the control signal 69 to the first ICU group 26 of the first stage, sends the control signal 107 to the second ICU group 30 of the first stage, sends the control signal 149 to the first ICU group 32 of the second stage, sends the control signal 187 to the second ICU group 36 of the second stage, sends the control signal 219 to the first ICU group 38 of the third stage, sends the control signal 251 to the second ICU group 42 of the third stage, sends the control signal 285 to the searcher block 260 assigned to the first ICU group, and sends the control signal 315 to the searcher block 290 assigned to the second ICU groups.

The circuitry beginning with the first ICU group of the first stage shown in FIG. 6 and ending with the second ICU group of the third stage shown in FIG. 11, the searcher blocks shown in FIGS. 12 and 13 and the control system shown in FIG. 14 may be implemented by hardware in the form of an LSI, an FPGA or a DSP.

Figure 15:
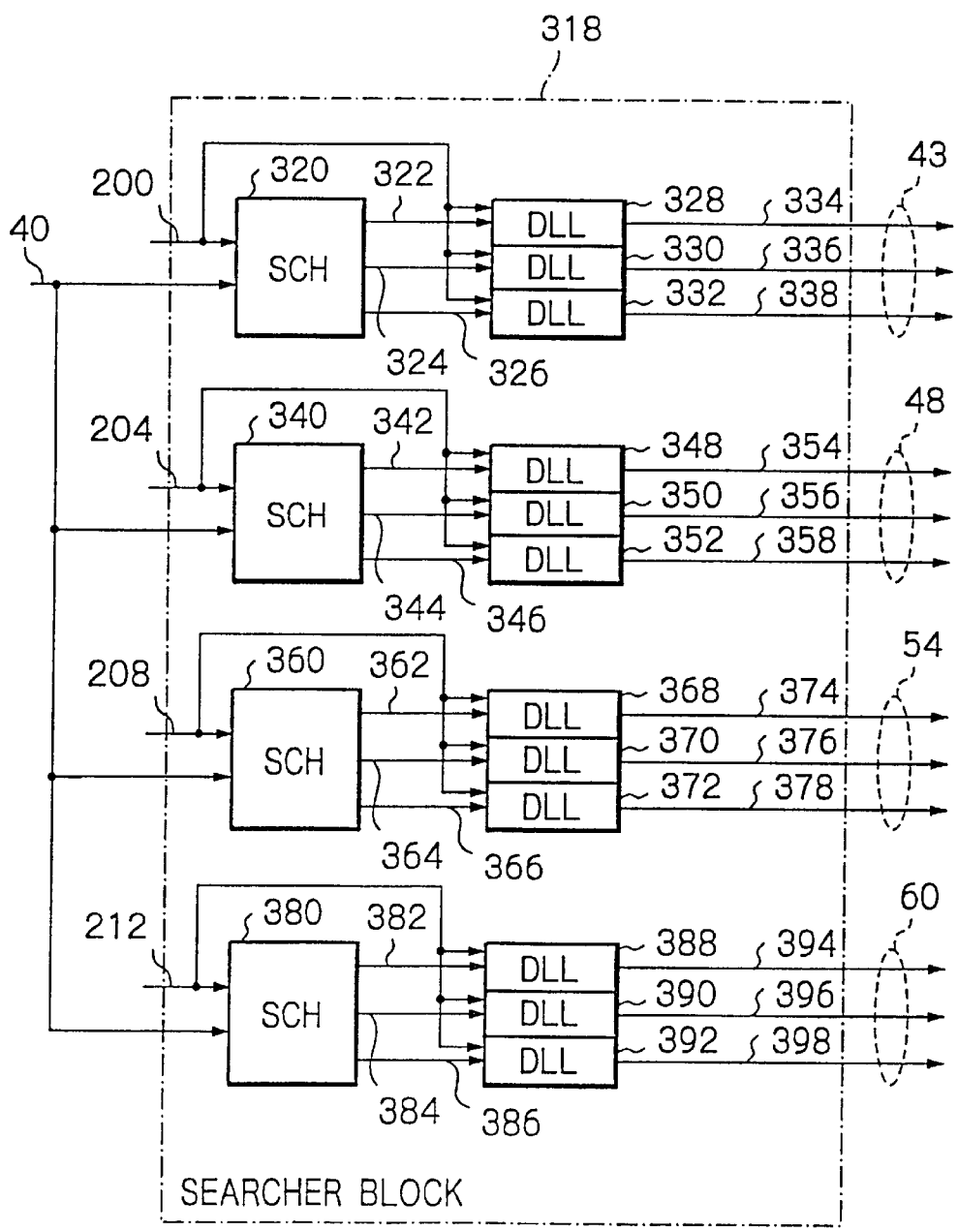
FIGS. 15 and 16 are schematic block diagrams respectively showing searcher blocks respectively assigned to the first and second ICU groups and each being constructed to cope with three multipaths.

Reference will be made to FIG. 15 for describing a searcher block constructed to cause each of the first ICU groups of the first to third stages to perform Rake receipt with three fingers coping with three multipaths by way of example. As shown, the searcher block, generally 318, includes an SCH 320 which receives the replica data (I/Q) 200 and residual signal 40 from the first ICU group 38 of the third stage, acquires synchronization, generates PN position data 322, 324 and 326 respectively meant for the first to third paths, and feeds the data 322, 324 and 326 to DLLs 328, 330 and 332, respectively. In response, the DLLs 328–332 generate chip clocks 334, 336 and 338, respectively, and send them to the user #1 ICUs 31, 110 and 190 included in the first ICU groups 26, 32 and 38 of the first to third stages, respectively, for three-path Rake receipt.

An SCH 340 receives the replica data (I/Q) 204 and residual signal 40 from the first ICU group 38, acquires synchronization, generates PN position data 342, 344 and 346 respectively meant for the first to third paths, and feeds the data 342, 344 and 346 to DLLs 348, 350 and 352, respectively. In response, the DLLs 348–352 generate chip clocks 354, 356 and 358, respectively, and send them to the user #2 ICUs 33, 112 and 192 included in the first ICU groups 26, 32 and 38 of the first to third stages, respectively, for three-path Rake receipt.

An SCH 360 receives the replica data (I/Q) 204 and residual signal 40 from the first ICU group 38, acquires synchronization, generates PN position data 362, 364 and 366 respectively meant for the first to third paths, and feeds the data 362, 364 and 366 to DLLs 368, 370 and 372, respectively. In response, the DLLs 368–372 generate chip clocks 374, 376 and 378, respectively, and send them to the user #3 ICUs 35, 114 and 194 included in the first ICU groups 26, 32 and 38 of the first to third stages, respectively, for three-path Rake receipt.

An SCH 380 receives the replica data (I/Q) 212 and residual signal 40 from the first ICU group 38, acquires synchronization, generates PN position data 382, 384 and 386 respectively meant for the first to third paths, and feeds the data 382, 384 and 386 to DLLs 388, 390 and 392, respectively. In response, the DLLs 388–392 generate chip clocks 394, 396 and 398, respectively, and send them to the user #4 ICUs 37, 116 and 196 included in the first ICU groups 26, 32 and 38 of the first to third stages, respectively, for three-path Rake receipt.

Figure 16:
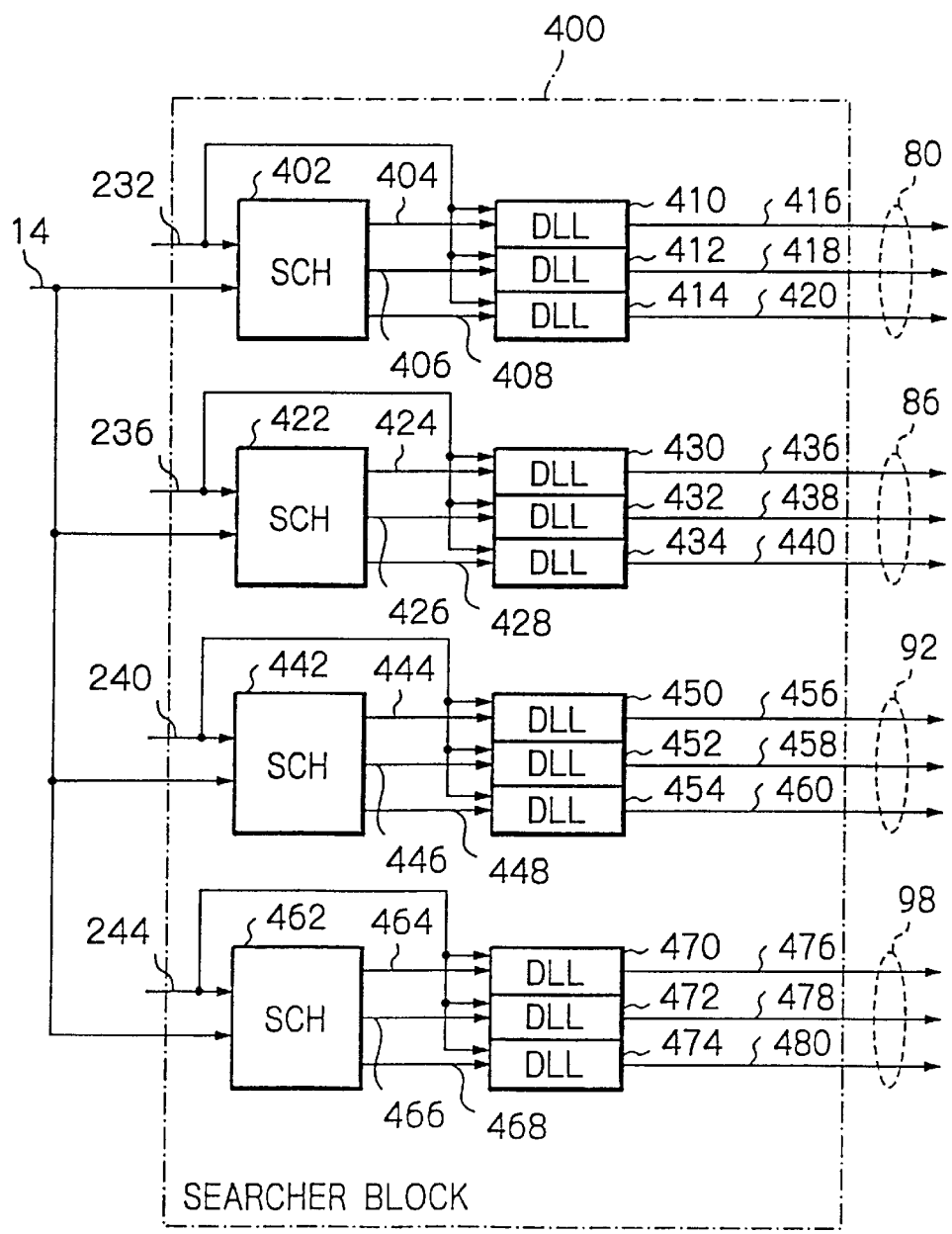

FIG. 16 shows a searcher block 400 necessary for each of the second ICU groups 30, 36 and 42 of the first to third stages to perform Rake receipt with three fingers coping with three multipaths. As shown, an SCH 402 receives the replica data (I/Q) 232 and residual signal 14 from the second ICU group 42 of the third stage, acquires synchronization, generates PN position data 404, 406 and 408 respectively meant for the first to third paths, and feeds the data 322, 324 and 326 to DLLs 410, 412 and 414, respectively. In response, the DLLs 410–414 generate chip clocks 416, 418 and 420, respectively, and send them to the user #5 ICUs 70, 150 and 222 of the second ICU groups 30, 36 and 42 of the first to third stages, respectively, for three-path Rake receipt.

An SCH 422 receives the replica data (I/Q) 236 and residual signal 14 from the second ICU group 42, acquires synchronization, generates PN position data 424, 426 and 428 respectively meant for the first to third paths, and feeds the data 424, 426 and 428 to DLLs 430, 432 and 434, respectively. In response, the DLLs 430–434 generate chip clocks 436, 438 and 440, respectively, and send them to the user #6 ICUs 72, 152 and 224 of the second ICU groups 30, 36 and 42 of the first to third stages, respectively, for three-path Rake receipt.

An SCH 442 receives the replica data (I/Q) 240 and residual signal 14 from the second ICU group 42, acquires synchronization, generates PN position data 444, 446 and 448 respectively meant for the first to third paths, and feeds the data 444, 446 and 448 to DLLs 450, 452 and 454, respectively. In response, the DLLs 450–454 generate chip clocks 456, 458 and 460, respectively, and send them to the user #7 ICUs 74, 154 and 226 of the second ICU groups 30, 36 and 42 of the first to third stages, respectively, for three-path Rake receipt.

An SCH 462 receives the replica data (I/Q) 244 and residual signal 14 from the second ICU group 42, acquires synchronization, generates PN position data 464, 466 and 468 respectively meant for the first to third paths, and feeds the data 464, 466 and 468 to DLLs 470, 472 and 474, respectively. In response, the DLLs 470–474 generate chip clocks 476, 478 and 480, respectively, and send them to the user #8 ICUs 76, 156 and 228 of the second ICU groups 30, 36 and 42 of the first to third stages, respectively, for three-path Rake receipt.

Figure 17:
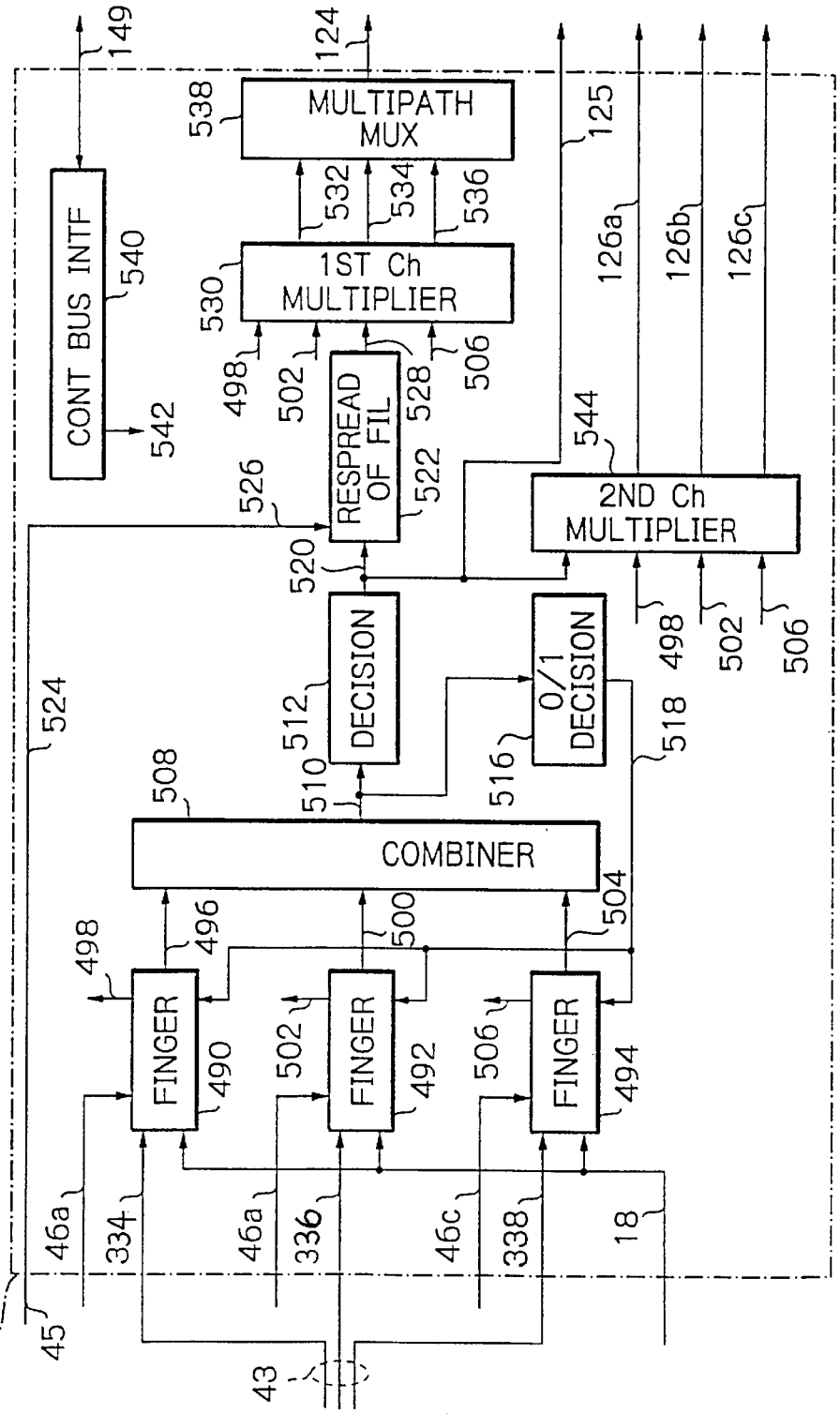
FIG. 17 is a block diagram schematically showing a specific configuration of one of ICUs shown in FIGS. 6–11.

FIG. 17 shows a specific configuration of any one of the ICUs included in the HIC 12. The ICU shown in FIG. 17 is assumed to be the user #1 ICU 10 included in the first ICU group 32 of the second stage by way of example. The ICU 110 assigned to the user #1 has two major functions, i.e., a Rake receipt function and a respread modulation function, and outputs an estimated received symbol and a (corrected) interference estimate. The former half of the ICU 110 up to a signal correction and decision circuit mainly has the conventional Rake receipt function, and additionally has a function of processing the received symbol estimated at the previous stage and a function of estimating a channel. The latter half of the ICU restores the symbol data received and subjected to decision to the same conditions as on the channel, and for this purpose has a respreading function, a transmission filter filter, a function of subtracting the estimated received symbol output from the previous stage, and a function of multiplying channel information.

The circuitry of FIG. 17 assumes three multipaths by way of example and therefore includes three fingers 490, 492 and 494. The SCH 320 and associated DLLs 328, 330 and 332 included in the searcher block 318 of FIG. 15 apply the chip clocks 334, 336 and 338 to the fingers 490, 492 and 494, respectively.

The finger 490 receives the first estimated received symbol Previous data1 (I/Q) 46a particular to the user #1 from the previous stage, chip clock 334, residual signal 18, and hard decision data 518 which will be described later. The finger 490 executes correlation calculation, channel estimation and so forth with the above data and signals and outputs channel data 498 and finger data 496. Specifically, the finger 490 includes a PN generator, a correlator, an adder for adding the estimated received symbol (Previous data) output from the previous stage, and a channel estimator, and demodulates signals on a multipath basis.

The PN generator generates a PN code by using a PN code position selected by the searcher as an initial value. The PN code generation timing of the PN generator is controlled by the DLL tracking the fine fluctuation of the PN code. With the PN code, the finger 490 executes correlation processing or despreading. Specifically, the finger 490 estimates a channel by the addition of an estimated received symbol output from the previous stage, then executes maximum ratio combination with the path-by-path data (in this case, three paths at maximum) by use of a combiner, and then executes correction and decision on the received signal. Subsequently, the finger 490 executes respreading, transmission filter processing and multiplication of channel information in order to restore the received signal to the same conditions as on the channel. As a result, an estimated interference signal particular to data to be transmitted from the base station is produced from the input received signal.

The channel estimate of the ith symbol of the mth stage, kth user and lth path may be expressed as:

$$C_{m,k,l}(i) = 1/(i - io) \sum C_{m,k,l}(w) \quad \text{Eq. (11)}$$

$$w = io \text{ to } i - 1$$

$$mod(i, Ss) \le Ws = 1/Ws \sum C \sim_{m,k,l}(w)$$

$$w = i - Ws \text{ to } i - 1 \text{ otherwise}$$

where io is equal to [i/Ss]Ss, [x] denotes an integer equal to or smaller than x or the greatest integer, Ss denotes a slot size in terms of the number of symbols, and Ws denotes the maximum window size.

The temporary channel estimate of the ith symbol of the mth stage, kth user and lth path is produced by:

$$C_{m,k,l}(i) = \Sigma d^{v*}_{m,g,k}(i)[\Sigma S^*k(n-\tau_{k,l})e_{m,g}(n) + fx(y_{m-l,g,k})(i))C^{\sim}_{m-1,k,l}(i)] \quad \text{Eq. (12)}$$

Estimated data to be used for the ith decision feedback relating to the mth stage, gth group and kth user is expressed as:

$$d^v_{m,g,k}(i) = dk(i) \quad \text{Eq. (13)}$$

$$mod(i, Ss) < Np = d_{m,g,k}(i) \text{ otherwise}$$

where d(k)i denotes the ith transmission data relating to the kth user and known data because it is a pilot signal, $d_{m,g,k}(i)$ denotes a value derived from the hard decision (0/1 decision) of the ith data of the mth stage, gth group and kth user, and Np denotes the width of a pilot symbol section in terms of the number of symbols.

The finger 492 receives the second estimated received symbol Previous data2 (I/Q) 46b particular to the user #1 from the previous stage, chip clock 336, residual signal 18 and hard decision data 518. The finger 492 executes correlation calculation, channel estimation and so forth with the above data and signals and outputs channel data 502 and finger data 500. Likewise, the finger 494 receives the third estimated received symbol Previous data3 (I/Q) 46c particular to the user #1 from the previous stage, chip clock 338, residual signal 18 and hard decision data 518 relating to the user #1. The finger 494 executes correlation calculation, channel estimation and so forth with the above data and signals and outputs channel data 506 and finger data 504.

A combiner 508 combines the finger data 496, 500 and 504 and feeds the resulting composite signal 510 to a decision circuit 512. Specifically, the combiner 508 adjusts the delay times of the signals output from the fingers 490–494 and adds identical symbols (maximum ratio combination). If the power of any one of the fingers 490–494 is lower than a preselected combination threshold, then the signal output from that finger is not added. The fingers each corresponds to a particular multipath detected by the searcher. Paths greater in number than the maximum number of fingers cannot be demodulated. Further, if the number of paths detected by the searcher is smaller than the number of fingers, then some of the fingers will not be used. Even when the number of paths assigned by the searcher is less than three, the unassigned path is held in its OFF state, and the combiner 508 neglects the signal output from the unassigned path.

The decision circuit 512 executes correction and decision on the composite signal 510 subjected to maximum ratio combination by the combiner 508, while distinguishing the I and Q phases or channels of the signal 510 (represented by coefficient in the drawing).

Specifically, the decision circuit 512 normalizes the input signal 510, multiplies the normalized signal by a coefficient corresponding to a slope, and limits the resulting signal with a threshold corresponding to the maximum value, thereby correcting the signal 510. With this procedure, the decision circuit 512 outputs a corrected signal 520. This noticeably accelerates the convergence of the canceller and thereby improves the demodulating ability to a significant degree. The composite signal 510 is applied to a O/1 decision circuit 516 also. The O/1 decision circuit 516 performs hard decision-making on the input signal 510 by use of a preselected threshold and feeds the resulting (logical) 1 or logical) 1 (hard decision data) 518 to the fingers 490–494. For the hard decision, the 0/1 decision circuit 516 selects only a flag and determines whether each received data is +1 or −1. The result of this decision is a received symbol determined at this stage. Further, when channel estimation is implemented by the decision feedback system, the result of decision is used as the data phase of each symbol for eliminating the data phase.

The corrected signal 520 output from the decision circuit 512 is fed out as the corrected signal Present dat (I/Q) 125 and delivered to a respreading and filter (Respread & Fil) 522 and a second channel multiplier (2nd Ch Multiplier) 544. The respreading and filter 522 receives, as the Previous data (I/Q) 45, the signal Present dat (I/Q) 45 corrected and decided at the previous stage, receives chip clocks 526a and PN dat 526b (see FIG. 20, described below), and executes respreading and transmission filter processing. The resulting signal 528 output from the respreading and filter 522 is applied to a first channel multiplier (1 st Ch Multiplier) 530. The decision signal output from the previous stage, i.e., the previous data at this stage or Present data at the previous stage is subtracted from the above decision signal Present dat; the subtraction is effected with identical symbols. With this subtraction, it is possible to cancel a difference between the current signal and the signal cancelled at the previous stage as a corrected interference estimate signal of this stage. This is followed by spreading (respreading) using a PN code and transmission filter processing in the same manner as at the transmitting side.

Subsequently, the symbol-by-symbol channel estimates on the individual paths output from the former half or channel estimation circuit of the ICU 110 are multiplied in order to restore the same phases and amplitudes as on the channel. The signals each are delayed in accordance with the delay of the associated path, and then the paths are added together in order to output a corrected interference estimate signal. Each ICU belonging to the same group outputs such a corrected interference estimate signal. The interference signals output from the ICUs are added up within the group, and the resulting sum is subtracted from the input to each ICU. At this instant, the signals input to the individual ICUs of the same group are delayed such that interference cancellation occurs at the same sampling period.

The first channel multiplier 530 multiplies the signal 528 output from the respreading and filter 522 by each of the channel data 498, 502 and 506 output from the fingers 490, 492 and 494, respectively. The resulting three products 532, 534 and 536 are applied to a multipath multiplexer (Multipath Mux) 538. The multipath multiplexer 538 multiplexes the input signals 532, 534 and 536 and outputs a multiplexed signal or corrected interference estimate signal 124.

The second channel multiplier 544 multiplies the decision signal 520 by each of the channel data 498, 502 and 506 and outputs the resulting three products as user #1 estimated received symbols Present dat1, dat2 and dat3 (I/Q) 126a, 126b and 126c to be sent to the next stage. To control the circuitry constituting the ICU, a control bus interface (Cont Bus Intef) 540 receives the control signal 149 via the bus 317 and, in turn, outputs a control signal 542.

Figure 18:
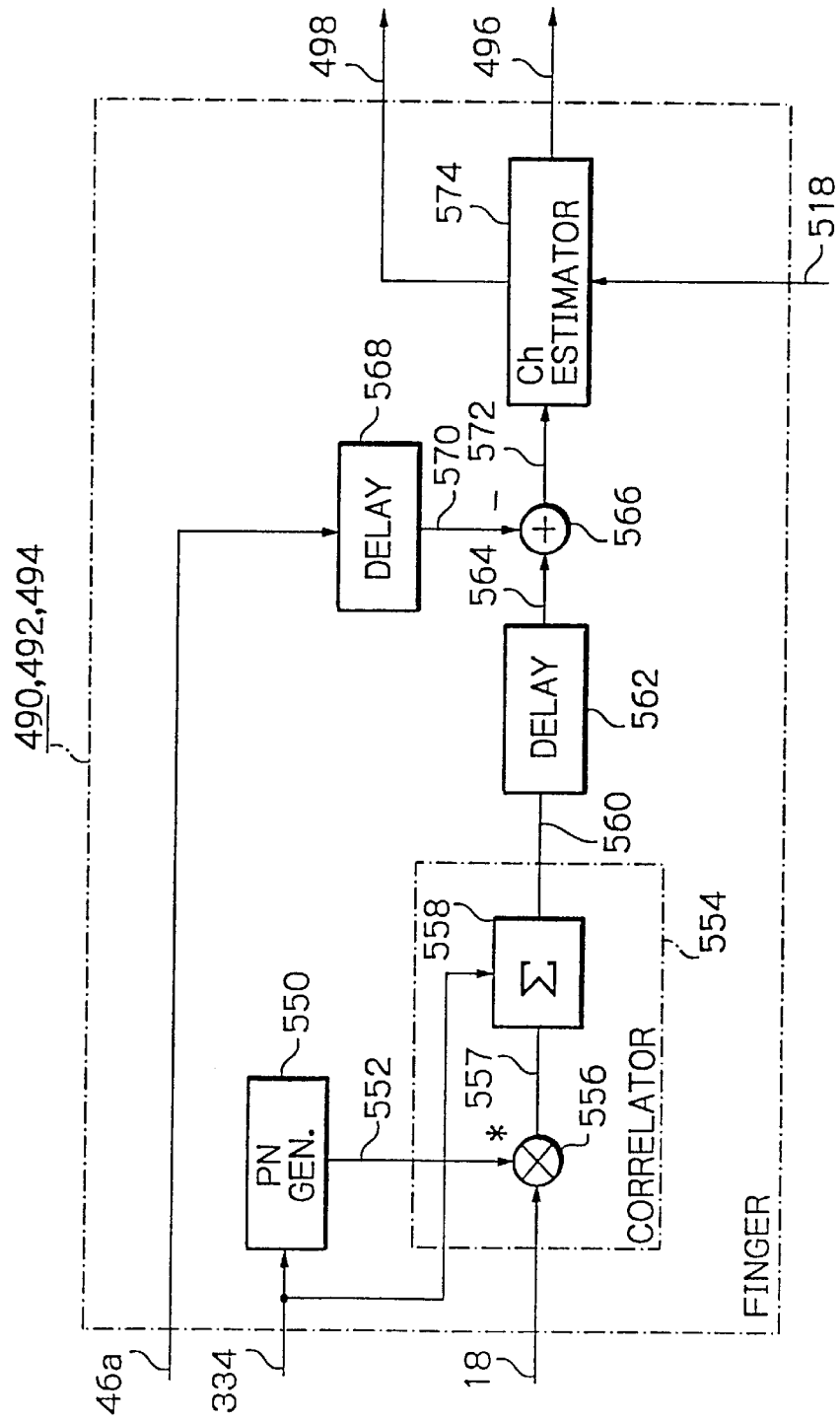
FIG. 18 is a schematic block diagram showing a specific configuration of one of finger circuits included in the ICU of FIG. 17.

FIG. 18 shows a specific configuration of the finger 490, FIG. 17, although it also applies to the other fingers 492 and 494. As shown, the finger 490 includes a correlator 554 made up of a multiplier 556 and an integrator 558. The multiplier 556 multiplies the residual signal 18 by a PN code 552 by complex conjugate "*" and delivers the resulting product 557 to the integrator 558. A PN generator (PN Gen) 550 receives the chip clock 334 from the DLL 328 of the searcher block 318, FIG. 15, and outputs the above PN code 552. The PN code 552 is applied to the multiplier 556 in the form of a conjugate complex number "*".

Specifically, the PN generator 550 sets the PN code position of the multipath selected by the searcher in its register as an initial value and generates a PN code matching with a particular station and a particular path. The pseudo random code to be output by the PN generator 50 may be implemented by an M sequence by way of example. Because the timing for generating the PN code varies in accordance with the channel condition and the deviation of clocks between a transmitter and a receiver, the DLL corrects the fine fluctuation of the PN code by tracking control. The searcher and DLL will be described in detail later. The output PN code and input data each is a complex number and has two phases, i.e., I (Inphase) and Q (Qaudrature phase). In this example, a complex PN code is used. But, also a real PN code can be used. The data 18 input to the finger 490 is multiplied by the conjugate complex number of the PN code, and the resulting product is integrated by the integrator 558 in order to effect correlation detection. The integration time for correlation detection corresponds to one symbol.

For the above purpose, the integrator 558 receives a product 557 from the multiplier 556 so as to integrate it symbol by symbol. The result of integration 560 is applied from the integrator 558 to a delay 562 and delayed thereby. The output 564 of the delay 562 is fed to an adder 566 included in a subtracting section. Another delay 568 receives the user #1 estimated received symbol Previous dat1 (I/Q) 46a output from the user #1 ICU 31 of the previous stage, delays it, and feeds the delayed signal 570 to the adder 566 in the form of a negative value. The adder 566 subtracts the signal 570 from the signal 564 and delivers a residual 572 to a channel estimator (Ch Estimator) 574.

As stated above, the estimated symbol signal output from the previous stage is added to the correlation result in order to estimate path-by-path symbols at the current stage. At the first stage, no estimated symbols from the previous stage exist. The previous stage estimated symbol signals are added to the same symbols of the current stage. The results of addition are used to estimate a channel and to restore phases. That is, conjugate complex numbers resulting from channel estimation are multiplied in order to restore the phases rotated on the channels to the phases of the original data. The channel estimator 574 receives the hard decision data 518 and estimates a channel on the basis of the residual 572, thereby outputting the channel data 498 and finger data 496.

Figure 19:
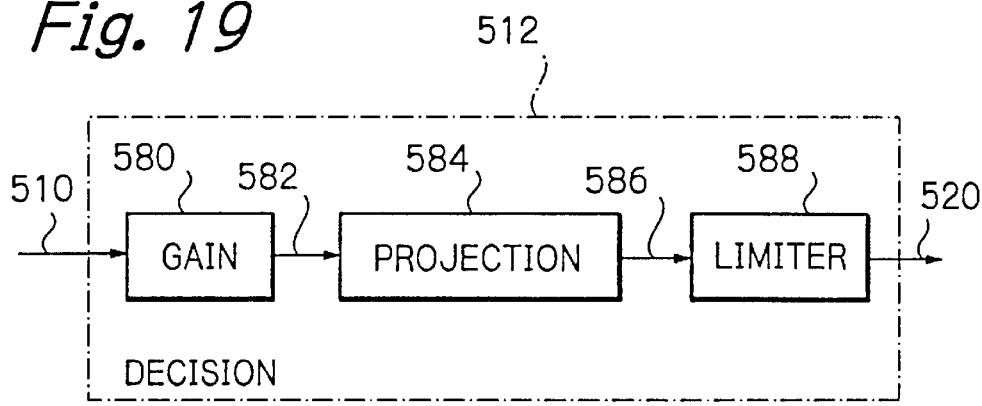
FIG. 19 is a schematic block diagram showing a specific configuration of a decision circuit included in the ICU of FIG. 17.
Figure 20:
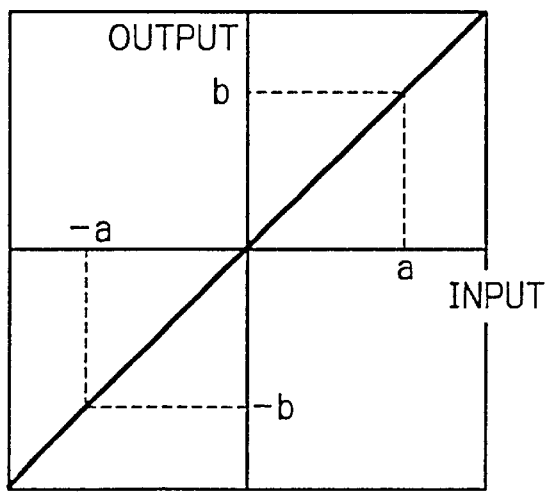
FIG. 20 shows a slope coefficient particular to a slope circuit (Projection) included in the decision circuit of FIG. 19.

FIG. 19 shows a specific configuration of the decision 512, FIG. 17. As shown, the decision 512 includes a gain control circuit (Gain) 580 for receiving the I and Q phases of the signal 510 output from the combiner 508, adjusting the gain of the signal 510, and outputting the resulting signal 582. A slope coefficient circuit (Projection) 584 multiplies the output 582 of the gain control circuit 580 by a slope coefficient and outputs a product signal 586. FIG. 20 is a graph showing slope coefficients. As shown, the relation between an input and an output is represented by the slope coefficients b/a.

Figure 21:
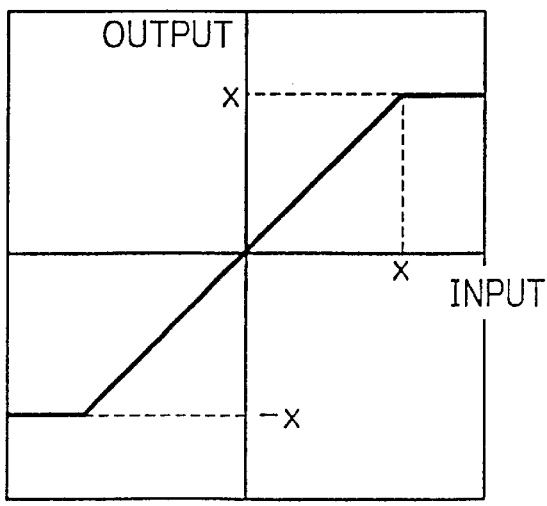
FIG. 21 shows how a limiter included in the decision of FIG. 19 limits an output.

The slope coefficient circuit 584, FIG. 19, is followed by a limiter 588. The limiter 588 limits the output 586 of the circuit 584 with a preselected limit value and outputs a limited signal or decision signal 520. FIG. 21 is a graph demonstrating the limiting function assigned to the limiter 588. As shown, the signal 586 is limited by preselected limit values x and −x.

For normalization in the correction and decision step, use is made of either the total power of the path-by-path channel estimates or the moving average of the power of the decision input signal. The result of decision and values produced by multiplying the result of decision by the channel estimates of the propagation paths are sent to the next stage as signals Present dat and Present Dat1. The signals Present dat are used in the fingers of the ICUs of the next stage as previous stage estimated received symbols. While the correction and decision step is assumed to be executed with each of the I and Q phases, the limiter 588 may be so constructed as to limit the size of a vector formed by the I and Q phases although this alternative scheme will somewhat deteriorate the performance and complicate the construction.

Figure 22:
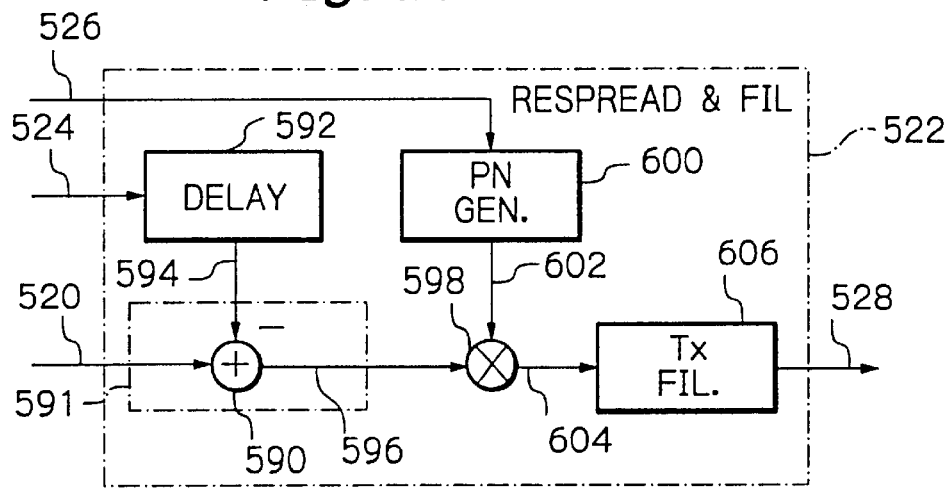
FIG. 22 is a schematic block diagram showing a specific configuration of a respreading and filter circuit included in the ICU of FIG. 17.

FIG. 22 shows a specific configuration of the respreading and filter 522, FIG. 17. As shown, the respreading and filter 522 includes a delay 592. The delay 592 receives the signal Present dat (I/Q) 45 output from the ICU of the previous stage as a Previous data (I/Q) signal 524, delays it, and feeds its output or delayed signal 594 to an adder 590 in the form of a negative value. The adder 590 subtracts the delayed signal 594 from the signal 520 output from the decision circuit of the current stage and feeds the result of subtraction 596 to a multiplier 598. A PN generator (PN Gen) 600 receives the chip clockwise 586, outputs a PN code 602 in the form of a conjugate complex number, and delivers the PN code 602 to a multiplier 598. The multiplier 598 multiplies the residual 596 by the PN code 602 and feeds its output or product 604 to a transmission filter (Tx Fil) 606. As a result, a signal 528 lying in a preselected frequency band is passed through the filter 606.

Figure 23:
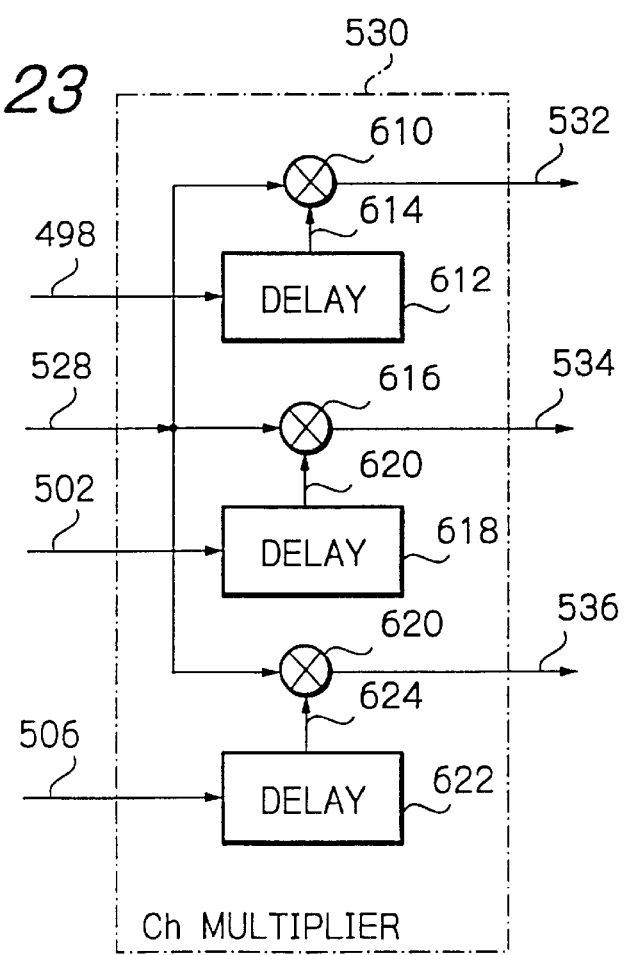
FIG 23 is a schematic block diagram showing a specific configuration of a first channel multiplier included in the ICU of FIG. 17.

FIG. 23 shows a specific configuration of the first channel multiplier 530, FIG. 17, for channel reproduction. As shown, the channel multiplier 530 includes multipliers 610, 616 and 620 to which the signal 528 output from the transmission filter 606 is input. The first path channel data 498, second path channel data 502 and third path channel data 506 output from the finger 490, FIG. 17, are applied to delays 612, 618 and 622, respectively. The delay 612 delays the channel data 498 and feeds a delayed signal 614 to the multiplier 610. The multiplier 610 multiplies the signal 528 by the delayed signal 614 and outputs a product 532 representative of the restored channel of the first path. Likewise, the delay 618 delays the channel data 502 and feeds a delayed signal 620 to the multiplier 616. The multiplier 616 multiplies the signal 528 by the delayed signal 620 and outputs a product 534 representative of the restored channel of the second path. Further, the delay 622 delays the channel data 506 and feeds a delayed signal 624 to the multiplier 620. The multiplier 620 multiplies the signal 528 by the delayed signal 624 and outputs a product 536 representative of the restored channel of the third path.

Figure 24:
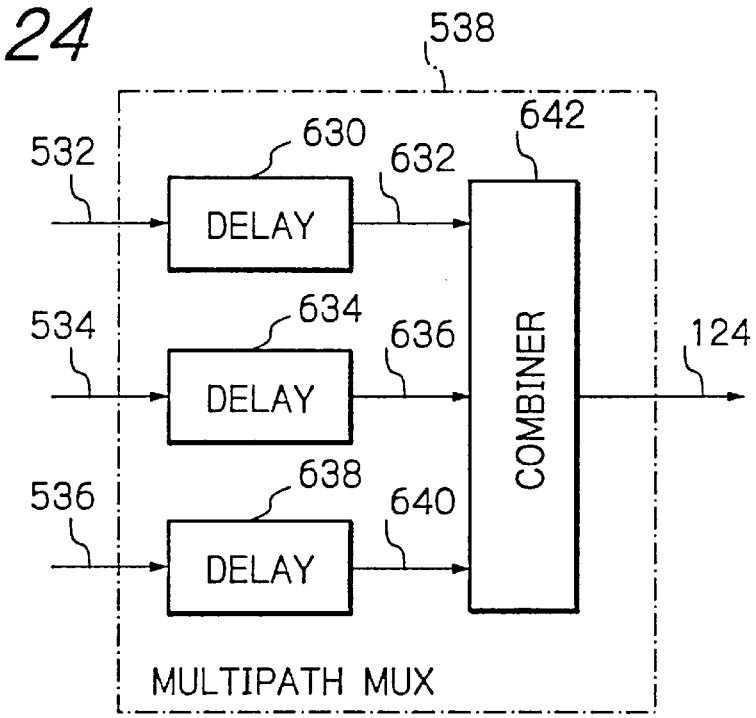
FIG. 24 is a schematic block diagram showing a specific configuration of a multipath adder included in the ICU of FIG. 17.

FIG. 24 shows a specific configuration of the multipath multiplexer 538, FIG. 17. As shown, the multiplexer 538 includes delays 630, 634 and 638 to which the signals 532, 534 and 534 output from the multipliers 610, 616 and 620 are respectively applied. The delay 630 delays the signal 532 and feeds a delayed signal 632 to a combiner 642. Likewise, the delay 634 delays the signal 534 and feeds a delayed signal 636 to the combiner 642. Further, the delay 638 delays the signal 536 and feeds a delayed signal 640 to the combiner 642. The combiner 642 combines the delayed signals 632, 636 and 640 at the same timing so as to produce a corrected interference estimate signal (replica data) 124.

Figure 25:
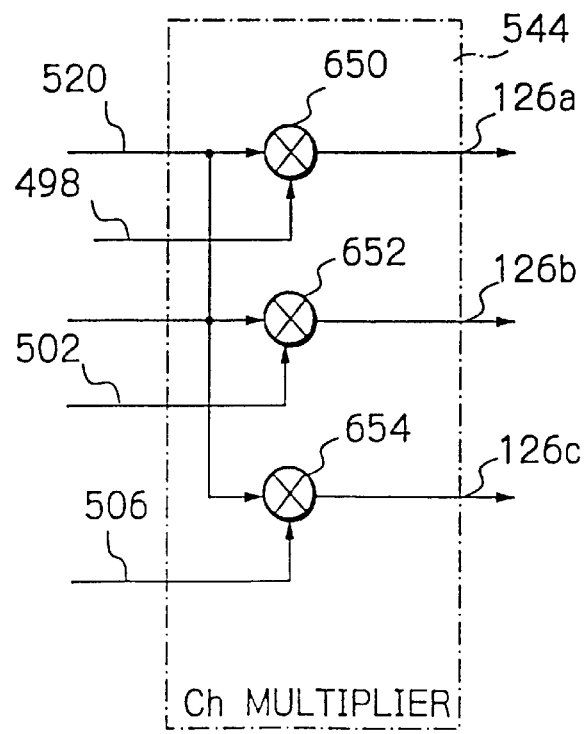
FIG. 25 is a schematic block diagram showing a specific configuration of a second channel multiplier included in the ICU of FIG. 17.

FIG. 25 shows a specific configuration of the second channel multiplier 544, FIG. 17. As shown, the channel multiplier 544 is made up of multipliers 650, 652 and 654 to all of which the decision signal 520 is applied. The multiplier 650 multiplies the decision signal 520 by the first path channel data 498 output from the finger 490 and feeds a product 126a as a user #1 estimated received symbol Present dat1 (I/Q) 126a to be sent to the next stage. Likewise, the multiplier 652 multiplies the decision signal 520 by the second path channel data 502 output from the finger 492 and feeds a product 126b as a user #1 estimated received symbol Present dat2 (I/Q) 126b to be sent to the next stage. Further, the multiplier 654 multiplies the decision signal 520 by the third path channel data 506 output from the finger 494 and feeds a product 126c as a user #1 estimated received symbol Present dat3 (I/Q) 126c to be sent to the next stage.

Figure 26:
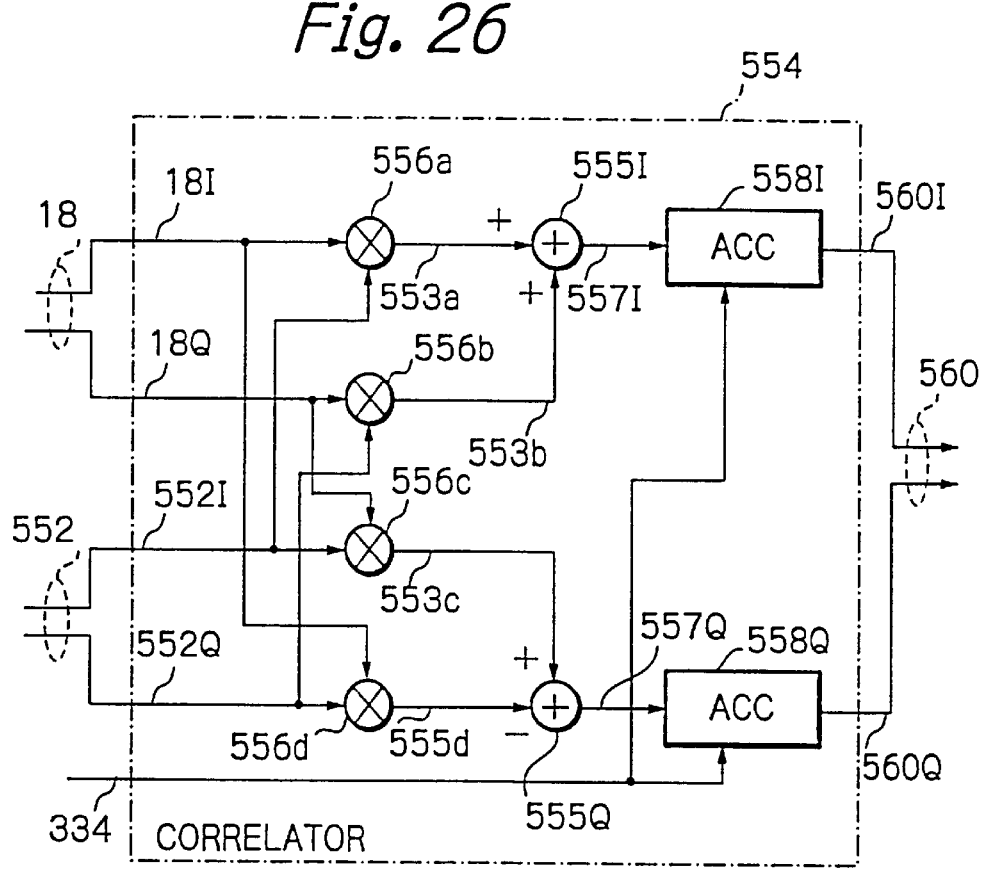
FIG. 26 is a schematic block diagram showing a correlator included in the finger circuit of FIG. 18.

FIG. 26 shows a specific configuration of the correlator 554, FIG. 18. As shown, the correlator 554 includes a multiplier 556a for multiplying a residual signal (I phase) 18I received from the previous stage by a PN code (Q phase) 552Q and feeding a product 553a to an adder 555I. A multiplier 556b multiplies a residual signal (Q phase) 18Q received from the previous stage by the PN code (Q phase) 552Q and feeds a product 553b to the adder 555I. The adder 555I adds the residual signal (Q phase) 18Q and PN code (Q phase) 552Q and delivers a sum 557I to an accumulator (ACC) 558I. The accumulator 558I integrates the sum 557I for every symbol of the chip clock 334 input from the DDL and outputs the result of integration 560I as a correlation detection output.

The multiplier 556c multiplies a residual signal (Q phase) 18Q received from the previous stage by a PN code (I phase) 552I and feeds a product 553c to an adder 555Q. A multiplier 556d multiplies a residual signal (I phase) 18I received from the previous stage by the PN code (Q phase) 552Q and feeds a product 555d to the adder 555Q in the form of a negative value. The adder 555Q subtracts the product 555d from the product 553c and feeds a residual 557Q to an accumulator (ACC) 558Q. The accumulator 558Q integrates the residual 557Q for every symbol of the chip clock 334 input from the DLL and outputs the result of integration 560Q as a correlation detection output.

Figure 27:
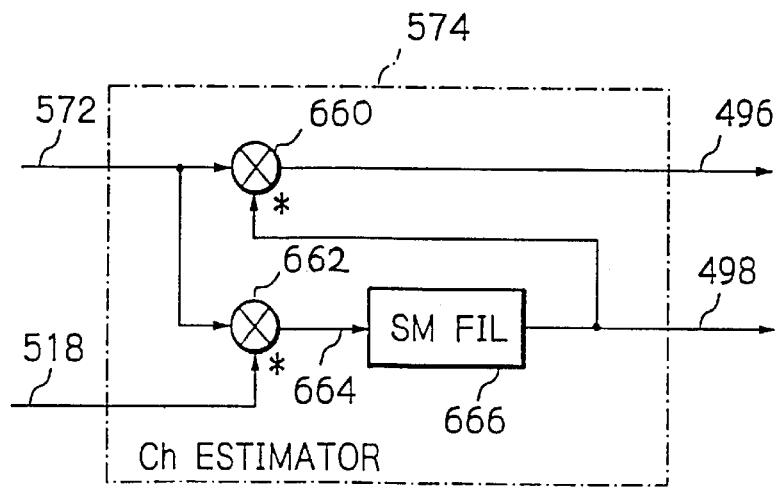
FIG. 27 is a schematic block diagram showing a channel estimator included in the finger circuit of FIG. 18.

FIG. 27 shows a specific configuration of the channel estimator 574, FIG. 18. As shown, the channel estimator 574 includes multipliers 660 and 662 to which the residual 572 output from the adder 566, FIG. 18, is applied. The multiplier 662 multiplies the hard decision data or conjugate complex number (I/Q) 518 by the residual 572 and feeds a product 664 to a smoothing filter or moving average filter (Sm Fil) 666. The smoothing filter 666 filters the product 664 and outputs the result of smoothing as the channel data (I/Q) 498, while delivering the channel data (I/Q) 498 to the multiplier 660. The multiplier 660 multiplies the channel data (I/Q) or conjugate complex number "*" 498 by the residual 572 and outputs the resulting product as the finger data 496.

Figure 28:
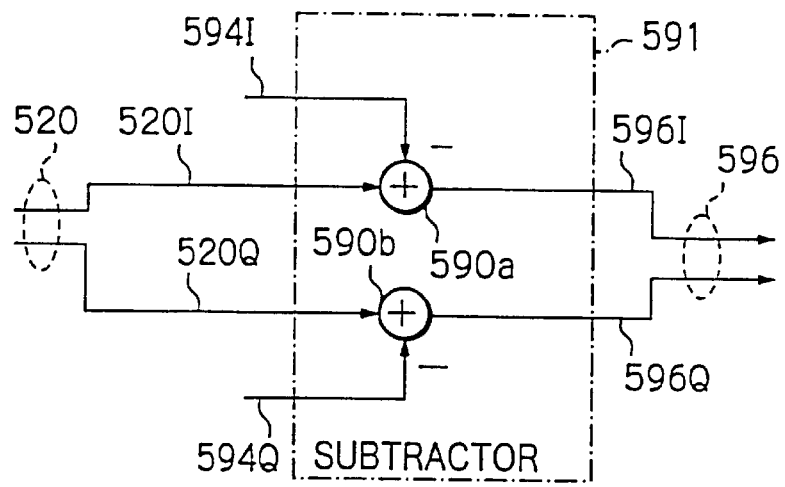
FIG. 28 is a schematic block diagram showing a subtracting section included in the respreading and filter circuit of FIG. 22.

FIG. 28 shows a specific configuration of the subtracting section 591 included in the respreading and filter 522, FIG.

22. As shown, the subtracting section 591 includes an adder 590*a* receiving the signal (I phase) 520I output from the signal correction and decision circuit of the current stage and an I phase delayed signal 594I. The I phase delayed signal 594I is produced by taking in the signal Present Dat (I/Q) 45 output from the ICU of the previous stage as Previous dat (I/Q) signal 524 and then delaying it. The adder 590*a* subtracts the delayed signal 594I from the signal 520I and outputs a residual 596I. An adder 590*b* receives the Q phase signal 520Q output from the decision circuit of the current stage and a Q phase delayed signal 594Q produced by delaying the above Previous dat (I/Q) signal 524. The adder 590*b* subtracts the delayed signal 594Q from the signal 520Q.

Figure 29:
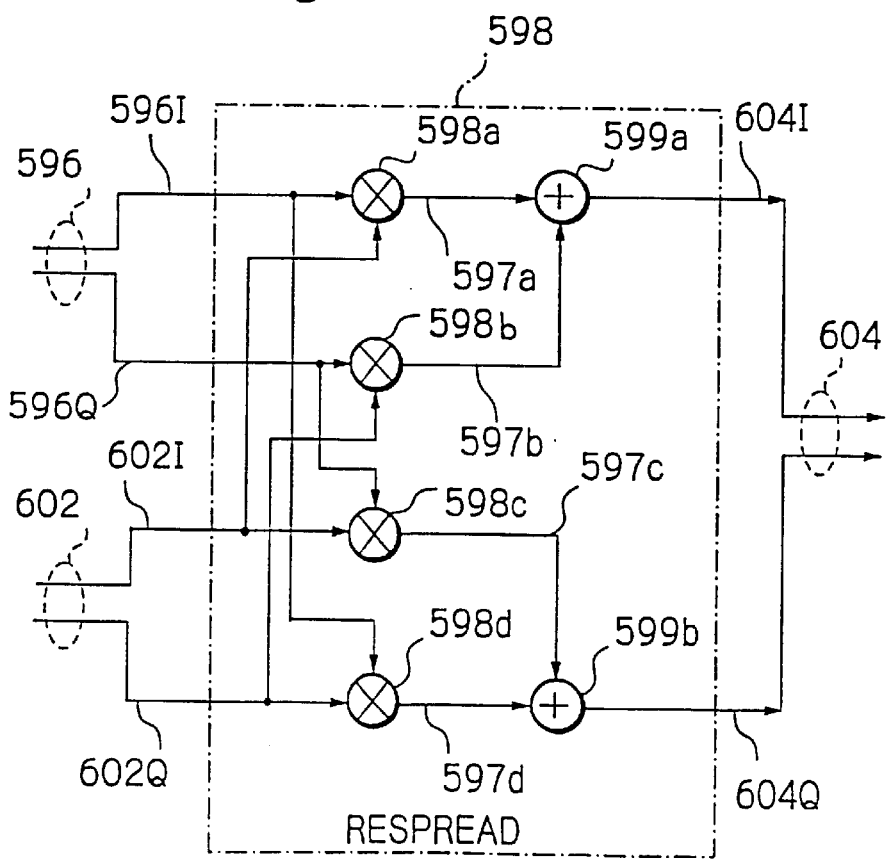
FIG. 29 is a schematic block diagram showing a respreading section included in the circuit of FIG. 22.

FIG. 29 shows a specific configuration of the multiplier 598 included in the respreading and filter 522, FIG. 22. As shown, the multiplier 598 is made up of multipliers 598*a*, 598*b*, 598*c* and 598*d*, and adders 599*a* and 599*b*. The multiplier 598*a* multiplies the I phase residual 596I output from the subtracting section 591 and the I phase PN code 602I and feeds a product 597*a* to the adder 599*a*. The multiplier 598*b* multiplies the Q phase residual 596Q by the Q phase PN code 602Q and feeds a product 597*b* to the adder 599*a*. The adder 599*a* adds the products 597*a* and 597*b* and delivers a sum 604I to the transmission filter circuit. The multiplier 598*c* multiplies the Q phase residual 596Q by the I phase PN code 602I and feeds a product 597*c* to the adder 599*b*. The multiplier 598*d* adds the I phase residual 596I and Q phase PN code 602Q and delivers a product 597*d* to the adder 599*b*. The adder 599*b* adds the products 597*c* and 597*d* and delivers a sum 604Q to the transmission filter circuit.

How the channel estimator 574, FIG. 27, executes channel estimation will be described in detail. The above HIC type interference cancellation system is effective in any kind of channel estimation system. Because an interference cancellation receiver helps the base station estimate channels, it is not necessary to use an advanced sophisticated channel estimation system although the receipt characteristic, of course, depends on the ability of the receiver. However, should the conventional channel estimation scheme involving a considerable delay be applied to an interference canceller, the overall processing delay would be critically great; assuming the two-group, three-stage HIC described above, then the processing delay would be quintuple or more. Because such a delay delays not only data demodulation but also the input of signals to searchers, the assignment of paths to fingers by the searchers is delayed. As a result, the duration of a condition wherein correct paths are not assigned is extended, increasing the error rate. For this reason, a channel estimator with a minimum of delay is required.

While the channel estimation system depends on the communication system and channel configuration, hereinafter will be described a system for implementing channel estimation applicable to a case wherein known signals (pilot symbols) are inserted in a traffic channel by time division.

Figure 30:
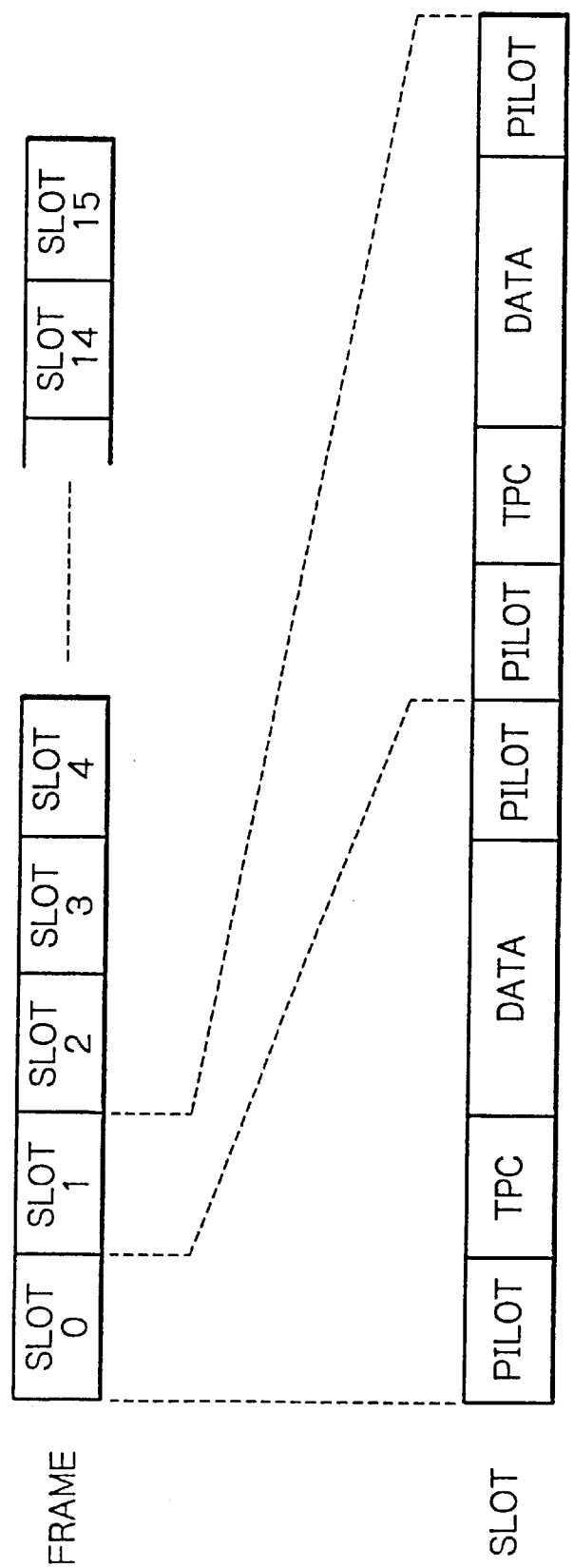
FIG. 30 shows a format of a signal received from transmitting stations.

FIG. 30 shows slots assigned to signals to be transmitted. As shown, a frame is made up of a plurality of slots each consisting of pilot symbols, a signal (TPC) for controlling transmission power, data or information, and pilot symbols. Eight pilot symbols inserted in each slot of data to be transmitted are known beforehand and used to estimate a channel. A conventional Rake receiver estimates a channel by using the pilot symbols of several slots. This system would critically aggravate the delay of channel estimation if applied to the ICS. In light of this, the channel estimator 574 uses the data portion of the slot in order to realize delay-free channel estimation.

Because the data portion includes both the phase of a channel and the phase of data, the phase of the data is eliminated by use of the result of signal decision. This will be referred to as decision feedback. The moving average of, among the correlation detection data whose data phase has been eliminated, several symbols is output as channel estimation information. Then, the correlation detection output is multiplied by the complex conjugate of the channel estimation information. The resulting product is output from a finger. The result of signal decision to be used in the following procedure is the result of hard decision executed by the 0/1 decision circuit 516, FIG. 18. Channel estimation is executed with the individual multipath or individual finger, as will be described in detail hereinafter.

To implement the above procedure, decision on the data should be executed first. Therefore, channel estimation using only the pilot symbol section is executed first and used to restore the rotated phase of the first data symbol immediately following the pilot symbol section. The data symbol is demodulated by the individual finger circuit. A signal appearing in the pilot symbol section is input to the moving average filter 666, FIG. 27.

Subsequently, a hard decision value derived from the demodulation of the data is fed back to the channel estimation circuit of each finger in order to eliminate the data phase of the next correlation detection output. The resulting data is input to the moving average filter 666. At this stage of processing, the pilot symbol section and a single data symbol exist in the filter 666 together. The filter 666 produces a mean of the pilot symbol section and data symbol as the result of current channel estimation. The mean is used by each finger to demodulate the second data symbol following the first data symbol. This is followed by the same processing as executed with the first data symbol. Such a procedure is repeated to sequentially estimate the channels of the consecutive data symbols by use of the current data and past data.

Figure 31:
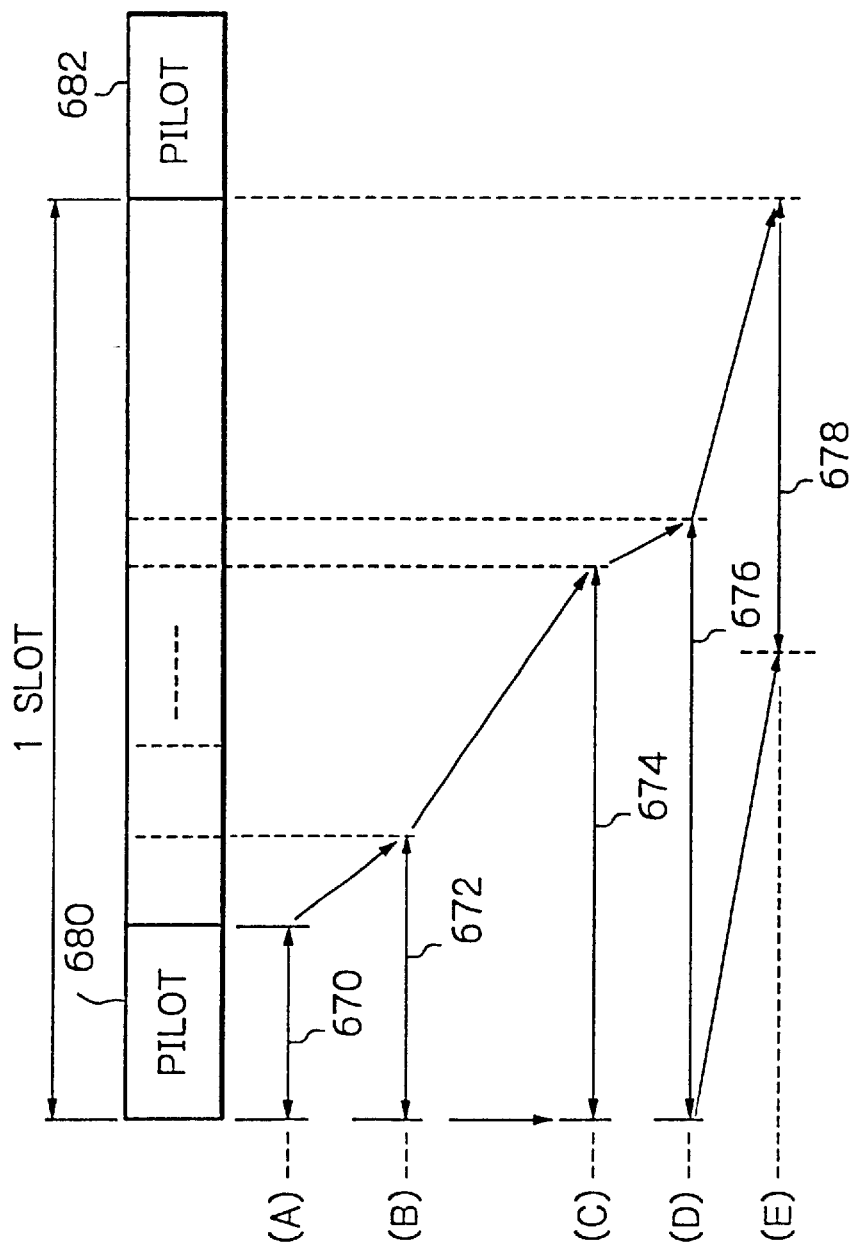
FIG. 31 demonstrates the movement of a window assigned to the channel estimator.

Consequently, the number of symbols input to the moving average filter 666 increases up to the number of taps of the filter 666. After the number of symbols has reached the number of taps, the filter 666 outputs usual moving averages. FIG. 31 demonstrates the movement of a window available with the filter 666. As shown, a window 670 slides in a slot from a pilot symbol section 680 up to the last data symbol of the slot immediately preceding the next pilot symbol section 682. After the above data symbol has been demodulated, information input to the filter 666 is cleared. Then, channel estimation is repeated by using only the first pilot symbol section 680 and data symbols following it. That is, the window size of the filter 666 is sequentially increased, as represented by the window 670 and successive windows 672–678, until the number of symbols coincides with the number of taps of the filter 666. This movement of the window is repeated with each of the consecutive time slots.

Figure 32:
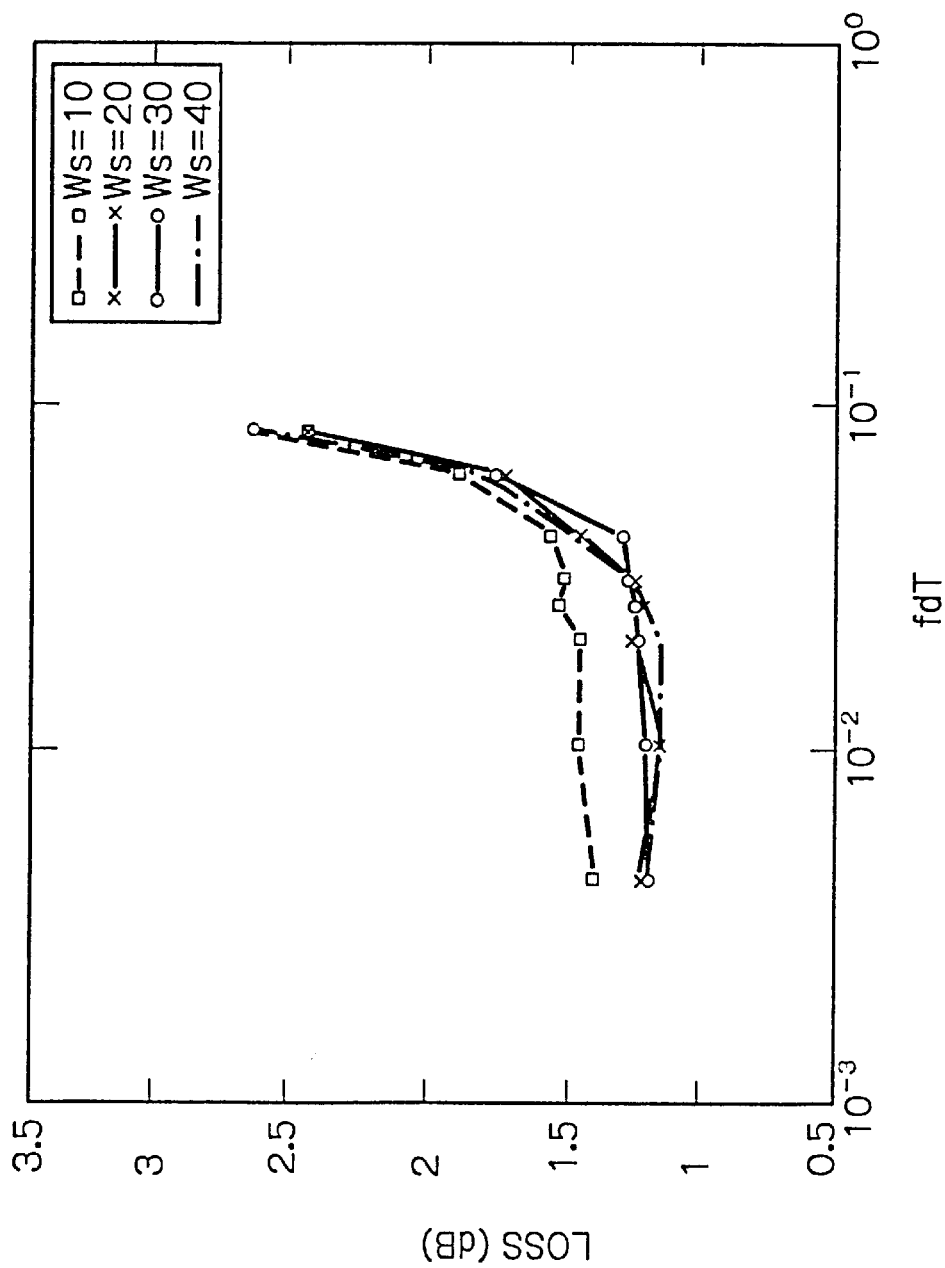
FIG. 32 shows a relation between a Doppler index and a Rake receipt loss with respect to a window size.

FIG. 32 is a graph showing a relation between a Doppler index fdT and a Rake receipt loss (dB) determined by varying the window size of the channel estimator 574, FIG. 18. As shown, the Doppler index was varied to 16 Hz, 40 Hz, 100 Hz, 120 Hz, 160 Hz, 240 Hz, and 316 Hz. T denotes a symbol period. A single slot had forty symbols. Demodulation was implemented by QPSK (Quadrature Phase Shift Keying). The HIC had a single stage and three paths and accommodated a single user. Transmission power control was not effected. The code error rate was $2 \times 10^{-2}$. In FIG. 32, a curve with squares, a curve with crosses and a curve with circles are respectively representative of characteristics determined with a window size of ten symbols, a window size of twenty symbols, and a window size of thirty symbols. A dash-and-dot curve is representative of a characteristic derived from a window size of forty symbols. As shown, when the Doppler frequency is relatively low, the loss is less when the window size is twenty symbols to forty symbols than when it is ten symbols. When the Doppler frequency is relatively high, the loss increases substantially in proportion to the Doppler frequency without regard to the window size.

Figure 33:
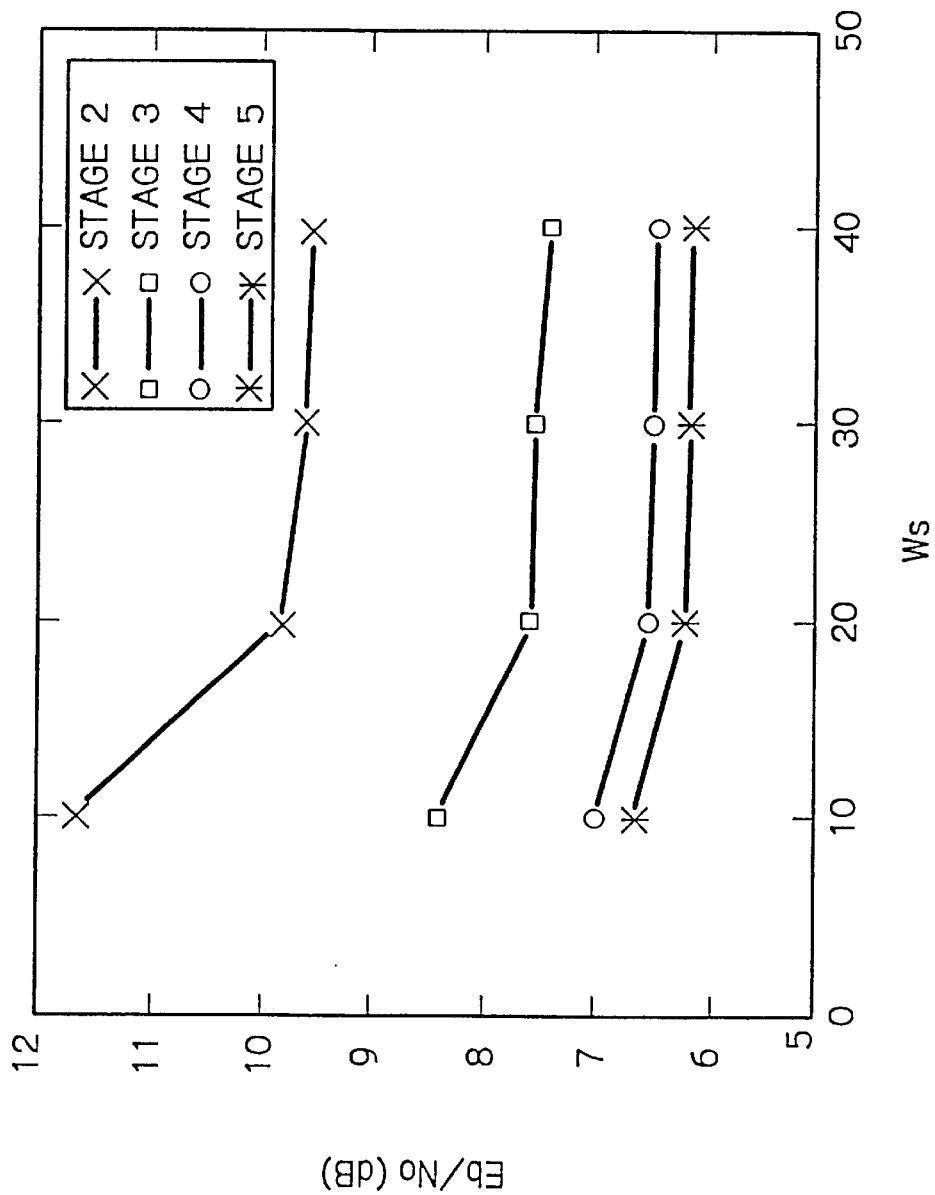
FIG. 33 shows a relation between a window size and a required Eb/No error particular to the HIC.

FIG. 33 shows a relation between the window size and the deviation or error of a required Eb (bit energy)/No (noise energy) from perfect channel estimation. The relation was determined by effecting transmission power control and selecting a code error rate of $2 \times 10^{-2}$. In FIG. 33, the abscissa indicates the window size (number of symbols) while the ordinate indicates Eb/No (dB). A curve with crosses is representative of Eb/No errors particular to an HIC having two stages. A curve with squares is representative of Eb/No errors particular to an HIC having three stages. A curve with circles is representative of Eb/No errors particular to an HIC having four stages. Further, a curve with asterisks is representative of Eb/No errors particular to an HIC having five stages. As FIG. 33 indicates, the HIC with three stages noticeably reduces the error, compared to the HIC with two stages, i.e., increasing the number of stages is successful to reduce the error to a significant degree. When the number of stages increases, the error changes little despite a change in window size.

Figure 34:
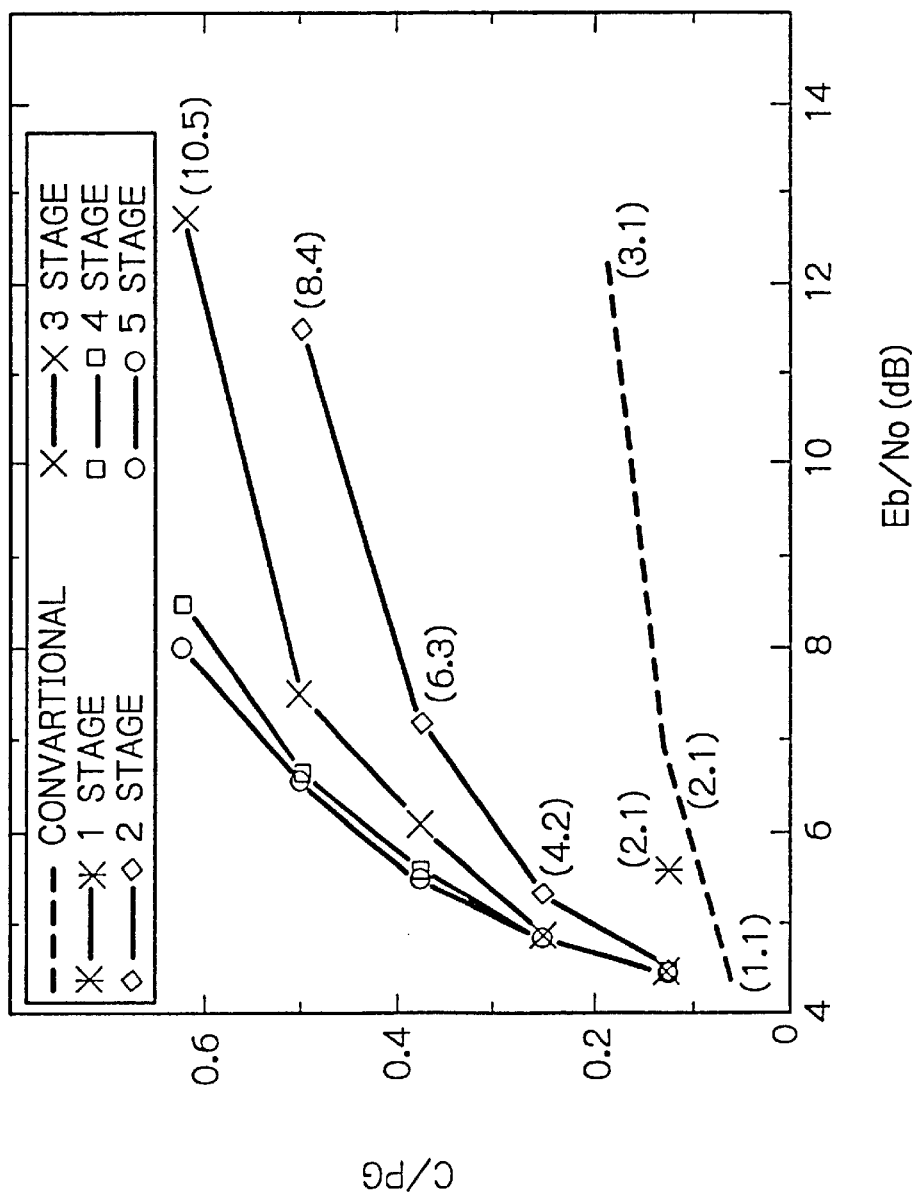
FIGS. 34 and 35 respectively show system capacities determined with two groups and three groups defined in the HIC.

FIG. 34 shows system capacities, i.e., capacities capable of accommodating users determined with an HIC dividing users into two groups. In FIG. 34, the abscissa indicates transmission power for a symbol Eb/No (dB) normalized by noise while the ordinate indicates C (number of users)/PG (Process Gain; spread magnification of sixteen times), i.e., user capacities normalized by a spread magnification. The code error rate was assumed to be $2 \times 10^{-2}$. Transmission power control was effected slot by slot. Power fluctuation was maintained below spread 2.4 dB. The window size was selected to be twenty symbols. Under these conditions, zero delay channel estimation was executed. The Doppler index fdT was assumed to be 0.0625 (100 Hz). A dotted curve is representative of performance particular to the conventional Rake receipt technology; a point (1, 1) shows a case with a single user and a group size of 1, a point (2, 1) shows a case with two users and a group size of 1, and a point (3, 1) shows a case with three users and a group size of 1. A point*(2, 1) shows a case with an HIC having a single stage and with two users and a group size of 1. At the point*(2, 1), a slightly higher C/PG than the conventional C/PG is achieved.

In FIG. 34, a curve with crosses is representative of performance achievable with an IC having three stages; the C/PG is even higher than in the case with two stages. A point (10, 5) on this curve shows a case with ten users and a group size of 5. A curve with squares is representative of performance particular to an HIC having four stages; the C/PG is even higher than in the case with three stages. A curve with circles is representative of an HIC having five stages; the C/PG is substantially the same as in the case with four stages. It will therefore be seen that the illustrative embodiment realizes a subscriber capacity more than three times as great as the conventional subscriber capacity.

Figure 35:
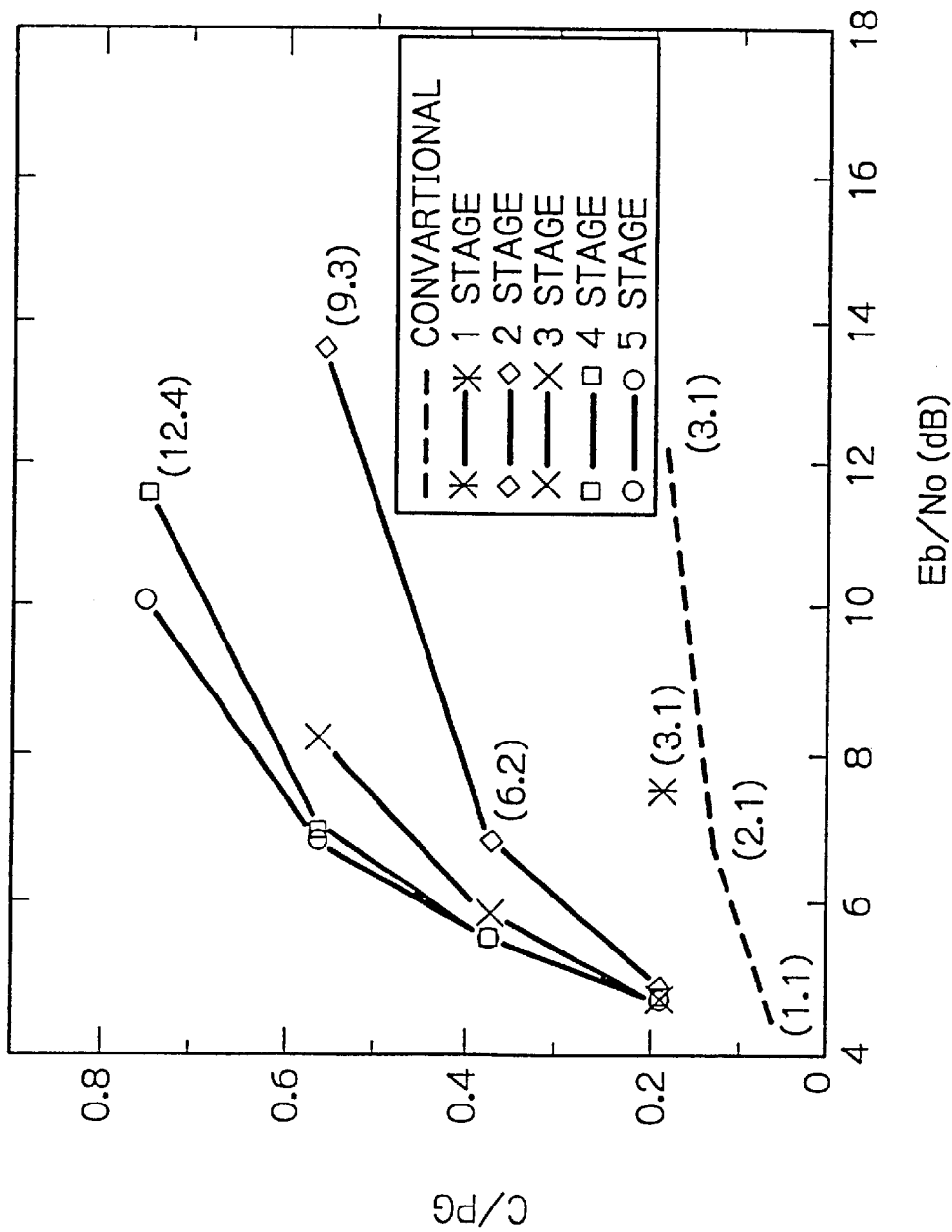

FIG. 35 shows system capacities determined with an HIC dividing users into three groups. FIG. 35, the abscissa and ordinate respectively indicates the same factors as in FIG. 34. Zero delay channel estimation was executed under the same conditions as in FIG. 34. The Doppler index fdT was again assumed to be 0.0625 (100 Hz). A dotted curve is representative of performance particular to the conventional Rake receipt technology. A point*(3, 1) shows performance particular to an HIC having a single stage. A point (3, 1) shows performance achievable with three users and a group size of 1; the C/PG is slightly higher than the conventional C/PG.

In FIG. 35, a curve with inclined crosses is representative of performance achievable with an HIC having two stages; the C/PG is far higher than in the case with a single stage. A point (6, 2) on this curve shows a case with six users and a group size of 2. A point (9, 3) shows a case with nine users and a group size of 3. A curve with crosses is representative of performance particular to an HIC having three stages; the C/PG is even higher than in the case with two stages. A curve with squares is representative of an HIC having four stages; a point (12,4) shows a case with twelve users and a group size of 4. At the point (12, 4), a C/PG even higher than in the case with three stages is achieved. A curve with circles is representative of an HIC having five stages; the C/PG is slightly higher than in the case with four stages. FIG. 35 also indicates that the illustrative embodiment realizes a subscriber capacity more than three times as great as the conventional subscriber capacity.

Functions required of the receiving device of the base station, including the HIC, will be described hereinafter. When the HIC is used to increase the subscriber capacity, the performance of the circuitry for demodulation around the HIC, i.e., the searchers for acquiring synchronization and DLLs for synchronous tracking is the question. Because the searchers are expected to search for the positions of paths and assign them to the ICUs before the HIC starts receiving a signal, they cannot be implemented by an HIC (ICS). That is, the processing of the searches must precede cancellation. As for the performance of conventional DLLs and searchers, only the subscriber capacity and interference without any HIC are assumed. Originally, however, the searchers have performance of utmost limit. Therefore, an HIC applied to the searchers would increase interference at the receipt end and would obviously deteriorate the demodulating ability, failing to start receiving a signal. Although the DLLs can be arranged in the Rake receipt circuits of the individual ICUs as conventional, their ability is also deteriorated because the first group of the first stage is in exactly the same environment as the conventional receiver as to receipt, i.e., because interference of any station is not effected in the first group of the first stage. This is also true with the receipt on an access channel; the transmission power on the access channel should be increased for accurate receipt, aggravating interference.

In light of the above, the illustrative embodiment adapts the DLLs, searches and an access channel receiver to the HIC. In this condition, the individual receipt processing is executed with signals free from interference so as to improve the receiving ability of the above constituents.

Specifically, each searcher functions to establish initial synchronization between a transmitter and a receiver with respect to a PN code and to detect, when the delay of a multipath (phase of the PN code) sharply changes, the change and informs the fingers of the associated ICU of new multipath positions. Each user has the respective searcher function.

First, there is determined a correlation between a received signal and the PN codes of different phases in the search window (preselected time frame of the phases of PN codes). Then, receipt power of each PN phase is determined. To determine the receipt power phase by phase, a method accurate enough to overcome noise and fading is available, e.g., a method using a great correlation length or a method producing a mean of power determined with some correlation length. Among multipaths represented by the positions of the phases of the PN codes greater in power than a certain threshold, multipaths equal in number to the fingers are selected in the decrementing order with respect to power. The multipaths selected are sequentially assigned to the fingers of the individual users. More specifically, the initial phase of a PN code, i.e., the initial value of a shift register is given to the PN generator of each finger. Because the HIC includes, in each ICU of each stage, fingers each corresponding to a particular multipath, the paths are assigned to the fingers of the consecutive stages in the same way.

Although the above sequence of algorithm is identical in both of the HIC and conventional Rake receipt, the HIC and conventional Rake receipt are different in signals input to the searchers. The conventional Rake receipt uses a received signal itself and therefore causes the performance of searchers to fall when interference, i.e., subscriber capacity increases. To solve this problem, the illustrative embodiment uses signals each having the other users' signals cancelled by the HIC. How signals to be input to the searcher algorithm are generated will be described in detail hereinafter.

In the HIC configuration discussed earlier, for a certain user, the received signal that has undergone cancellation is no more than a signal containing an uncancelled error. Because such a signal is sequentially transferred, an error signal or residual signal output from the last stage and having undergone cancellation through all the stages of all of the users contains an uncancelled signal. This uncancelled signal contains not only estimation errors but also unassigned users' signals and unassigned multipaths signals. However, signals other than the assigned users' signals are derived from sudden changes in paths or are extremely weak. Particularly, unassigned users' signals are extremely rare for a search time while unassigned multipath signals bring about a minimum of interference. Therefore, the error signal that has undergone cancellation has a high S/N (signal-to-noise) ratio from which interfering stations have been excluded. By monitoring such an error signal, it is possible to acquire a signal sent from a user newly started transmission.

The searcher algorithm itself is identical with the conventional algorithm, as stated earlier. Although the signal having undergone interference cancellation naturally brings about a delay, compared to the receipt end, the delay particular to the HIC type interference canceller of the illustrative embodiment is negligibly small for the operation period of the searchers.

Figure 36:
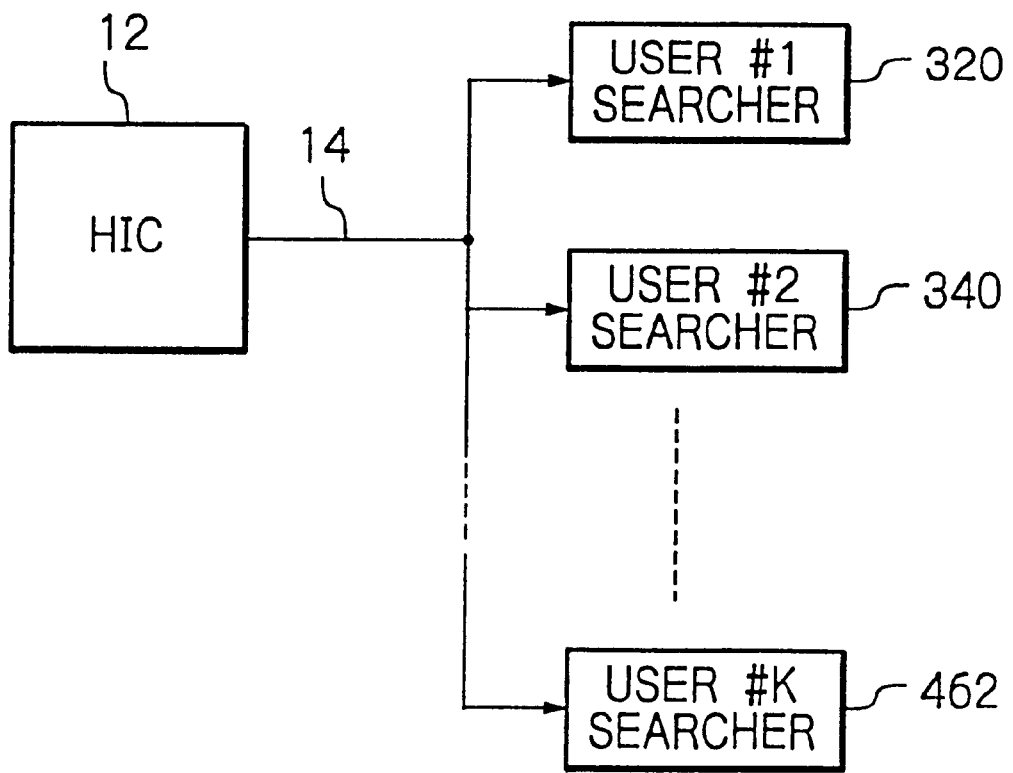
FIG. 36 is a schematic block diagram showing the connection of user #1 to user #k searchers set up for initial synchronization.

FIG. 36 shows the connection of the HIC 12 to the user #1 searcher 320 to the user #k searcher 462 set up for initial synchronization. As shown, the residual signal 14 subjected to interference cancellation is fed from the HIC 12 to the user #1 searcher 320 in order to acquire initial synchronization for the user #1 signal. The residual signal 14 is fed to the user #2 searcher 340 to the user #k searcher 462 also for acquiring initial synchronization for the user #2–#k signals.

In the above configuration for initial synchronization, only the error left uncancelled is input to the searchers. However, in the searcher algorithm, it is necessary to detect, among multipaths indicated by PH phase positions greater in power than a preselected threshold, multipaths equal in number to the fingers in the decrementing order, as stated previously. Because the comparison involves paths having already been assigned, a sharp change in any multipath subjected to initial search cannot be coped with unless the power of assigned paths and the power of a newly detected path are compared.

However, if only the error signal is input to each searcher, then the searcher cannot detect the assigned paths because such paths have already been cancelled. It is therefore necessary to take account of the assigned paths by some method when the searcher selects the paths in the decrementing order with respect to power. This, however, would sophisticate the searcher algorithm although not impossible. An alternative embodiment to be described hereinafter adds the signals of assigned paths to a searcher.

Why the error signal that has undergone cancellation does not contain the signals of assigned paths is that such signals have been cancelled. Therefore, if only the signal of the station concerned is restored, then a signal from which interference ascribable to the other stations has been removed can be input to the searcher associated with the above station. This can be done with the respreading function of the ICU. While the ICU has been shown and described as determining a corrected interference in such a manner as to cancel only a difference between the current interference and the cancelled interference, the alternative embodiment determines all the cancelled interferences and adds them to an error signal. The alternative embodiment will be described with reference to FIG. 37.

Figure 37:
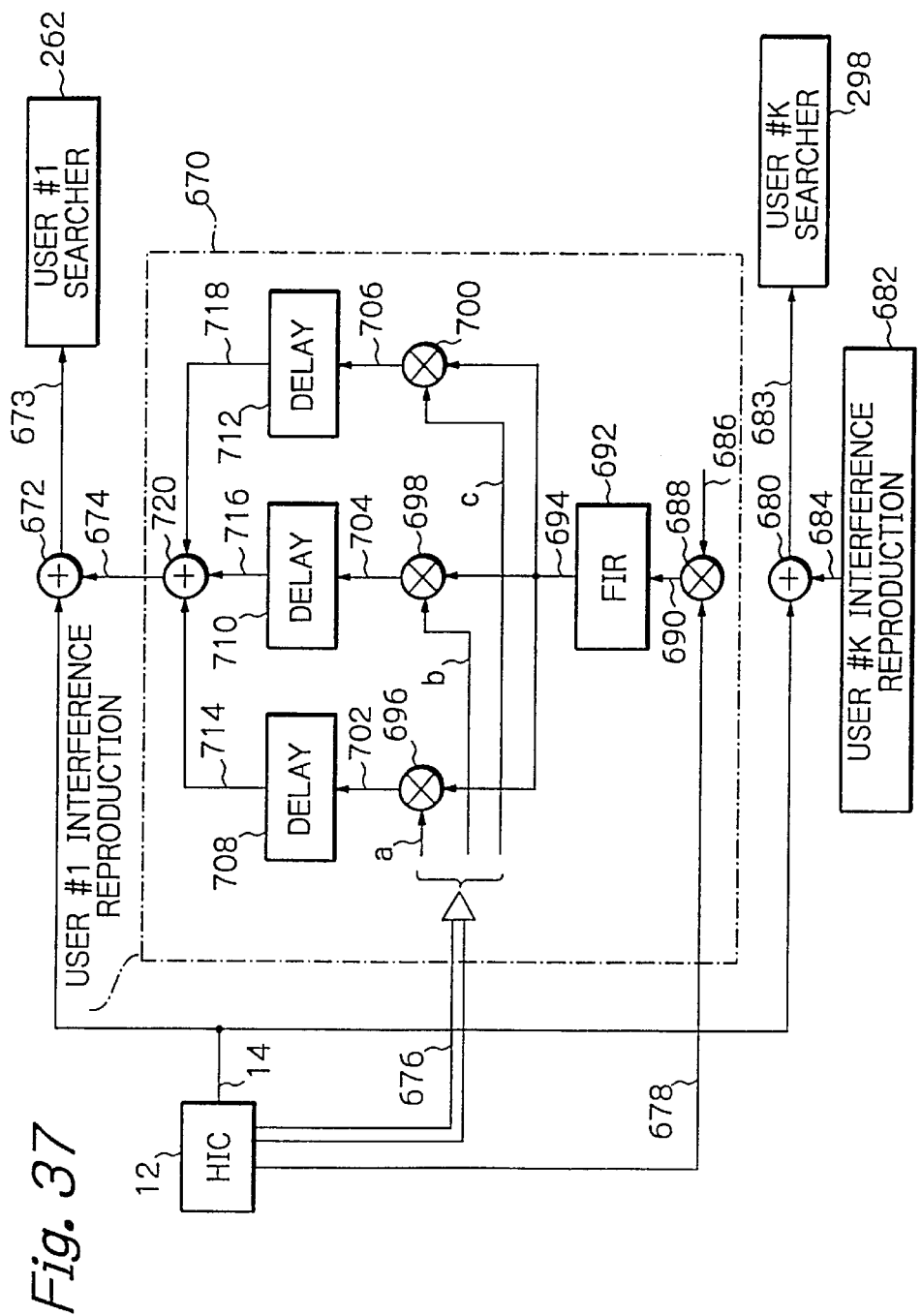
FIG. 37 is a schematic block diagram showing an alternative embodiment of the present invention.

As shown in FIG. 37, the residual signal 14 output from the HIC 12 after interference cancellation is input to adders 672 and 680. Further, a symbol estimate 678 determined at the last stage is fed from the HIC to a multiplier 688 included in a user #1 interference reproduction 670. Also applied to the multiplier 688 is a user #1 PN code 686. The multiplier 688 multiplies the symbol estimate 678 and PN code 686 and feeds the resulting product 690 to an FIR (Finite Impulse Response) filter 692. The FIR filter 692 filters out needless signals and delivers only a necessary signal 694 to multipliers 696, 698 and 700. Channel estimates 676*a*, 676*b* and 676*c* determined by the last stage path by path are fed from the HIC 12 to the multipliers 696, 698 and 700, respectively. The multipliers 696–700 respectively multiply the the output 694 of the filter 692 and path-by-path channel estimates 676*a*–676*c* and deliver their outputs or products 702, 704 and 706 to delays 708, 710 and 712, respectively. Delayed signals output from the delays 702–706 are applied to an adder 720 and added up thereby. The resulting sum 720 is fed from the adder 720 to the adder 672 as an interference particular to the user #1. The adder 720 adds the sum 720 to the residual signal 14 and feeds its output or sum 673 to the user #1 searcher 262 so as to allow the searcher 262 to acquire synchronization.

An interference particular to another user #k is reproduced by a user #k interference reproduction 682 identical in configuration with the user #1 interference cancellation 670. The output of the reproduction 682 is added to the residual signal 14 by the adder 680. The resulting sum 683 is input to the user #k searcher 298 and used to acquire synchronization.

The signals Present dat output from the ICUs of the last stage are subjected to respreading using PN codes and filtering. The signals Present dat respread and filtered are respectively multiplied by symbol-by-symbol channel estimates output from the channel estimators of the last stage path by path, thereby restoring the same phases and amplitudes as on the channel. Then, the restored signals are each delayed in accordance with the delay of a particular path. Finally, all the paths are added up in order to reproduce and output a cancelled interference estimate signal. If the reproduced interference estimate signal and the error signal from which all the assigned users' paths have been removed are added and then input to the searcher allotted to any one of the users, then all the signals input to the searcher are entirely free from interference.

While the circuitry of FIG. 37 has concentrated on error signals subjected to interference cancellation at the HIC, use may alternatively be made of error signals from which all the users' signals have been fully removed. For example, the searcher for the first group of the last stage may use the signal to be input to the second group after having the signal of the first group removed. In addition, such a signal may be used for initial synchronization. Another alternative embodiment practicing this kind of scheme will be described with reference to FIG. 38.

Figure 38:
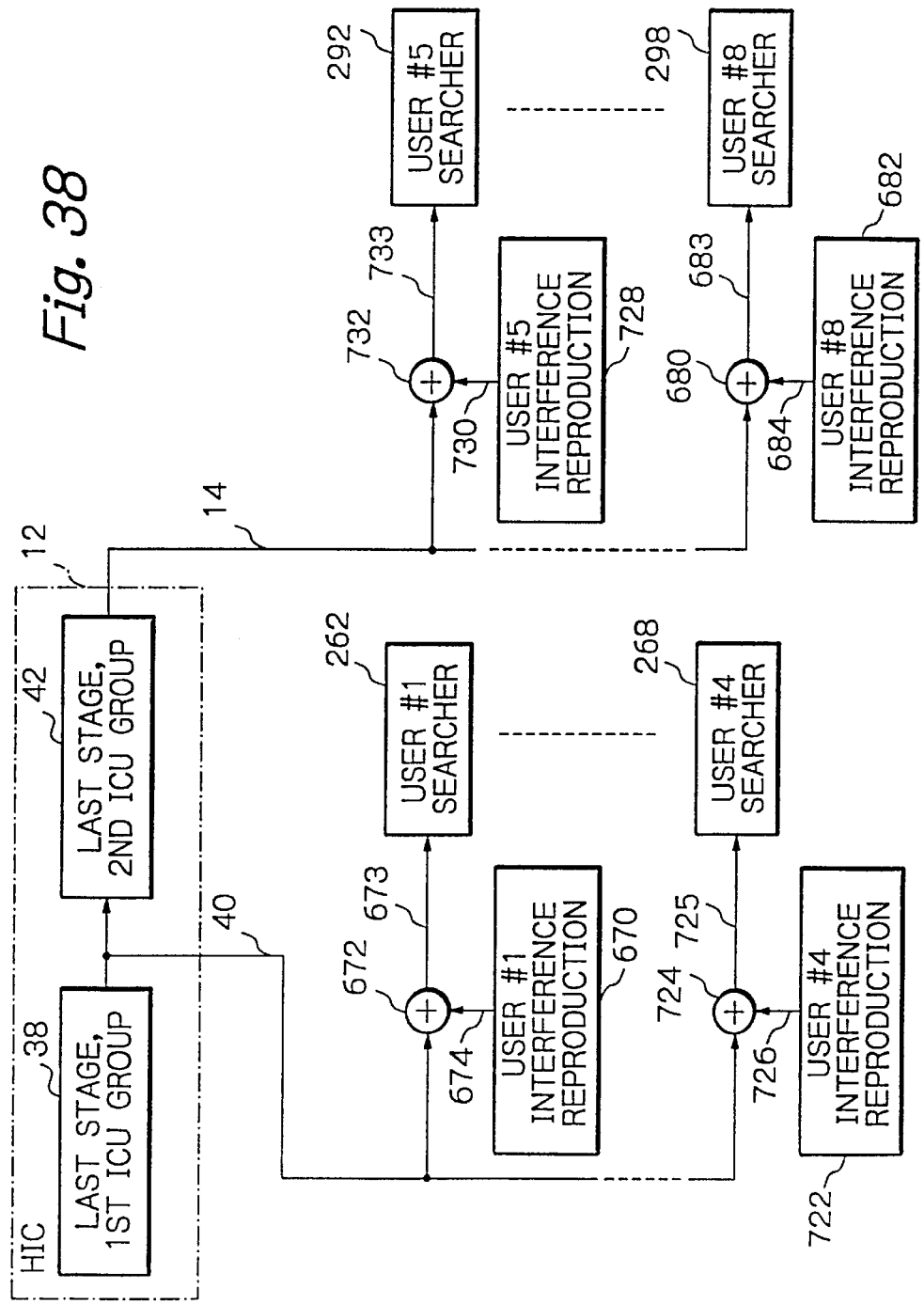
FIG. 38 is a schematic block diagram showing another alternative embodiment of the present invention.

As shown in FIG. 38, the residual signal 40 output from the first ICU group 38 of the last stage of the HIC 12 is input to the second ICU group 142 of the same stage and to adders 672 and 724. The user #1 interference reproduction 670 produces the interference 674 of the user #1 and applies it to the adder 672. The adder 672 adds the residual signal 40 and the interference 674 and feeds the resulting sum 673 to the user #1 searcher 262. Likewise, a user #4 interference reproduction 722 determines an interference 726 particular to the user #4 and delivers it to the adder 724. The adder 724 adds the residual signal 40 and interference 726 and applies the resulting sum 725 to the user #4 searcher 268.

The residual signal 14 output from the second ICU group 42 of the last stage is fed to adder 680 and an adder 732. An interference 730 output from a user #5 interference reproduction 728 and particular to the user #5 is fed to the adder 732. The adder 732 adds the residual signal 14 and interference 730 and feeds its output or sum 733 to the user #5 searcher 292. The user #8 interference reproduction 682 outputs an interference 684 particular to the user #8 and feeds it to the adder 680. The adder 680 adds the residual signal 14 and interference 684 and feeds the resulting sum 683 to the user #8 searcher 298.

In the above alternative embodiments, the signals cancelled station by station are reproduced by use of channel estimate information and spreading codes and then added to the error signal output from the HIC. How the output of the respreading section included in any one of the ICUs of the last stage is used will be described hereinafter by way of example.

To reproduce a cancelled signal, use may be made of an arrangement identical with the respreading section of the ICU, as stated earlier. Information necessary for the reproduction are the user-by-user PN codes, path-by-path channel estimates output from the channel estimator of the ICU of the last stage, path-by-path delays, and symbol estimates output from the last stage. The respreading section of the ICU of the last stage executes respreading with information substantially the same as the above information. The difference is that while the reproduction of the cancelled signal for the searcher is executed with the symbol estimate output from the last stage, respreading by the ICU of the last stage is executed with a residual produced by subtracting the symbol estimate output from the previous stage from the symbol estimate output from the last stage. It follows that if the output signal of the respreading section of the last stage is multiplied by a ratio of the symbol estimate output from the last stage to the residual, then a cancelled signal can be reproduced for a searcher.

By adding the residual signal that has fully undergone cancellation or a signal that has undergone cancellation in a group to the above signal, it is possible to input a signal from which only the other users' signals have been removed to the searcher. Still another alternative embodiment of the present invention for practicing this scheme will be described with reference to FIG. 39.

Figure 39:
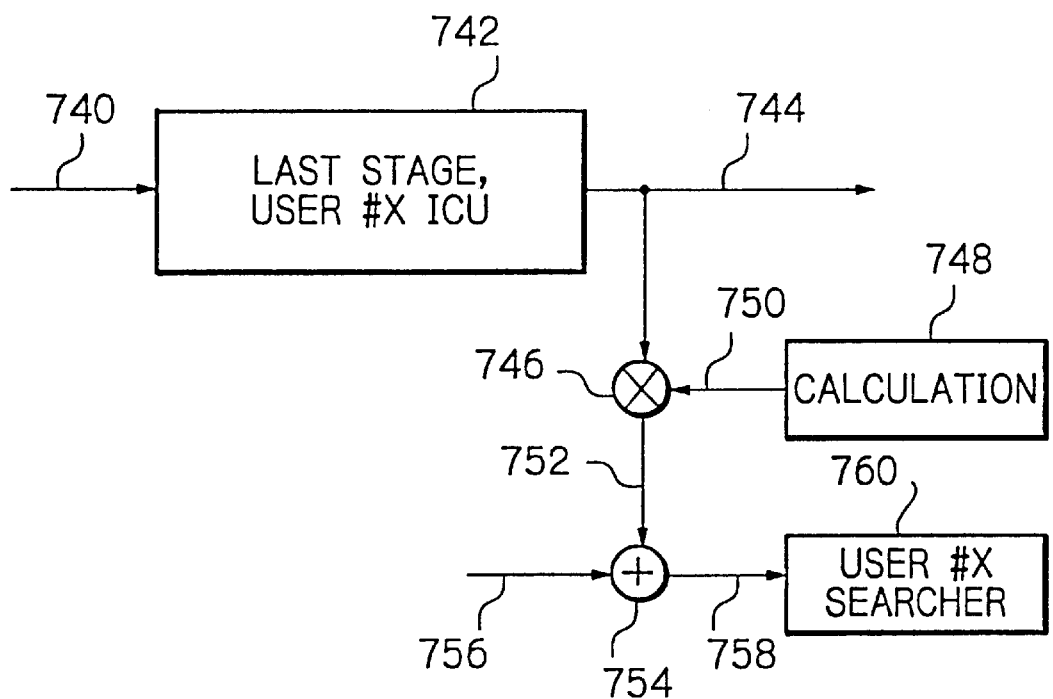
FIG. 39 is a schematic block diagram showing a further alternative embodiment of the present invention.

As shown in FIG. 39, a symbol estimate signal 740 output from an ICU of the previous stage and having undergone correction and decision is applied to a user #X ICU 742 of the last stage. In response, the user #X ICU 742 outputs a corrected interference estimate 744 and feeds it to an adder 746. A calculation 748 produces a result 750 of calculation of (symbol estimate output from the last stage)/(symbol estimate output from the last stage−symbol estimate output from the previous stage). The result 750 is fed to the multiplier 746. The multiplier 746 multiplies the user #X corrected interference estimate 744 and the above result 750 and delivers the resulting product 752 to an adder 754. Further, a residual signal that has undergone interference cancellation or an error signal 756 from which a group interference has been removed at the last stage is input to an adder 754. The adder 754 adds the error signal 756 and the product 752 and feeds the resulting product 758 to a user #X searcher 760.

In the above configurations, one searcher is allotted to each user at the end of the HIC (or ICS). While one searcher may, of course, be allotted to each Rake receiver circuit as in the conventional construction, such an arrangement would assign different paths to the Rake receivers between the consecutive stages and would thereby degrade the ability of the HIC (or ICS). With any one of the embodiments shown and described, it is possible to assign the same paths to the ICUs throughout the consecutive stages due to the unprecedented short delay time and thereby improve the ability.

In the illustrative embodiments, a serial interference canceller and a parallel interference canceller are combined in a hybrid configuration. Alternatively, either one of a serial and a parallel interference canceller may be combined with a searcher alone. This alternative configuration can also implement the construction shown in any one of FIGS. 36–39 so long as the canceller is of error transfer type or if an error signal from which all the users' signals have been removed is available.

Further, the illustrative embodiments are each practicable even with decorrelators or similar receivers if interference estimate signals are reproduced from the outputs of all the receivers in order to produce an error signal. Any kind of searcher algorithm, i.e., any kind of searcher can be used because the input to the searcher may be considered to simply increase the S/N ratio.

The connection between the searchers and DLLs has been described with reference to FIGS. 12, 13, 16 and 17. While each searcher copes with sharp changes in path, the associated DLL or tracking circuit corrects the fine deviation in the phase of PN code between a transmitter and receiver ascribable to a difference in the oscillation of a quartz oscillator between the transmitter and receiver. The DLL causes, with a higher resolution than the searcher, the PN code generation timing of the receiver to track the fluctuation of the received signal path by path, thereby adjusting the phase of the PN code. This allows the received signal to be sampled at positions where the greatest power is available.

The DLL is implemented by two correlators. A PN sequence (early code) whose phase is earlier than the phase of the PN code used for the respreading/detection of the actual signal by half a chip and a PN sequence (late code) whose phase is later than the above PN code by half a chip are respectively input to the two correlators of the DLL.

Usually, the DLL produces a difference between a correlation value determined with the early code and a correlation value determined with the late code. PN code generation is controlled such that the PN sequence generation phase is retarded if the above difference is positive (the early code is greater than the late code), or is advanced if it is negative (the early code is smaller than the late code). This can be done by, e.g., increasing the clock width of chip clocks applied to the PN generators of the fingers when the PN code should be retarded or reducing the clock with when it should be advanced.

The above control surely synchronizes the PN sequence to the received signal and maintains the synchronization. The PN sequence can therefore track changes in paths ascribable to the difference in oscillation between the quartz oscillators and movement of mobile stations, so that the maximum power of demodulated data is achievable. Because the change in phase depends on the individual multipath, the control is executed with the PN generation of each finger of the individual user.

The above sequence of DLL algorithm applies to both the HIC (or ICS) and the conventional Rake receiver circuit. However, the signal input to the DLL differs from a system using the HIC (or ICS) to a system not using it, as in the case of a searcher. An increase in subscriber capacity naturally results in a decrease in S/N ratio. Although one DLL may be assigned to each finger of each Rake receiver circuit, receipt in the first group of the first stage is exactly the same as receipt in the absence of an HIC, simply resulting in the same ability as the conventional DLL. While the S/N ratio may sequentially increase from one stage to the next stage, sampling the signal at a particular position at each stage would deteriorate the interference cancelling ability of the HIC (or ICS).

It will be seen from the above that the DLLs of the fingers of all the consecutive stages should indicate the same position. If a time difference (delay) between the consecutive stages of the HIC (or ICS) is great, then the DLLs of the fingers of the stages may sometimes be required to indicate different positions. However, in the illustrative embodiments, the hybrid ICS has an unprecedented short delay, as stated previously. Therefore, if use is made of a signal from which the other users' signals have been cancelled by the HIC(or ICS), the S/N ratio of the input to the DLL and therefore interference cancelling ability is improved, as in the case of the searcher. It suffices to input to the DLL a signal leaving only the signal of the associated station and having the other stations' signals cancelled. For this purpose, the input to the searcher can be used in exactly the same manner.

Specifically, any one of the configurations shown in FIGS. 37–39 each outputting a signal meant for the searcher may be used. One DLL may be assigned to each multipath of each user and applied with the same input signal as the searcher. Alternatively, the DLL may not be supplied with the synchronization acquisition signal output from the searcher, in which case a received signal or a signal input to the ICU of each station will be applied to the DLL so as to execute tracking control over the chip clocks of the ICU. It is also possible to input a received signal or a signal input to the ICU of each station to the DLL, and to execute synchronous tracking with the signal acquired by the searcher, thereby effecting tracking control over the chip clocks of the ICU.

Figure 40:
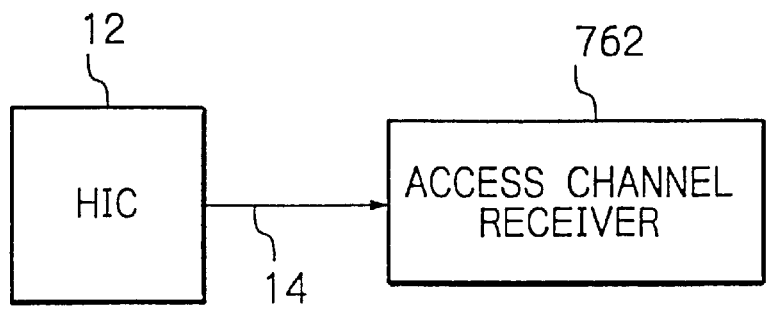
FIG. 40 shows the connection of the HIC to an access channel receiver.

FIG. 40 shows the connection of the HIC 12 of any one of the illustrative embodiments to an access channel receiver 762. The receipt of an access channel is an essential process to be executed before each user sets up a call and before interference cancellation. The conventional access channel receipt exists in parallel with the station-by-station Rake receiver circuits, so that the same signal as signals input to the Rake receivers is used as an access channel signal. As a result, the receipt of an access channel signal, like the searcher and DLL, differs from a system using the ICS to a system not using it. Again, the S/N ratio naturally decreases with an increase in subscriber capacity. Therefore, should a signal undergone interference cancellation at the ICS, e.g., HIC 12 be used, the ICS would fail to perform interference cancellation with stations other than stations assigned by the ICU.

Specifically, assume a station sending an access channel for newly originating a call. Then, the ICS does not cancel the signal of such a station (access channel signal itself). As a result, the access channel signal being sent constantly appears in the signal of the station assigned by all the ICUs and having undergone interference cancellation, i.e., the error signal or residual signal 14 output from the last stage. Therefore, if the access channel signal is input to the access channel, then the signals of all the stations in communication can be cancelled in order to input only the access channel signal to the access channel receiver 762. This allows the receiver 762 to detect the access channel signal with a high S/N ratio. The receiver 762 may receive the access channel signal in the same manner as the searchers shown in FIG. 36 receive the signal from the HIC 12.

For the canceller, use may be made of an ICS other than the HIC, e.g., a serial ICS or a parallel ICS.

Figure 41:
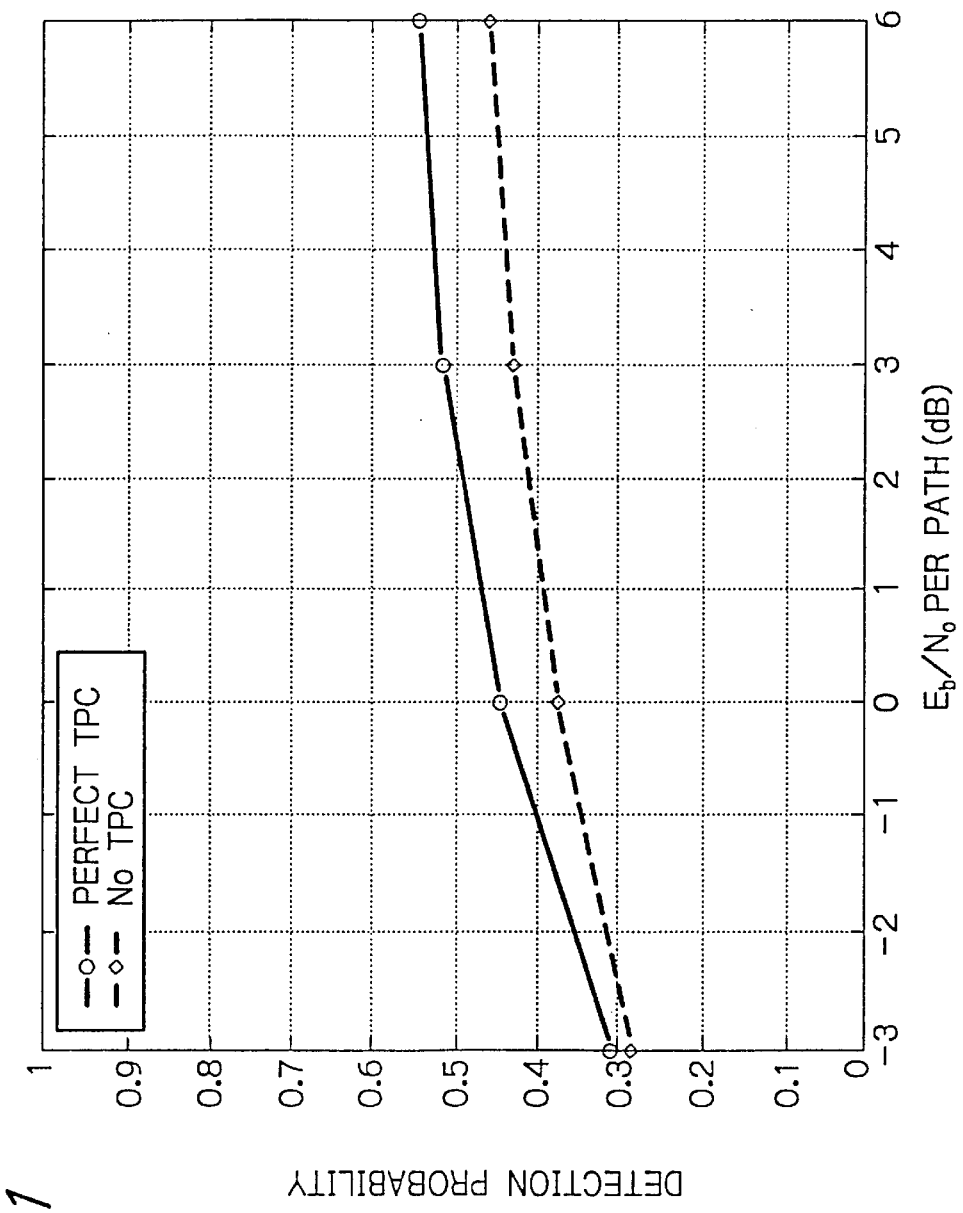
FIG. 41 shows the path acquisition probability of a searcher not accompanied by an HIC.
Figure 42:
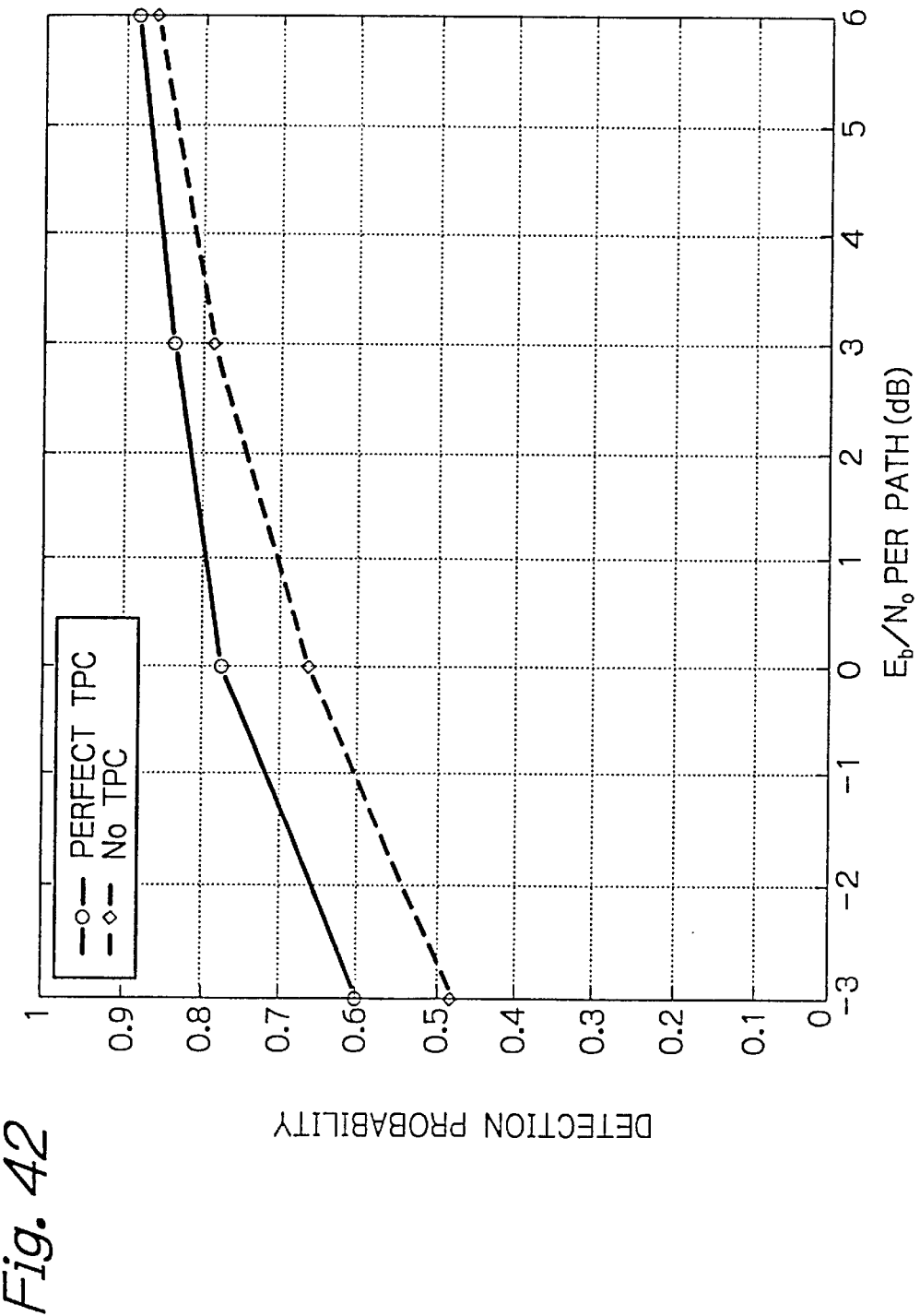
FIGS. 42 and 43 show the path acquisition probabilities of a searcher determined with an HIC having three stages and an HIC having five stages, respectively.
Figure 43:
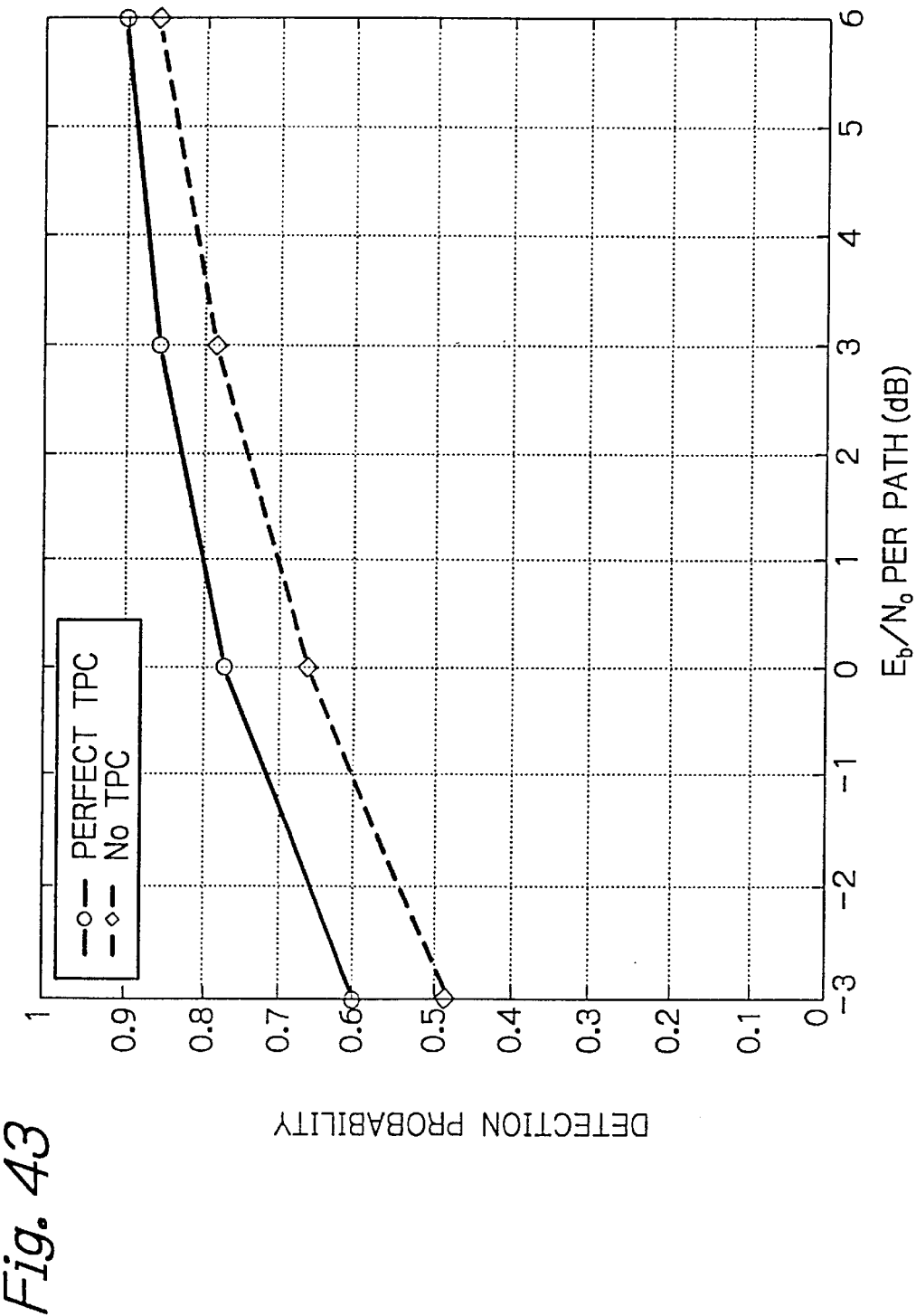

FIGS. 41–43 each shows the path acquisition probability of the searcher of any one of the illustrative embodiments determined in a particular condition. FIG. 41 shows the probability for the searcher to acquire both of two paths at an adequate timing in a case lacking the HIC 12. The probability was determined with a spread gain (N) of 16, eight (k) users, a window width (CL) of 20, the maximum Doppler frequency (fd) of 0, and a clock offset (f0) of 0. The ordinate and abscissa respectively indicate the acquisition probability and Eb/No (dB) for a path. A dotted curve and a solid curve are respectively representative of a case without TPC and a case with TPC As FIG. 41 indicates, a higher acquisition probability is achievable when transmission power control is effected than when it is not effected.

FIG. 42 shows the probability for the searcher to acquire both of two paths at an adequate timing in a case with the HIC 12 having three consecutive stages. The probability was determined under the same conditions as in FIG. 41. The ordinate and abscissa respectively indicate the acquisition probability and Eb/No (dB) for a path. A dotted curve and a solid curve are respectively representative of a case without TPC and a case with TPC. It will be seen that the HIC 12 almost doubles the acquisition probability, compared to the characteristic of FIG. 41.

FIG. 43 shows a probability determined under the same conditions as in FIGS. 41 and 42, but with the HIC 12 having five consecutive stages. As shown, a slightly higher probability is achievable with the HIC 12 having five stages than with the HIC 12 having three stages. As FIGS. 41–43 indicate, the acquisition probability of the searcher increases with an increase in the interference cancelling ability.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A receiving device for CDMA (Code Division Multiple Access) communication, comprising:

receiving means for receiving signals for CDMA sent from a plurality of transmitting stations to thereby output received signals;

a first group of interference cancellation stage for estimating signals sent from the transmitting stations from the received signals by using despreading codes corresponding to spreading codes respectively assigned to the transmitting stations, wherein said first group of interference cancellation stage includes N (integer greater than 2 inclusive) interference cancelling units (ICUs) each for estimating an interstation interference ascribable to interference between the despreading codes, and estimates interstation interferences in parallel, cancels the interstation interferences and estimates the signals sent from said N transmitting stations in parallel; and a second group of interference cancellation stage for estimating, from signals from which the interstation interferences have been cancelled by said first group of interference cancellation stage, interstation interferences in parallel with M (integer greater than 2 inclusive) ICUs, cancelling the interstation interferences and estimates signals sent from said M transmitting stations in parallel, and outputting signals free from the interstation interferences;

wherein a plurality of interference cancellation stages each comprising said first group of interference cancellation stage and said second group of interference cancellation stage are serially connected to construct a hybrid interference cancelling unit, and wherein each of said plurality of interference cancellation stages estimates interstation interferences while the ICLJs of a last one of said plurality of interference cancellation stages output the signals sent from the individual transmitting stations, wherein each of said ICUs includes finger circuits for performing Rake receipt, processing of estimated received symbols output from a previous one of said plurality of interference cancellation stages, and channel estimation, a signal correction and decision circuit for executing correction and decision with signals output from said finger circuits, and a respreading circuit for restoring signals output from said signal correction and decision circuit to same conditions as on a channel;

wherein for the channel estimation, use is made of a known pilot symbol portion and a data portion included in each of the signals received from the transmitting stations;

wherein each of said finger circuits estimates a channel by eliminating a phase of a correlation detection output by decision feedback based on a result of hard decision output from said signal correction and decision circuit, uses a moving average of several symbols of said correlation detection output as channel estimation information, and multiplies said correlation detection output by a complex conjugate of said channel estimation information to thereby produce a finger output; and wherein each of said finger circuits first estimates a channel by using only the pilot symbol portion and restores a phase rotation of a data symbol next to said pilot symbol portion to thereby demodulate a finger input, inputs the pilot symbol portion to a moving average filter, returns a result of hard decision executed with a result of demodulation of data to a channel estimator to thereby eliminate a data phase of a next correlation detection output, inputs a result of data phase elimination to said moving average filter, produces a mean of said pilot symbol portion and one symbol of data in said moving average filter and uses said mean as a result of channel estimation for demodulating a second data symbol as counted from said pilot symbol section, returns a result of hard decision executed with a result of demodulation of said second data symbol also to said channel estimator to thereby restore a phase of a third data symbol, and inputs said phase of said third data symbol to said moving average filter.

2. A receiving device in accordance with claim 1, wherein a number of symbols in said moving average filter is sequentially increased up to a number of taps of said moving average filter, wherein said moving average filter performs usual moving average processing when the number of symbols reaches the number of taps, wherein a window representative of a section of the moving average has a size sequentially slid in a slot up to a next pilot symbol portion, wherein information existing in said moving average filter is cleared when a last data symbol of said slot preceding said next pilot symbol is fully demodulated, and then channel estimation is repeated only with said next pilot symbol portion.

3. A receiving device for CDMA (Code Division Multiple Access) communication, comprising:

receiving means for receiving signals for CDMA sent from a plurality of transmitting stations to thereby output received signals;

a first group of interference cancellation stage for estimating signals sent from the transmitting stations from the received signals by using despreading codes corresponding to spreading codes respectively assigned to the transmitting stations, wherein said first group of interference cancellation stage includes N (integer greater than 2 inclusive) interference cancelling units (ICUs) each for estimating an interstation interference ascribable to interference between the despreading codes, and estimates interstation interferences in parallel, cancels the interstation interferences and estimates the signals sent from said N transmitting stations in parallel; and a second group of interference cancellation stage for estimating, from signals from which the interstation interferences have been cancelled by said first group of interference cancellation stage, interstation interferences in parallel with M (integer greater than 2 inclusive) ICUs, cancelling the interstation interferences and estimates signals sent from said M transmitting stations in parallel, and outputting signals free from the interstation interferences;

wherein a plurality of interference cancellation stages each comprising said first group of interference cancellation stage and said second group of interference cancellation stage are serially connected to construct a hybrid interference cancelling unit, and wherein each of said plurality of interference cancellation stages estimates interstation interferences while the ICLJs of a last one of said plurality of interference cancellation stages output the signals sent from the individual transmitting stations, wherein each of said ICUs includes
finger circuits for performing Rake receipt, processing of estimated received symbols output from a previous one of said plurality of interference cancellation stages, and channel estimation,
a signal correction and decision circuit for executing correction and decision with signals output from said finger circuits, wherein said signal correction and decision circuit normalizes output signals of said finger circuits, multiplies said output signals normalized by a coefficient corresponding to a slope, and limits a result of multiplication with a threshold corresponding to a maximum value, and
a respreading circuit for restoring signals output from said signal correction and decision circuit to same conditions as on a channel.

4. A receiving device in accordance with claim 3, wherein said signal correction and decision circuit executes normalization with total power of channel estimates of multipaths.

5. A receiving device in accordance with claim 3, wherein said signal correction and decision circuit executes normalization with a moving mean of power.

6. A receiving device for CDMA (Code Division Multiple Access) communication, comprising:
receiving means for receiving signals for CDMA sent from a plurality of transmitting stations to thereby output received signals;
a first group of interference cancellation stage for estimating signals sent from the transmitting stations from the received signals by using despreading codes corresponding to spreading codes respectively assigned to the transmitting stations, wherein said first group of interference cancellation stage includes N (integer greater than 2 inclusive) interference cancelling units (ICUs) each for estimating an interstation interference ascribable to interference between the despreading codes, and estimates interstation interferences in parallel, cancels the interstation interferences and estimates the signals sent from said N transmitting stations in parallel; and
a second group of interference cancellation stage for estimating, from signals from which the interstation interferences have been cancelled by said first group of interference cancellation stage, interstation interferences in parallel with M (integer greater than 2 inclusive) ICUs, cancelling the interstation interferences and estimates signals sent from said M transmitting stations in parallel, and outputting signals free from the interstation interferences;
wherein a plurality of interference cancellation stages each comprising said first group of interference cancellation stage and said second group of interference cancellation stage are serially connected to construct a hybrid interference cancelling unit, and wherein each of said plurality of interference cancellation stages estimates interstation interferences while the ICUs of a last one of said plurality of interference cancellation stages output the signals sent from the individual transmitting stations, wherein signals representative of interferences of the individual transmitting stations belonging to said first group of said last stage are added to an interference-free signal output from said first group of said last stage, resulting sums are respectively fed to searchers respectively assigned to transmitting stations of said first group for acquiring synchronization, signals representative of interferences of the individual transmitting stations belonging to said second group of said last stage are added to an interference-free signal output from said second group of said last stage, and resulting sums are respectively fed to searchers respectively assigned to said transmitting stations of said second group for acquiring synchronization.

7. A receiving device for CDMA (Code Division Multiple Access) communication, comprising:
receiving means for receiving signals for CDMA sent from a plurality of transmitting stations to thereby output received signals;
a first group of interference cancellation stage for estimating signals sent from the transmitting stations from the received signals by using despreading codes corresponding to spreading codes respectively assigned to the transmitting stations, wherein said first group of interference cancellation stage includes N (integer greater than 2 inclusive) interference cancelling units (ICUs) each for estimating an interstation interference ascribable to interference between the despreading codes, and estimates interstation interferences in parallel, cancels the interstation interferences and estimates the signals sent from said N transmitting stations in parallel; and
a second group of interference cancellation stage for estimating, from signals from which the interstation interferences have been cancelled by said first group of interference cancellation stage, interstation interferences in parallel with M (integer greater than 2 inclusive) ICUs, cancelling the interstation interferences and estimates signals sent from said M transmitting stations in parallel, and outputting signals free from the interstation interferences;
wherein a plurality of interference cancellation stages each comprising said first group of interference cancellation stage and said second group of interference cancellation stage are serially connected to construct a hybrid interference cancelling unit, and wherein each of said plurality of interference cancellation stages estimates interstation interferences while the ICLJs of a last one of said plurality of interference cancellation stages output the signals sent from the individual transmitting stations;
wherein each of said ICUs includes
finger circuits for performing Rake receipt, processing of estimated received symbols output from a previous one of said plurality of interference cancellation stages, and channel estimation,
a signal correction and decision circuit for executing correction and decision with signals output from said finger circuits, and
a respreading circuit for restoring signals output from said signal correction and decision circuit to same conditions as on a channel; and
wherein ratios B/A estimates B output from said ICUs of said last stage to differences A between symbol estimates output from said signal correction and decision circuits of said ICUs of said last stage and symbol estimates output from said ICUs of a previous stage are determined, interference estimate signals respectively output from respreading circuits of said ICUs of said last stage are respectively multiplied by said ratios B/A, resulting products are respectively added to interference-free signals output from said last group of said last stage, and resulting sums are respectively applied to searchers respectively assigned to the transmitting stations for acquiring synchronism.

8. A channel estimator comprising:
interference cancelling means for estimating signals sent from said plurality of transmitting stations from the received signals by use of despreading codes respectively corresponding to spreading codes respectively assigned to said plurality of transmitting stations, said interference cancelling means estimating interstation interferences ascribable to interference between said spreading codes and/or interference between said despreading codes, and cancelling said interstation interferences contained in the received signals to thereby output an interference-free signal;
demodulating means for demodulating the received signals to thereby output demodulated signals; and
tracking means for executing synchronous tracking on the basis of the demodulated signals to thereby execute tracking control over chip clocks to be used by said interference cancelling means.

9. A device for receiving a signal from a transmitting station and estimating a channel by using pilot symbols, which is a known signal, and a data portion included in the signal, said device comprising: correlation detecting means for performing correlation detection with the signal received; and channel estimating means for eliminating a phase of the data portion by decision feedback, producing a moving average of several symbols of an output of said correlation detecting means as channel estimate information, and multiplying said output of said correlation detecting means by a complex conjugate of said channel estimate information, wherein said channel estimating means first estimates a channel by using only a pilot symbol portion, uses the channel estimated for restoring a phase rotation of a data symbol next to said pilot symbol portion to thereby demodulate fingers, feeds a signal in said pilot symbol portion to a moving average filter, uses a hard decision value derived from a result of data demodulation to estimate a channel, eliminates a data phase of a next output of said correlation detecting means and inputs a resulting output thereof to said moving average filter, causes said moving average filter to output a mean of said pilot symbol portion and one data symbol, uses said means for demodulation of a second data symbol, as counted from said pilot symbol portion, by said fingers, uses a result of hard decision derived from said second data symbol for channel estimation, and restores a phase of a next data symbol and inputs said phases to said moving average filter.

10. A device in accordance with claim 9, wherein a number of symbols in said moving average filter is increased up to a number of taps of said moving average filter, wherein said moving average filter performs usual moving average processing when the number of symbols reaches the number of taps, wherein a size of a window representative of a moving average processing section is sequentially extended in a slot until said window reaches a next pilot symbol portion, wherein information existing in said moving average filter is cleared when a last data symbol of the slot preceding said next pilot symbol portion is demodulated, and wherein said channel estimating means repeats channel estimation only with said next pilot symbol portion.

11. A receiving device for CDMA (Code Division Multiple Access) communication, comprising:
receiving means for receiving signals for CDMA sent from a plurality of transmitting stations to thereby output received signals;
a first group of interference cancellation stage for estimating signals sent from the transmitting stations from the received signals by using despreading codes corresponding to spreading codes respectively assigned to the transmitting stations, wherein said first group of interference cancellation stage includes N (integer greater than 2 inclusive) interference cancelling units (ICUs) each for estimating an interstation interference ascribable to interference between the despreading codes, and estimates interstation interferences in parallel, cancels the interstation interferences and estimates the signals sent from said N transmitting stations in parallel; and
a second group of interference cancellation stage for estimating, from signals from which the interstation interferences have been cancelled by said first group of interference cancellation stage, interstation interferences in parallel with M (integer greater than 2 inclusive) ICUs, cancelling the interstation interferences and estimates signals sent from said M transmitting stations in parallel, and outputting signals free from the interstation interferences;
wherein a plurality of interference cancellation stages each comprising said first group of interference cancellation stage and said second group of interference cancellation stage are serially connected to construct a hybrid interference cancelling unit, and wherein each of said plurality of interference cancellation stages estimates interstation interferences while the ICLJs of a last one of said plurality of interference cancellation stages output the signals sent from the individual transmitting stations, further comprising
a plurality of searchers each being assigned to the received signal from a particular transmitting station for acquiring synchronization, said plurality of searchers respectively receiving sums of said interference-free signal output from said last group of said last stage and signals representative of station-by-station interferences, and
tracking means for executing synchronous tracking on the basis of signals acquired by said searchers to thereby execute tracking control over chip clocks each being used by a particular one of said ICUs.

12. A receiving device in accordance with claim 6, further comprising tracking means for executing synchronous tracking on the basis of signals acquired by said searchers to thereby execute tracking control over chip clocks each being used by a particular one of said ICUs.

13. A receiving device in accordance with claim 7, further comprising tracking means for executing synchronous tracking on the basis of signals acquired by said searchers to thereby execute tracking control over chip clocks each being used by a particular one of said ICUs.

14. A receiving device for CDMA communication, comprising:
receiving means for receiving signals for CDMA sent from a plurality of transmitting stations to thereby output received signals; and
interference cancelling means for estimating signals sent from said plurality of transmitting stations from the received signals by use of despreading codes respectively corresponding to spreading codes respectively assigned to said plurality of transmitting stations, said interference cancelling means estimating interstation interferences ascribable to interference between said spreading codes and/or interference between said despreading codes, and cancelling said interstation interferences contained in the received signals to thereby output an interference-free signal;

wherein signals respectively reproduced from the interferences of said plurality of transmitting stations are individually added to said interference-free signal, and resulting sums are respectively fed to searchers each being assigned to one of said plurality of transmitting stations for acquiring synchronization, further comprising first and second tracking means each for executing synchronous tracking based on signals output from said searchers corresponding to said first group or said second group to thereby execute tracking control over chip clocks to be used by either one of said first and second interference cancelling means associated with said first group or said second group.

15. A receiving device for CDMA communication comprising:

receiving means for receiving signals for CDMA sent from a plurality of transmitting stations to thereby output received signals; and at least first interference cancelling means and second interference cancelling means for respectively cancelling interferences from signals received from at least a first group of transmitting stations and a second group of transmitting stations, wherein said first interference cancelling means estimates signals sent from said first group of transmitting stations from the received signals by use of despreading codes respectively corresponding to spreading codes respectively assigned to said first group of transmitting stations, estimates interstation interferences ascribable to interference between said spreading codes and/or interference between said despreading codes, and cancels said interstation interferences contained in the received signals to thereby output a first interference-free signal, and wherein said second interference cancelling means estimates signals sent from said second group of transmitting stations from the received signals by use of despreading codes respectively corresponding to spreading codes respectively assigned to said second group of transmitting stations, estimates interstation interferences ascribable to interference between said spreading codes and/or interference between said despreading codes, and cancels said interstation interferences contained in the received signals to thereby output a second interference-free signal;

wherein signals respectively reproduced the interferences of said first group of transmitting stations are individually added to said first interference-free signal, and resulting sums are respectively fed to searchers respectively assigned to said first group of transmitting stations in order to acquire synchronization, and wherein signals respectively reproduced the interferences of said second group of transmitting stations are individually added to said second interference-free signal, and resulting sums are respectively fed to searchers respectively assigned to said second group of transmitting stations in order to acquire synchronization, further comprising first and second tracking means each for executing synchronous tracking based on signals output from said searchers corresponding to said first group or said second group to thereby execute tracking control over chip clocks to be used by either one of said first and second interference cancelling means associated with said first group or said second group.

16. A receiving device for CDMA (Code Division Multiple Access) communication, comprising:

receiving means for receiving signals for CDMA sent from a plurality of transmitting stations to thereby output received signals;

a first group of interference cancellation stage for estimating signals sent from the transmitting stations from the received signals by using despreading codes corresponding to spreading codes respectively assigned to the transmitting stations, wherein said first group of interference cancellation stage includes N (integer greater than 2 inclusive) interference cancelling units (ICUs) each for estimating an interstation interference ascribable to interference between the despreading codes, and estimates interstation interferences in parallel, cancels the interstation interferences and estimates the signals sent from said N transmitting stations in parallel; and a second group of interference cancellation stage for estimating, from signals from which the interstation interferences have been cancelled by said first group of interference cancellation stage, interstation interferences in parallel with M (integer greater than 2 inclusive) ICUs, cancelling the interstation interferences and estimates signals sent from said M transmitting stations in parallel, and outputting signals free from the interstation interferences;

wherein a plurality of interference cancellation stages each comprising said first group of interference cancellation stage and said second group of interference cancellation stage are serially connected to construct a hybrid interference cancelling unit, and wherein each of said plurality of interference cancellation stages estimates interstation interferences while the ICLJs of a last one of said plurality of interference cancellation stages output the signals sent from the individual transmitting stations, further comprising a plurality of searchers each being assigned to the received signal from a particular transmitting station for acquiring synchronization, said plurality of searchers respectively receiving sums of said interference-free signal output from said last group of said last stage and signals representative of station-by-station interferences, further comprising tracking means for executing synchronous tracking with the received signals or the signals input to the ICUs of the transmitting stations on the basis of the signals acquired by said searchers to thereby effect tracking control over chip clocks each being used by a particular one of said ICUs.

17. A receiving device in accordance with claim 6, further comprising tracking means for executing synchronous tracking with the received signals or the signals input to the ICUs of the transmitting stations on the basis of the signals acquired by said searchers to thereby effect tracking control over chip clocks each being used by a particular one of said ICUs.

18. A receiving device in accordance with claim 7, further comprising tracking means for executing synchronous tracking with the received signals or the signals input to the ICUs of the transmitting stations on the basis of the signals acquired by said searchers to thereby effect tracking control over chip clocks each being used by a particular one of said ICUs.

* * * * *

UNITED STATES PATENT AND TRADEMARK OFFICE
CERTIFICATE OF CORRECTION

PATENT NO. : 6,661,835 B1
DATED : December 9, 2003
INVENTOR(S) : Hiroki Sugimoto et al.

It is certified that error appears in the above-identified patent and that said Letters Patent is hereby corrected as shown below:

Column 33,
Line 35, after "while the" change "ICLJs" to -- ICUs --.

Column 34,
Line 63, after "while the" change "ICLJs" to -- ICUs --.

Column 36,
Line 40, after "while the" change "ICLJs" to -- ICUs --.

Column 37,
Line 27, after "while the" change "ICLJs" to -- ICUs --.

Column 40,
Line 32, after "while the" change "ICLJs" to -- ICUs --.

Signed and Sealed this

Twenty-seventh Day of July, 2004

JON W. DUDAS
*Acting Director of the United States Patent and Trademark Office*